(12) United States Patent
Murphy et al.

(10) Patent No.: US 7,130,354 B1
(45) Date of Patent: Oct. 31, 2006

(54) METHOD AND APPARATUS FOR IMPROVING ERROR CONTROL PROPERTIES FOR ENCODING AND DECODING DATA

(75) Inventors: Tim Murphy, Ramona, CA (US); Vlad Mitlin, San Diego, CA (US)

(73) Assignee: 3com Corporation, Marlborough, MA (US)

( * ) Notice: Subject to any disclaimer, the term of this patent is extended or adjusted under 35 U.S.C. 154(b) by 797 days.

(21) Appl. No.: 10/137,820

(22) Filed: May 2, 2002

(51) Int. Cl.
*H04L 23/02* (2006.01)
(52) U.S. Cl. .................................... 375/261
(58) Field of Classification Search ........ 375/260–261, 375/265, 285; 370/206–208; 714/759, 791, 714/752, 774, 795
See application file for complete search history.

(56) References Cited

U.S. PATENT DOCUMENTS

| | | | | |
|---|---|---|---|---|
| 3,925,611 A | * | 12/1975 | Dennis | 380/31 |
| 5,105,443 A | * | 4/1992 | Betts et al. | 375/265 |
| 5,162,812 A | * | 11/1992 | Aman et al. | 375/265 |
| 5,748,652 A | * | 5/1998 | Kim | 714/807 |
| 5,953,376 A | * | 9/1999 | Wei | 375/265 |
| 6,553,063 B1 | * | 4/2003 | Lin et al. | 375/223 |

* cited by examiner

*Primary Examiner*—Khanh Tran

(57) ABSTRACT

A method, and apparatus implementing the method, encodes bits to be transmitted over a channel. The channel may be a single carrier or a multi-carrier channel. Bits are encoded based on a constellation that has a self-similarity property and also has an improved bit error rate. The constellation was iteratively generated using a mirroring technique. In addition, a method, and apparatus, implementing the method, decodes bits that were received from a channel. The bits are decoded for a constellation that has a self-similarity property and that was generated using the mirroring technique.

29 Claims, 43 Drawing Sheets

550 → (j,configuration(j)), where j=2, 4, 6 ... n

552 →

Expansion Sequence:

(2,00), (4,01), (6,10), (8,01), (10,11) ...

554 →

| 2 | 00 |
| 4 | 01 |
| 6 | 10 |
| 8 | 01 |
| 10 | 11 |
| ⋮ | ⋮ |

556 →

| 1 | 00 |
| 2 | 01 |
| 3 | 10 |
| 4 | 01 |
| 5 | 11 |
| ⋮ | ⋮ |

Table 1. Lookup table corresponding to Eqs. (6.1) and (6.2), and Figure 31.

| $v_{b*-1}, v_{b*-2}, .., v_{b*-5}$ | $v'_{j*-1}, v'_{j*-2}, v'_{j*-3}$ | $v''_{j*-1}, v''_{j*-2}, v''_{j*-3}$ |
|---|---|---|
| 00000 | 000 | 000 |
| 00001 | 000 | 001 |
| 00010 | 001 | 000 |
| 00011 | 001 | 001 |
| 00100 | 000 | 111 |
| 00101 | 000 | 110 |
| 00110 | 001 | 111 |
| 00111 | 001 | 110 |
| 01000 | 111 | 000 |
| 01001 | 111 | 001 |
| 01010 | 110 | 000 |
| 01011 | 110 | 001 |
| 01100 | 111 | 111 |
| 01101 | 111 | 110 |
| 01110 | 110 | 111 |
| 01111 | 110 | 110 |
| 10000 | 010 | 001 |
| 10001 | 000 | 010 |
| 10010 | 010 | 000 |
| 10011 | 001 | 010 |
| 10100 | 010 | 110 |
| 10101 | 000 | 101 |
| 10110 | 010 | 111 |
| 10111 | 001 | 101 |
| 11000 | 101 | 001 |
| 11001 | 111 | 010 |
| 11010 | 101 | 000 |
| 11011 | 110 | 010 |
| 11100 | 101 | 110 |
| 11101 | 111 | 101 |
| 11110 | 101 | 111 |
| 11111 | 110 | 101 |

Fig. 33

Constellation Encoder for a 00-family

Constellation Encoder for a 11-family

Constellation Decoder for a 11-family

Constellation Encoder for a 01-family

Constellation Encoder for a 10-family

Table 4

```
unsigned int DecodeTable[] = {
0x0000, 0x0002, 0x0008, 0x000A,
0x0020, 0x0022, 0x0028, 0x002A,
0x0080, 0x0082, 0x0088, 0x008A,
0x00A0, 0x00A2, 0x00A8, 0x00AA,
0x0200, 0x0202, 0x0208, 0x020A,
0x0220, 0x0222, 0x0228, 0x022A,
0x0280, 0x0282, 0x0288, 0x028A,
0x02A0, 0x02A2, 0x02A8, 0x02AA,
0x0800, 0x0802, 0x0808, 0x080A,
0x0820, 0x0822, 0x0828, 0x082A,
0x0880, 0x0882, 0x0888, 0x088A,
0x08A0, 0x08A2, 0x08A8, 0x08AA,
0x0A00, 0x0A02, 0x0A08, 0x0A0A,
0x0A20, 0x0A22, 0x0A28, 0x0A2A,
0x0A80, 0x0A82, 0x0A88, 0x0A8A,
0x0AA0, 0x0AA2, 0x0AA8, 0x0AAA,
0x2000, 0x2002, 0x2008, 0x200A,
0x2020, 0x2022, 0x2028, 0x202A,
0x2080, 0x2082, 0x2088, 0x208A,
0x20A0, 0x20A2, 0x20A8, 0x20AA,
0x2200, 0x2202, 0x2208, 0x220A,
0x2220, 0x2222, 0x2228, 0x222A,
0x2280, 0x2282, 0x2288, 0x228A,
0x22A0, 0x22A2, 0x22A8, 0x22AA,
0x2800, 0x2802, 0x2808, 0x280A,
0x2820, 0x2822, 0x2828, 0x282A,
0x2880, 0x2882, 0x2888, 0x288A,
0x28A0, 0x28A2, 0x28A8, 0x28AA,
0x2A00, 0x2A02, 0x2A08, 0x2A0A,
0x2A20, 0x2A22, 0x2A28, 0x2A2A,
0x2A80, 0x2A82, 0x2A88, 0x2A8A,
0x2AA0, 0x2AA2, 0x2AA8, 0x2AAA,
};
```

Fig. 47

1634 ⟶ Table 5

```
unsigned int DecodeTable[ ] = {
0x0000, 0x0002, 0x000A, 0x0008,
0x0028, 0x002A, 0x0022, 0x0020,
0x00A0, 0x00A2, 0x00AA, 0x00A8,
0x0088, 0x008A, 0x0082, 0x0080,
0x0280, 0x0282, 0x028A, 0x0288,
0x02A8, 0x02AA, 0x02A2, 0x02A0,
0x0220, 0x0222, 0x022A, 0x0228,
0x0208, 0x020A, 0x0202, 0x0200,
0x0A00, 0x0A02, 0x0A0A, 0x0A08,
0x0A28, 0x0A2A, 0x0A22, 0x0A20,
0x0AA0, 0x0AA2, 0x0AAA, 0x0AA8,
0x0A88, 0x0A8A, 0x0A82, 0x0A80,
0x0880, 0x0882, 0x088A, 0x0888,
0x08A8, 0x08AA, 0x08A2, 0x08A0,
0x0820, 0x0822, 0x082A, 0x0828,
0x0808, 0x080A, 0x0802, 0x0800,
0x2800, 0x2802, 0x280A, 0x2808,
0x2828, 0x282A, 0x2822, 0x2820,
0x28A0, 0x28A2, 0x28AA, 0x28A8,
0x2888, 0x288A, 0x2882, 0x2880,
0x2A80, 0x2A82, 0x2A8A, 0x2A88,
0x2AA8, 0x2AAA, 0x2AA2, 0x2AA0,
0x2A20, 0x2A22, 0x2A2A, 0x2A28,
0x2A08, 0x2A0A, 0x2A02, 0x2A00,
0x2200, 0x2202, 0x220A, 0x2208,
0x2228, 0x222A, 0x2222, 0x2220,
0x22A0, 0x22A2, 0x22AA, 0x22A8,
0x2288, 0x228A, 0x2282, 0x2280,
0x2080, 0x2082, 0x208A, 0x2088,
0x20A8, 0x20AA, 0x20A2, 0x20A0,
0x2020, 0x2022, 0x202A, 0x2028,
0x2008, 0x200A, 0x2002, 0x2000,
};
```

```
int DecodeSquareConstellation(int NumberOfBits, int X, int Y)
{ unsigned int IndexX, IndexY;
    int Mask;
    int Data;

/* for b=2, Mask = 1 */
    /* for b=4, Mask = 3 */
    /* for b=6, Mask = 7 */
    /* for b=8, Mask = 15, etc. */
    Mask = (1<<(NumberOfBits>>1)) - 1;

/* for b=4, X = -1, Y = -3, then */
    /* X = 0b1111111111111111, Y = 0b1111111111111101 */
    /* IndexX = 3, IndexY = 2 */
    IndexX = (X>>1) & Mask;
    IndexY = (Y>>1) & Mask;

Data = DecodeTable[IndexX] + (DecodeTable[IndexY] >> 1);
    Return(Data);

Table 6

| Standard G.lite/dmt | 00 Template | X or Y for given b |||||||
|---|---|---|---|---|---|---|---|---|
| Table 4 | Table 5 | 2 | 4 | 6 | 8 | 10 | 12 | 14 |
| 0000 | 0000 | 1 | 1 | 1 | 1 | 1 | 1 | 1 |
| 0002 | 0002 | -1 | 3 | 3 | 3 | 3 | 3 | 3 |
| 0008 | 000A |  | -3 | 5 | 5 | 5 | 5 | 5 |
| 000A | 0008 |  | -1 | 7 | 7 | 7 | 7 | 7 |
| 0020 | 0028 |  |  | -7 | 9 | 9 | 9 | 9 |
| 0022 | 002A |  |  | -5 | 11 | 11 | 11 | 11 |
| 0028 | 0022 |  |  | -3 | 13 | 13 | 13 | 13 |
| 002A | 0020 |  |  | -1 | 15 | 15 | 15 | 15 |
| 0080 | 00A0 |  |  |  | -15 | 17 | 17 | 17 |
| 0082 | 00A2 |  |  |  | -13 | 19 | 19 | 19 |
| 0088 | 00AA |  |  |  | -11 | 21 | 21 | 21 |
| 008A | 00A8 |  |  |  | -9 | 23 | 23 | 23 |
| 00A0 | 0088 |  |  |  | -7 | 25 | 25 | 25 |
| 00A2 | 008A |  |  |  | -5 | 27 | 27 | 27 |
| 00A8 | 0082 |  |  |  | -3 | 29 | 29 | 29 |
| 00AA | 0080 |  |  |  | -1 | 31 | 31 | 31 |
| 0200 | 0280 |  |  |  |  | -31 | 33 | 33 |
| 0202 | 0282 |  |  |  |  | -29 | 35 | 35 |
| 0208 | 028A |  |  |  |  | -27 | 37 | 37 |
| 020A | 0288 |  |  |  |  | -25 | 39 | 39 |
| 0220 | 02A8 |  |  |  |  | -23 | 41 | 41 |
| 0222 | 02AA |  |  |  |  | -21 | 43 | 43 |
| 0228 | 02A2 |  |  |  |  | -19 | 45 | 45 |
| 022A | 02A0 |  |  |  |  | -17 | 47 | 47 |
| 0280 | 0220 |  |  |  |  | -15 | 49 | 49 |
| 0282 | 0222 |  |  |  |  | -13 | 51 | 51 |
| 0288 | 022A |  |  |  |  | -11 | 53 | 53 |
| 028A | 0228 |  |  |  |  | -9 | 55 | 55 |
| 02A0 | 0208 |  |  |  |  | -7 | 57 | 57 |
| 02A2 | 020A |  |  |  |  | -5 | 59 | 59 |
| 02A8 | 0202 |  |  |  |  | -3 | 61 | 61 |
| 02AA | 0200 |  |  |  |  | -1 | 63 | 63 |
| 0800 | 0A00 |  |  |  |  |  | -63 | 65 |
| 0802 | 0A02 |  |  |  |  |  | -61 | 67 |
| 0808 | 0A0A |  |  |  |  |  | -59 | 69 |
| 080A | 0A08 |  |  |  |  |  | -57 | 71 |
| 0820 | 0A28 |  |  |  |  |  | -55 | 73 |
| 0822 | 0A2A |  |  |  |  |  | -53 | 75 |
| 0828 | 0A22 |  |  |  |  |  | -51 | 77 |
| 082A | 0A20 |  |  |  |  |  | -49 | 79 |
| 0880 | 0AA0 |  |  |  |  |  | -47 | 81 |

Fig. 50A

Table 6 (continued)

| | | | | | | | | |
|---|---|---|---|---|---|---|---|---|
| 0880 | 0AA0 | | | | | | -47 | 81 |
| 0882 | 0AA2 | | | | | | -45 | 83 |
| 0888 | 0AAA | | | | | | -43 | 85 |
| 088A | 0AA8 | | | | | | -41 | 87 |
| 08A0 | 0A88 | | | | | | -39 | 89 |
| 08A2 | 0A8A | | | | | | -37 | 91 |
| 08A8 | 0A82 | | | | | | -35 | 93 |
| 08AA | 0A80 | | | | | | -33 | 95 |
| 0A00 | 0880 | | | | | | -31 | 97 |
| 0A02 | 0882 | | | | | | -29 | 99 |
| 0A08 | 088A | | | | | | -27 | 101 |
| 0A0A | 0888 | | | | | | -25 | 103 |
| 0A20 | 08A8 | | | | | | -23 | 105 |
| 0A22 | 08AA | | | | | | -21 | 107 |
| 0A28 | 08A2 | | | | | | -19 | 109 |
| 0A2A | 08A0 | | | | | | -17 | 111 |
| 0A80 | 0820 | | | | | | -15 | 113 |
| 0A82 | 0822 | | | | | | -13 | 115 |
| 0A88 | 082A | | | | | | -11 | 117 |
| 0A8A | 0828 | | | | | | -9 | 119 |
| 0AA0 | 0808 | | | | | | -7 | 121 |
| 0AA2 | 080A | | | | | | -5 | 123 |
| 0AA8 | 0802 | | | | | | -3 | 125 |
| 0AAA | 0800 | | | | | | -1 | 127 |
| 2000 | 2800 | | | | | | | -127 |
| 2002 | 2802 | | | | | | | -125 |
| 2008 | 280A | | | | | | | -123 |
| 200A | 2808 | | | | | | | -121 |
| 2020 | 2828 | | | | | | | -119 |
| 2022 | 282A | | | | | | | -117 |
| 2028 | 2822 | | | | | | | -115 |
| 202A | 2820 | | | | | | | -113 |
| 2080 | 28A0 | | | | | | | -111 |
| 2082 | 28A2 | | | | | | | -109 |
| 2088 | 28AA | | | | | | | -107 |
| 208A | 28A8 | | | | | | | -105 |
| 20A0 | 2888 | | | | | | | -103 |
| 20A2 | 288A | | | | | | | -101 |
| 20A8 | 2882 | | | | | | | -99 |
| 20AA | 2880 | | | | | | | -97 |
| 2200 | 2A80 | | | | | | | -95 |
| 2202 | 2A82 | | | | | | | -93 |
| 2208 | 2A8A | | | | | | | -91 |
| 220A | 2A88 | | | | | | | -89 |

Fig. 50B

Table 6 (continued)

| | | | | | | | | |
|---|---|---|---|---|---|---|---|---|
| 220A | 2A88 | | | | | | | -89 |
| 2220 | 2AA8 | | | | | | | -87 |
| 2222 | 2AAA | | | | | | | -85 |
| 2228 | 2AA2 | | | | | | | -83 |
| 222A | 2AA0 | | | | | | | -81 |
| 2280 | 2A20 | | | | | | | -79 |
| 2282 | 2A22 | | | | | | | -77 |
| 2288 | 2A2A | | | | | | | -75 |
| 228A | 2A28 | | | | | | | -73 |
| 22A0 | 2A08 | | | | | | | -71 |
| 22A2 | 2A0A | | | | | | | -69 |
| 22A8 | 2A02 | | | | | | | -67 |
| 22AA | 2A00 | | | | | | | -65 |
| 2800 | 2200 | | | | | | | -63 |
| 2802 | 2202 | | | | | | | -61 |
| 2808 | 220A | | | | | | | -59 |
| 280A | 2208 | | | | | | | -57 |
| 2820 | 2228 | | | | | | | -55 |
| 2822 | 222A | | | | | | | -53 |
| 2828 | 2222 | | | | | | | -51 |
| 282A | 2220 | | | | | | | -49 |
| 2880 | 22A0 | | | | | | | -47 |
| 2882 | 22A2 | | | | | | | -45 |
| 2888 | 22AA | | | | | | | -43 |
| 288A | 22A8 | | | | | | | -41 |
| 28A0 | 2288 | | | | | | | -39 |
| 28A2 | 228A | | | | | | | -37 |
| 28A8 | 2282 | | | | | | | -35 |
| 28AA | 2280 | | | | | | | -33 |
| 2A00 | 2080 | | | | | | | -31 |
| 2A02 | 2082 | | | | | | | -29 |
| 2A08 | 208A | | | | | | | -27 |
| 2A0A | 2088 | | | | | | | -25 |
| 2A20 | 20A8 | | | | | | | -23 |
| 2A22 | 20AA | | | | | | | -21 |
| 2A28 | 20A2 | | | | | | | -19 |
| 2A2A | 20A0 | | | | | | | -17 |
| 2A80 | 2020 | | | | | | | -15 |
| 2A82 | 2022 | | | | | | | -13 |
| 2A88 | 202A | | | | | | | -11 |
| 2A8A | 2028 | | | | | | | -9 |
| 2AA0 | 2008 | | | | | | | -7 |
| 2AA2 | 200A | | | | | | | -5 |
| 2AA8 | 2002 | | | | | | | -3 |
| 2AAA | 2000 | | | | | | | -1 |

Fig. 50C

/* Constellation encoding procedure */

X = Templet00EncoderTable[Unsigned_X>>1];

Y = Templet00EncoderTable[Unsigned_Y>>1];

/* X & Y are sign extended at this point */

Table 7 unsigned char Template00EncoderTable[] = {

| | | | |
|---|---|---|---|
| 0x01, | 0x03, | 0x07, | 0x05, |
| 0x0F, | 0x0D, | 0x09, | 0x0B, |
| 0x1F, | 0x1D, | 0x19, | 0x1B, |
| 0x11, | 0x13, | 0x17, | 0x15, |
| 0x3F, | 0x3D, | 0x39, | 0x3B, |
| 0x31, | 0x33, | 0x37, | 0x35, |
| 0x21, | 0x23, | 0x27, | 0x25, |
| 0x2F, | 0x2D, | 0x29, | 0x2B, |
| 0x7F, | 0x7D, | 0x79, | 0x7B, |
| 0x71, | 0x73, | 0x77, | 0x75, |
| 0x61, | 0x63, | 0x67, | 0x65, |
| 0x6F, | 0x6D, | 0x69, | 0x6B, |
| 0x41, | 0x43, | 0x47, | 0x45, |
| 0x4F, | 0x4D, | 0x49, | 0x4B, |
| 0x5F, | 0x5D, | 0x59, | 0x5B, |
| 0x51, | 0x53, | 0x57, | 0x55, |
| 0xFF, | 0xFD, | 0xF9, | 0xFB, |
| 0xF1, | 0xF3, | 0xF7, | 0xF5, |
| 0xE1, | 0xE3, | 0xE7, | 0xE5, |
| 0xEF, | 0xED, | 0xE9, | 0xEB, |
| 0xC1, | 0xC3, | 0xC7, | 0xC5, |
| 0xCF, | 0xCD, | 0xC9, | 0xCB, |
| 0xDF, | 0xDD, | 0xD9, | 0xDB, |
| 0xD1, | 0xD3, | 0xD7, | 0xD5, |
| 0x81, | 0x83, | 0x87, | 0x85, |
| 0x8F, | 0x8D, | 0x89, | 0x8B, |
| 0x9F, | 0x9D, | 0x99, | 0x9B, |
| 0x91, | 0x93, | 0x97, | 0x95, |
| 0xBF, | 0xBD, | 0xB9, | 0xBB, |
| 0xB1, | 0xB3, | 0xB7, | 0xB5, |
| 0xA1, | 0xA3, | 0xA7, | 0xA5, |
| 0xAF, | 0xAD, | 0xA9, | 0xAB, |

Table 8

| $v_{b*-1}, v_{b*-2}, .., v_{b*-5}$ | $v'_{j*-1}, v'_{j*-2}, v'_{j*-3}$ | $v''_{j*-1}, v''_{j*-2}, v''_{j*-3}$ |
|---|---|---|
| 00000 | 000 | 000 |
| 00001 | 000 | 001 |
| 00010 | 001 | 000 |
| 00011 | 001 | 001 |
| 00100 | 000 | 100 |
| 00101 | 000 | 101 |
| 00110 | 001 | 100 |
| 00111 | 001 | 101 |
| 01000 | 100 | 000 |
| 01001 | 100 | 001 |
| 01010 | 101 | 000 |
| 01011 | 101 | 001 |
| 01100 | 100 | 100 |
| 01101 | 100 | 101 |
| 01110 | 101 | 100 |
| 01111 | 101 | 101 |
| 10000 | 011 | 001 |
| 10001 | 000 | 011 |
| 10010 | 011 | 000 |
| 10011 | 001 | 011 |
| 10100 | 011 | 101 |
| 10101 | 000 | 111 |
| 10110 | 011 | 100 |
| 10111 | 001 | 111 |
| 11000 | 111 | 001 |
| 11001 | 100 | 011 |
| 11010 | 111 | 000 |
| 11011 | 101 | 011 |
| 11100 | 111 | 101 |
| 11101 | 100 | 111 |
| 11110 | 111 | 100 |
| 11111 | 101 | 111 |

Fig. 54

METHOD AND APPARATUS FOR IMPROVING ERROR CONTROL PROPERTIES FOR ENCODING AND DECODING DATA

FIELD OF THE INVENTION

The present invention relates to data communications; and, more particularly, to a method and apparatus for improving error control properties for encoding and decoding data. More particularly, the present invention provides a method and apparatus for encoding and decoding a quadrature-amplitude modulation constellation.

BACKGROUND OF THE DISCLOSURE

Demand for digital subscriber line (DSL) service across existing twisted pair copper wires between a central office and a remote location is increasing. Typically, DSL services operate in accordance with DSL standards recommended by the Telecommunication Standardization Sector of the International Telecommunication Union (ITU). A family of DSL Recommendations from the ITU includes: G.992.1, G.992.2, G.991.1, G.996.1, G.994.1, G.997.1 and G.995.1. Recommendation G.995.1 provides an overview of these standards. Recommendations G.991.1, G.992.1, G.992.2 have developed techniques for transmitting a range of bit rates over the copper wires of the local network including high bit rates at relatively short distances, and lower bit rates at longer distances. In particular, the G.992.1 and G.992.2 recommendations are based on asymmetric digital subscriber line technology that has different data rates in each direction of transmission. The G.992.1 recommendation is referred to as G.dmt and uses a splitter to filter the voice-grade signals at the remote location. The G.992.2 recommendation is referred to as G.lite and does not use a splitter. Recommendations G.994.1, G.996.1 and G.997.1 support the G.992.1 and G.992.2 recommendations by providing common handshake, management and testing procedures. These standards allow substantial flexibility in implementation.

DSL services typically use a discrete multi-tone (DMT) signal to transmit data. A DMT signal has multiple subchannels, each of which is assigned a frequency, also referred to as a carrier frequency or a tone, belonging to a discrete frequency band. Because individual subchannels operate at different frequencies, the subchannels may have different operating characteristics. For instance, more power may be used at higher frequencies. In addition, different numbers of bits may be loaded on different subchannels in accordance with their capacity, which depends on frequency, power, signal-to-noise ratio and transmission line characteristics. Subchannels that do not meet or exceed a minimum signal-to-noise ratio are not used. When initiating a DSL communication session, in the DSL modem, an initialization procedure at the receiver determines a number of bits to be grouped into a symbol for each subchannel, that is, a number of bits per subchannel, and exchanges that information with the transmitting DSL modem.

Quadrature amplitude modulation (QAM) is a technique to encode multiple bits into a QAM symbol. Each QAM symbol represents a distinct combination of bit values using a distinct combination of amplitude and phase of the carrier waveform based on distinct X and Y coordinates associated with respective bit values. Each QAM symbol is represented by a QAM waveform.

Referring to FIG. 1, a signal space diagram depicts an exemplary constellation 100 having a set of constellation points 102. Each constellation point 102 represents a distinct QAM symbol. The constellation points are mapped along an x-axis (X) 104 and a y-axis (Y) 106. Each constellation point 102 is associated with a distinct label which represents a respective distinct combination of bit values for a predetermined number of bits b. The label is also referred to as a tuple. Each constellation point 102 is also associated with a distinct (X, Y) coordinate. FIG. 1 depicts a constellation 100 having four constellation points 102 in which the number of bits b is equal to two. For example, the constellation point having the label 0 has an X coordinate equal to 1 and a Y coordinate equal to 1; and the constellation point having the label 3 has an X coordinate equal to −1 and a Y coordinate equal to −1.

In quadrature-amplitude modulation, the amplitudes of two quadrature carriers are modulated and the carriers are combined. The X coordinate represents the amplitude of a first carrier, and the Y coordinate represents the amplitude of a second carrier that is shifted in phase by 90° with respect to the first carrier. For example, the first carrier is a sine wave, while the second carrier is a cosine wave. Each constellation point 102 represents a distinct combination of the modulated carriers and thus a distinct QAM symbol.

A constellation encoder encodes groups of bits (tuples) into the (X, Y) coordinates of a QAM symbol. For example, tuples of four bits have sixteen possible distinct values. When encoding tuples of four bits, a constellation will have sixteen distinct constellation points, one constellation point for each value. The constellation encoder maps each of the sixteen possible combinations of values of the four bits to a distinct constellation point which has distinct (X,Y) coordinates which are used to produce the QAM symbols. The number of bits in the tuple, that is, the number of bits encoded, is referred to as the constellation size b.

In other words, for a given QAM channel, or in broadband communications for a given QAM subchannel, one typical constellation encoder selects an odd-integer point (X,Y) from a square constellation based on the values of the binary b-bit tuple, $\{v_{b-1}, v_{b-2}, \ldots, v_1, v_0\}$. In the constellation, the b bits of the tuple are associated with an integer label having a binary representation of $\{v_{b-1}, v_{b-2}, \ldots, v_1, v_0\}$. In FIG. 1, for example, when b=2, the four constellation points have labels of 0, 1, 2 and 3. Typically, the integer values of the X and Y coordinates of the constellation point are determined from the b bits such that the values of X and Y are odd integers having two's complement binary representations of $\{ \ldots, 1\}$ and $\{ \ldots, 1)$, respectively. The most significant bit of X and of Y is the sign bit.

In digital multi-carrier systems, the digital information is transformed by a modem into an analog form that is essentially a sequence of DMT symbol waveforms. Each DMT symbol bears information in an array of zeroes and ones. The digital multi-carrier system is a channel having i subchannels. Each subchannel is associated with a distinct carrier frequency. The channel has i sub-arrays, one associated with each subchannel. Each sub-array has $b_i$ bits. Therefore, $b_i$ represents a number of bits per subchannel i. Each sub-array corresponds to a QAM waveform representing a constellation point in a $2^{b_i}$-point constellation. A DMT symbol waveform is the superposition of these QAM waveforms. Each subchannel is characterized by a signal-to-noise ratio $\gamma_i$, where $\gamma_i$ represents the signal-to-noise ratio (SNR) at the $i^{th}$ carrier frequency.

In DMT systems, each subchannel has a constellation encoder. Typically, in DMT systems, equal error protection is applied, and the number of bits per subchannel $b_i$ is determined such that, for each subchannel, the bit error rate should not exceed a target bit error rate prior to decoding and retransmission $p_b$.

The number of bits per subchannel is selected while executing an initialization procedure. During initialization, the channel is analyzed and parameters are determined and exchanged. The ITU recommendations for G.lite and G.dmt set a target bit error rate (BER) standard of $10^{-7}$. The number of bits per subchannel are selected based on, at least in part, a target bit error rate standard and an average number of erroneous bits per QAM symbol.

In practice, the bit error rate for data transmitted using conventional G.992.1 and G.992.2 constellations may fluctuate. This fluctuation in the bit error rate reduces the number of bits per subchannel. Therefore, a method and apparatus are needed to reduce fluctuations in the bit error rate and thus increase the number of bits per subchannel.

SUMMARY OF THE INVENTION

A method, and apparatus implementing the method, encodes bits to be transmitted over a channel. The channel may be a single carrier or a multi-carrier channel. Bits are encoded based on a constellation. The constellation has a self-similarity property and also has an improved bit error rate. The constellation was iteratively generated using a mirroring technique.

In another aspect of the invention, a method, and apparatus implementing the method, decodes an encoded signal received from a channel. The signal was encoded as a constellation as described above. The channel may be a single carrier or multi-a carrier channel.

In yet another aspect of the invention, the constellation is square. Alternately, the constellation is non-square.

In another aspect of the invention, a constellation encoder implements the method of encoding of the present invention using hardware. Alternately, a constellation encoder implements the method of encoding of the present invention using software.

Using the method and apparatus of the present invention, the bit error rate, and therefore the number of bits per subchannel, is improved.

BRIEF DESCRIPTION OF THE DRAWINGS

FIG. 33 is an exemplary lookup table for use with odd constellations in accordance with an embodiment of the present invention.

FIG. 47 is an exemplary decode lookup table for exemplary G.lite and G.dmt constellations.

FIG. 48 is exemplary source code of an embodiment of the decode constellation module of FIG. 46.

FIG. 49 an exemplary decode lookup table, accessed by the exemplary source code of FIG. 48, to decode a constellation that was expanded using the 00-configuration.

FIGS. 50A, 50B and 50C are a table depicting the association between the X and Y values for some even constellation sizes b that were generated using the 00-configuration.

FIG. 52 is a portion of exemplary source code of an embodiment of an encode constellation module of FIG. 51.

FIG. 53 is an embodiment of an exemplary encode lookup table of FIG. 51, and used with the exemplary source code of FIG. 52.

FIG. 54 is an exemplary lookup table for use with odd constellations, that works with the lookup table of FIG. 53.

To facilitate understanding, identical reference numerals have been used, where possible, to designate identical elements that are common to some of the figures.

DETAILED DESCRIPTION OF THE PREFERRED EMBODIMENTS

Figure 1:
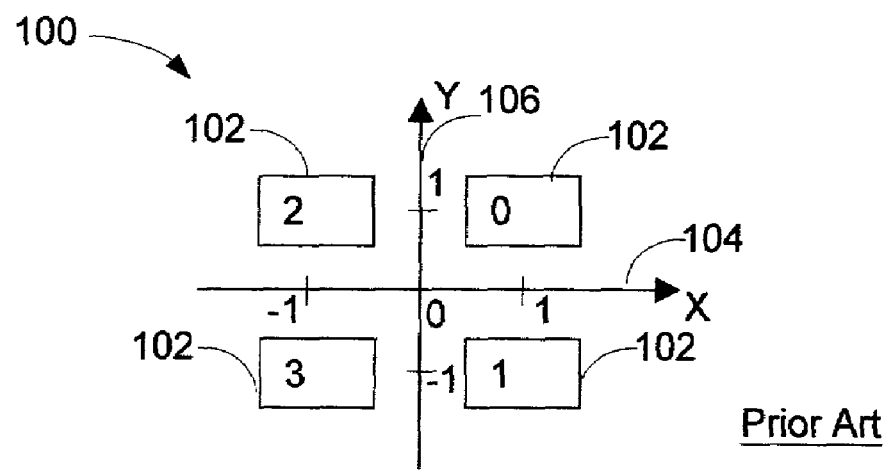
FIG. 1 is a signal space diagram of a prior art constellation having four constellation points.

The present invention provides a method, and apparatus implementing the method, for encoding and decoding that reduces fluctuations in the bit error rate for QAM constellations. Because fluctuations in the bit error rate are reduced, the number of bits per channel, or subchannel depending on the embodiment, may be increased. The term "bit load" refers to the number of bits per channel, or subchannel depending on the embodiment. This method can also be used in a DMT or, which is sometimes referred to as an orthogonal frequency division multiplexed (OFDM), channel.

Some constellation decoding techniques assume that a constellation decoding error yields any constellation point with the same probability, that is, the constellation has equally-probable decoding errors. However, in a bit-error-rate-controlled transmission environment, this assumption may not be true. In this case, a majority of decoding errors may result in the erroneous determination of a constellation point that is one of the nearest-neighbors of the transmitted constellation point. In other words, decoding errors for a transmitted constellation point tend to group around the transmitted constellation point (also referred to as nearest-neighbor decoding errors), rather than being equally distributed throughout the constellation as equally-probable decoding errors.

In the present invention, a self-similarity property is used to generate constellations with improved error control properties. A self-similarity property is a distribution of a parameter in a subset or sub-block of a constellation that looks similar to the whole constellation, but on a smaller scale. In particular, in the present invention, the self-similarity property is the Hamming distance of the constellation points of the constellation. The constellations are generated based on the Hamming distance between nearest neighbor constellation points, and thereby reduces nearest-neighbor decoding errors. Using the self-similarity property, the probability of having m bit errors in an erroneous b-bit QAM symbol is determined. Based on this result, an average fraction of erroneous bits $\omega$ in an erroneous QAM symbol is determined. When the number of bits of a QAM symbol b is large, the average fraction of erroneous bits $\omega$ is approximately inversely proportional to b/2. A parameter called the mean square deviation measures fluctuations in bit error rate (BER) that are inherent to conventional QAM constellation encoders, such as used in the G.lite and G.DMT standards. The fluctuation of the bit error rate in a square constellation in accordance with the present invention is then determined.

In an alternate embodiment, a constellation encoder and decoder are described for non-square constellations. Non-square constellations are represented as a set of adjacent square constellations of different sizes, thereby reducing the determination of their error-control parameters to that of square constellations. When the constellation size is large, the probabilistic properties of non-square constellations can be described in a similar manner to square constellations.

1. An Exemplary Communications System

Figure 2:
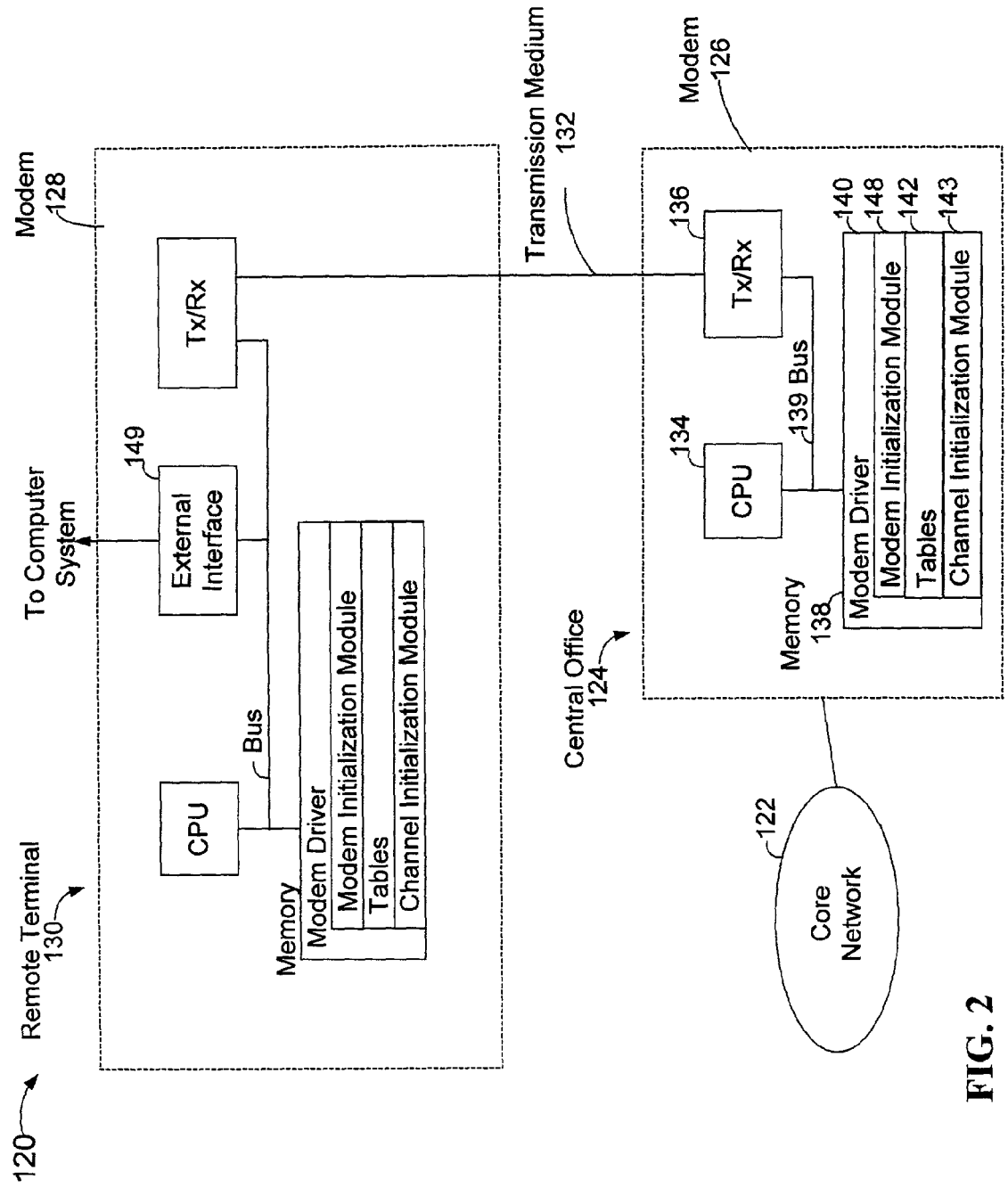
FIG. 2 is a block diagram of a communication system in which a transmission medium connects a DSL modem at a central office to a DSL modem at a remote terminal.

Referring to FIG. 2, a block diagram of an exemplary discrete multi-tone (DMT) communications system or channel 120 is shown. In another embodiment, the DMT communications system 120 is a DSL system. Alternately, the DMT communications system 120 is an asymmetric DSL (ADSL) system. In another alternate embodiment, the communications system 120 has a single QAM channel. The DMT communications system 120 connects to a core network 122 at a central office 124. The core network 122 may include functions such as a concentrator, a switch and interfaces to broadband and narrowband networks. The DMT communications system 120 has a modem 126 at the central office 124 and a modem 128 at a remote terminal 130 that are interconnected by a transmission medium 132. The modems 126, 128 implement a multicarrier transmission method in accordance with one embodiment of the present invention. The modem 126 at the central office 124 includes a processor (CPU) 134, a transmitter/receiver (Tx/Rx) 136, and a memory 138, which are interconnected by a bus 139. The memory 138 stores a modem driver 140 that is executed by the processor 134, and also stores tables 142 in accordance with various embodiments of the present invention. At least one table 142 stores values representing a number of bits per subchannel 146 for each of the subchannels. In one embodiment, the memory stores one or more look-up tables for a constellation encoder. The look-up table(s) map values of a subset of bits to subsets of bits to X and Y coordinates of a constellation. In another embodiment, the modem driver 140 includes a modem initialization module 148 that generates at least a subset of the various tables of the present invention; and a channel initialization module 143 that accesses the tables to determine a bit load. In an alternate embodiment, the channel initialization module 143 is not executed once, but may be executed periodically to monitor the data, update the tables 142, and adjust the number of bits per subchannel, if needed, during system operation. In another alternate embodiment, the channel initialization module 143, rather then the modem initialization module 148, generates the number of bits per subchannel based on a measured effective signal-to-noise ratio. The memory 138 may be implemented using RAM, ROM, or a disk drive, or a combination thereof. In an alternate embodiment, the modem driver procedure 140, and/or portions thereof, may be implemented in hardware using digital logic, for example, using an application-specific integrated circuit (ASIC).

The modem 128 at the remote terminal 130 includes the same components as the modem 126 at the central office 124, and also includes an external interface 150 to connect to a computer system. The external interface 150 may be a PCI, internet, or Universal Serial Bus (USB) interface. In an alternate embodiment, the modem 138 is internal to the computer system.

The communications channel uses a discrete multitone (DMT) signal to carry data downstream and upstream on the transmission medium 132. The downstream direction is from the central office 124 to the remote terminal 130; and the upstream direction is from the remote terminal 130 to the central office 124. Typically, higher data rates are supported for transmitting data in the downstream direction than the upstream direction. Alternately, the data rate in the upstream and downstream directions is the same.

In another embodiment, the transmission medium is twisted pair. Alternately, the transmission medium may be a coaxial cable. In another alternate embodiment, the transmission medium is "wireless," that is, the transmission medium has radio transmitters and receivers to transmit and receive the DMT signal, respectively. Alternately, the transmission medium is implemented optically. In one embodiment, the transmission is performed using an infrared (IR) interface which includes an IR transmitter and an IR receiver. Alternately, the transmission medium is implemented using optical fiber with an optical transmitter and receiver.

Figure 3:
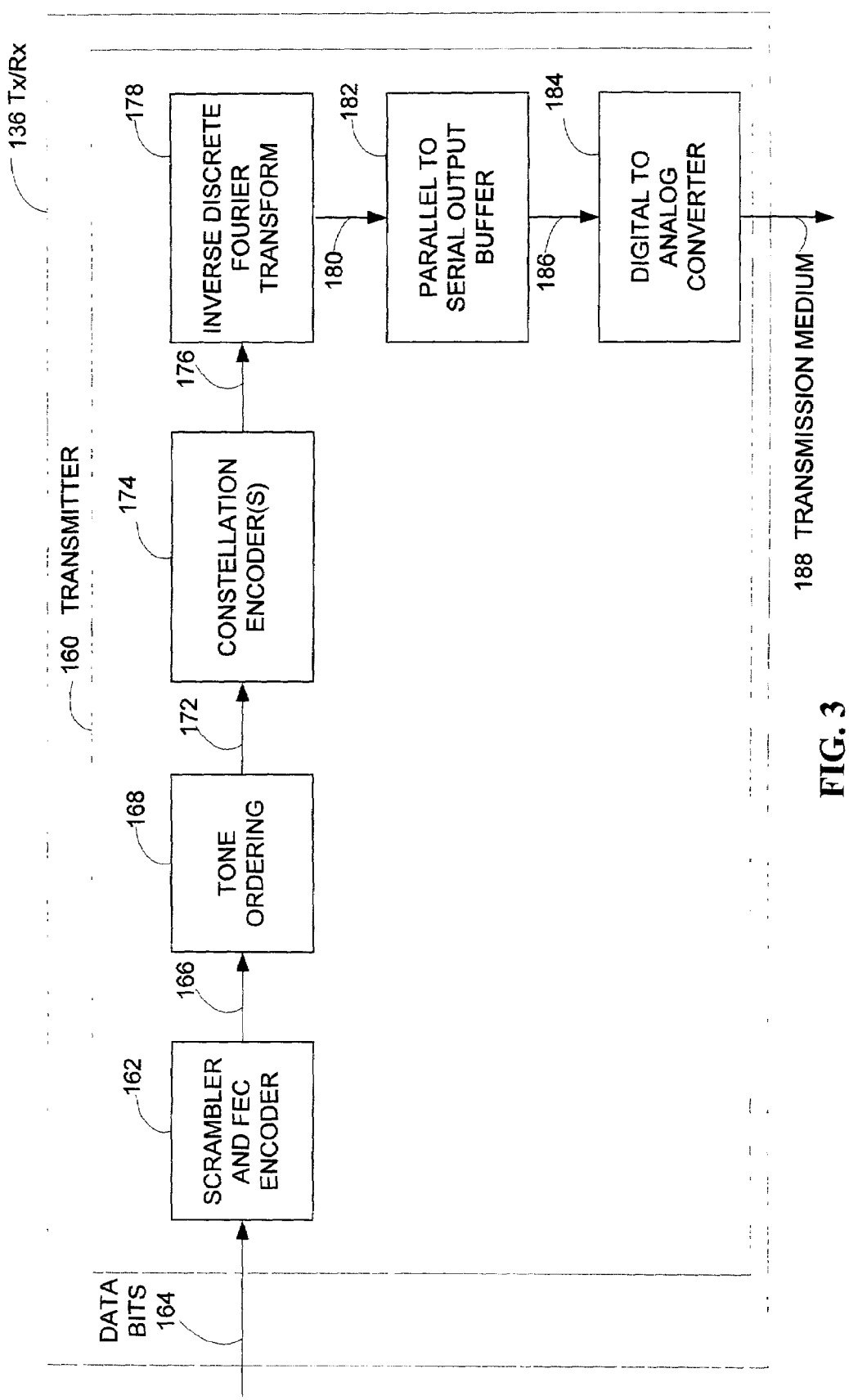
FIG. 3 is a block diagram of a transmitter of the DSL modem of FIG. 2.

FIG. 3 is a block diagram of a transmitter 160 of the transmitter/receiver 136 of FIG. 2. A scrambler and forward error correction (FEC) block 162 scrambles an incoming stream of data bits using a predetermined algorithm, and applies FEC to the bits to produce FEC encoded bits on lead 166. A tone ordering block 168 assigns the FEC encoded bits to the usable subchannels and outputs the assigned FEC encoded bits on leads 172. One or more constellation encoders 174, one for each subchannel, map the FEC encoded bits assigned to a subchannel to (X, Y) coordinates of a constellation point and outputs the (X,Y) coordinates on leads 176.

An inverse discrete Fourier transform (IDFT) block 178 modulates the output from the constellation encoders 174 to produce a digital modulated signal representing the superposition of the QAM symbols on lead 180. A parallel-to-serial output buffer 182 stores the digital modulated signal from the IDFT block 178. A digital-to-analog converter (DAC) 184 serially converts the stored digital modulated signal from lead 186 to an analog DMT waveform that is output on lead 188 for transmission. The functions of the blocks 162, 168, 174, 178, 182 and 184 may be implemented completely in hardware as a circuit, or alternately, using a combination of hardware and software.

Figure 4:
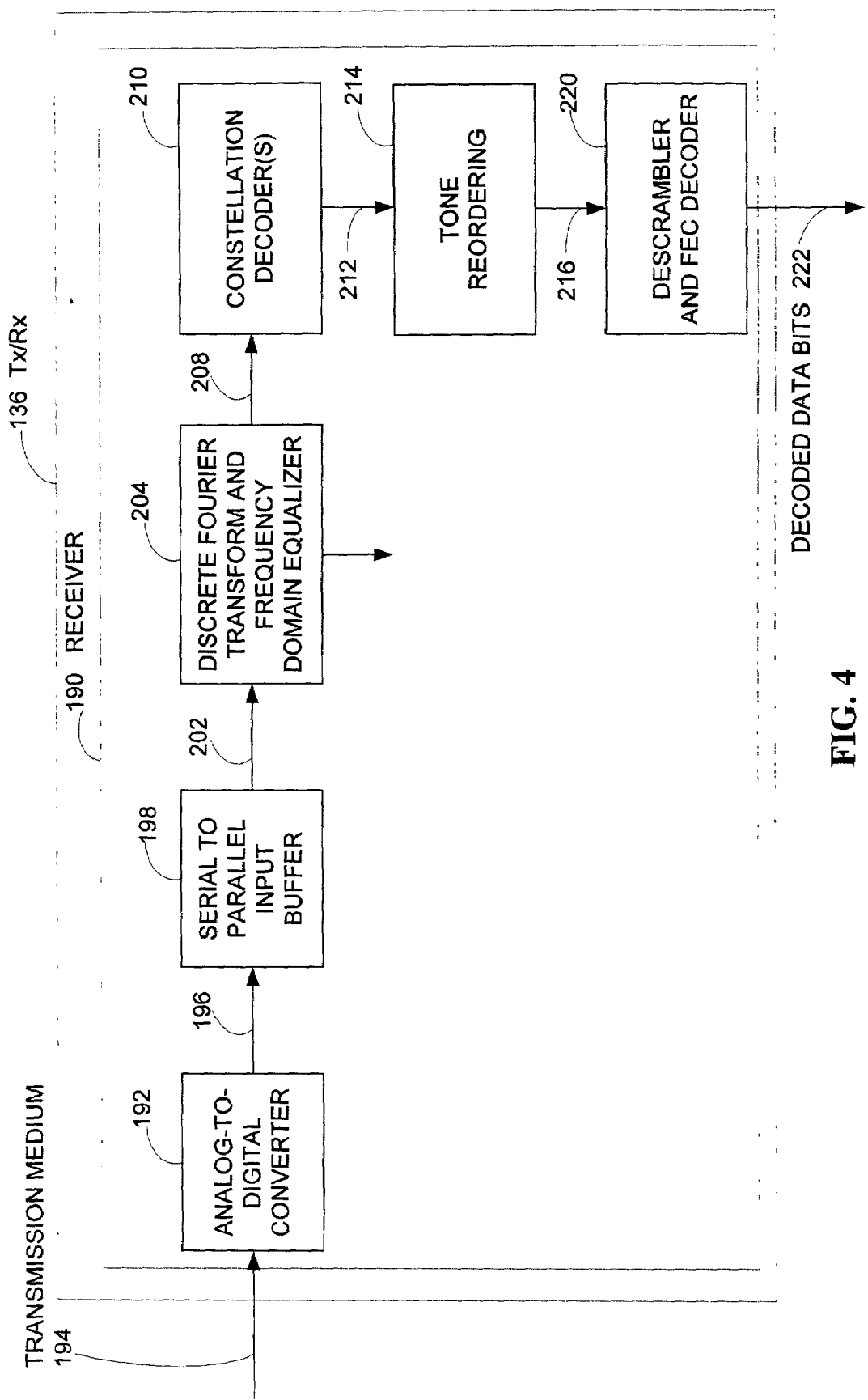
FIG. 4 is a block diagram of a receiver of the DSL modem of FIG. 2.

FIG. 4 is a block diagram of a receiver 190 of the transmitter/receiver 136 of FIG. 2. The receiver 190 performs the inverse of the functions of the transmitter 160 to produce a decoded bit stream from the analog DMT waveform. An analog-to-digital converter 192 receives the analog DMT waveform on lead 194 and converts it to a series of digital values to produce a digital DMT waveform on leads 196. A serial-to-parallel input buffer 198 stores the values of the digital DMT waveform and outputs the values, in parallel, on leads 202 to the discrete Fourier transform block 204. The discrete Fourier transform and frequency domain equalizer block 204 demodulates the values of the digital DMT waveform to produce a set of (X,Y) coordinates, each representing a respective QAM symbol, one for each usable subchannel, on leads 208. One or more constellation decoders 210 decode their respective (X,Y) coordinate and output respective sets of FEC encoded bits for the usable subchannels on leads 212. A tone reordering block 214 places the FEC encoded bits in their proper order and outputs the ordered encoded bits on leads 216. The descrambler and FEC decoder 220 corrects errors using forward error correction and descrambles the bits to reproduce the data stream sent by the transmitter on lead 222.

Figure 5:
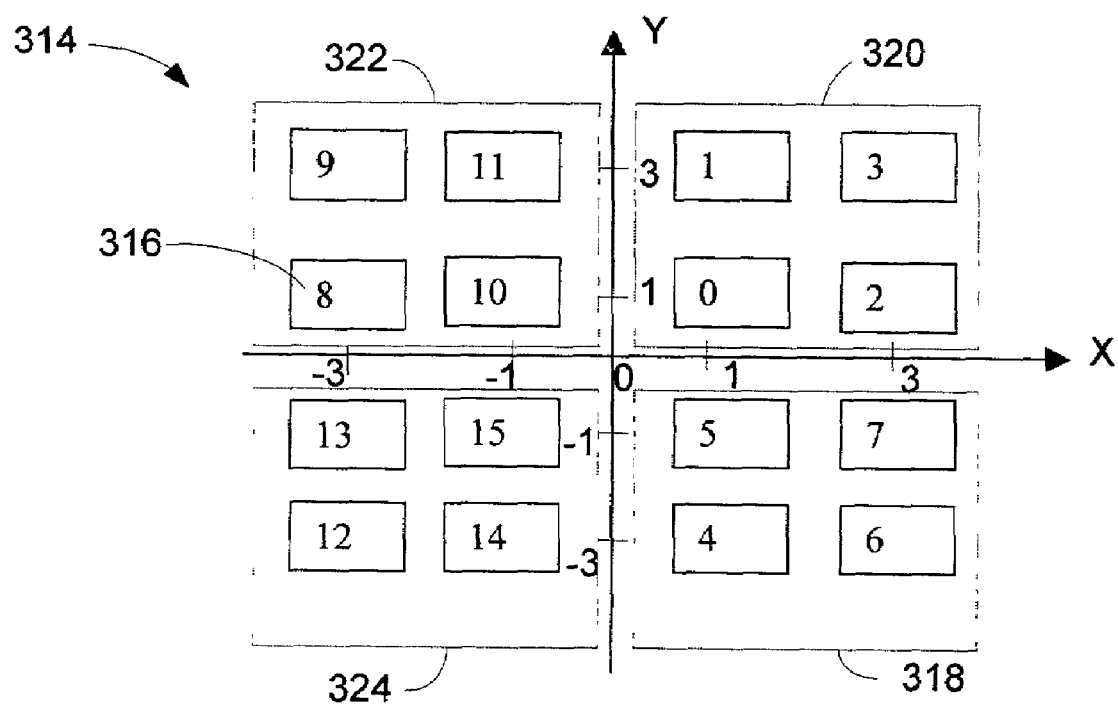
FIG. 5 is a signal space diagram that depicts an exemplary constellation having sixteen constellation points, and a number of bits b equal to 4.

Referring to FIG. 5, an exemplary G.992.2 constellation 314 having sixteen constellation points 316 is shown. A coordination number represents a number of nearest neighbors of a constellation point. For example, the constellation point labeled 6 has two nearest neighbors, the constellation points labeled 4 and 7; therefore the constellation point labeled 6 has a coordination number equal to two. More generally, for an arbitrary $2^b$-point square constellation, that is, for a constellation having $2^b$ constellation points, the coordination number of a constellation point is equal to four for each internal constellation point, is equal to three for each external non-corner constellation point, and is equal to two for each external corner constellation point.

To determine an average fraction of erroneous bits per QAM symbol, that is, per constellation point, let $a_i$ be the binary representation of the label for the $i^{th}$ constellation point of the constellation. Let $\chi_i$ be the coordination number of the $i^{th}$ constellation point, that is, the total number of nearest neighbors to the $i^{th}$ constellation point in the constellation. The average fraction of erroneous bits per QAM symbol ω(b) is determined in accordance with the following equation:

$$\omega(b) = \frac{1}{b \cdot 2^b} \sum_{i=1}^{2^b} \sum_{j \neq i}^{\chi_i} \frac{d_H(a_i, a_j)}{\chi_i} \quad (1.1)$$

In Equation (1.1), $d_H(\bullet,\bullet)$ is the Hamming distance between the labels of two constellation points. The label associated with a constellation point is also referred to as a tuple. The innermost summation of Equation (1.1) is performed over the nearest neighbors of the constellation point i. It has been found that for G.lite and G.dmt QAM constellations, $1/\omega(b)$ increases as the number of bits per subchannel b increases. When the value of b is large, $1/\omega(b)$ increases linearly with a proportionality coefficient of the order of ½. The following relationship for $1/\omega(b)$ has been suggested:

$$1/\omega(b) = (2b+3)/4 \quad (1.2)$$

Equation (1.2) yields the asymptotic behavior of approaching b/2 as discussed above.

Equation (1.2) is one possible approximation of Equation (1.1). Although the average fraction of erroneous bits per QAM symbol ω(b) can be determined directly from Equation (1.1), solving Equation (1.1) is cumbersome and, for large values of b, is difficult to use in direct calculations of error control parameters. A more general problem is to develop a method of determining other error control parameters of QAM constellation encoders, that is, to determine the probability of having m bit errors in an erroneous QAM symbol having b bits. Therefore, the geometrical structure of QAM constellations that directly affects the error control properties of the constellation encoders, and initially square QAM constellations, will be discussed.

Figure 6:
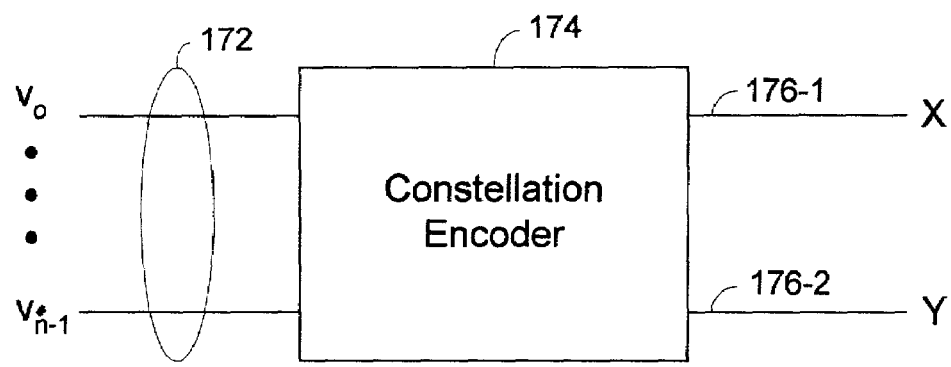
FIG. 6 is a block diagram of a constellation encoder of FIG. 3.

Referring to FIG. 6, for a given QAM channel, or alternately, in DMT communications, for a given QAM subchannel, the constellation encoder 174 selects and outputs the X and Y coordinates on leads 176-1 and 176-2, respectively, of a constellation point based on the binary b-bit input tuple, $\{v_{b-1}, v_{b-2}, \ldots, v_1, v_0\}$ that is supplied to the input on leads 172 of the constellation encoder 174. The b bits of the input tuple are matched to an integer label of a constellation point whose binary representation is $\{v_{b-1}, v_{b-2}, \ldots, v_1, v_0\}$ and the (X, Y) coordinates of that constellation point are determined. The most significant bit of each of the (X,Y) coordinates is the sign bit for X and Y. In one embodiment, the coordinates (X,Y) are odd integers. In an alternate embodiment, the (X,Y) coordinates are even integers. In yet another embodiment, the (X,Y) coordinates have an even and an odd integer. For simplicity, the present invention will be described with respect to odd integer values of the (X,Y) coordinates.

Referring back to FIG. 1, for example, for a constellation in which the number of bits b is equal to two, the four constellation points are labeled 0, 1, 2 and 3. For example, the constellation point labeled 0 has (X, Y) coordinates of (1,1); and the constellation point labeled 3 has (X,Y) coordinates of (−1,−1). The integer values of the X and Y coordinates of the constellation point are determined from the b bits of the input tuple $\{v_{b-1}, v_{b-2}, \ldots, v_1, v_0\}$. When the input tuple is $\{v_{b-1}, v_{b-2}, \ldots, v_1, v_0\}$, the coordinates X and Y are odd integers having two's complement binary representations of $\{v'_{n-1}, v'_{n-2}, \ldots, v'_0, 1\}$ and $\{v''_{n-1}, v''_{n-2}, \ldots, v''_0, 1\}$ respectively. The most significant bit of X and Y, $v'_{n-1}$ and $v''_{n-1}$, respectively, is the sign bit. In another example, when the bits of the input tuple $\{v_1, v_0\}$ are equal to $\{1, 0\}$, that is, the input tuple has a binary value of two, then X is equal to −1 and Y is equal to 1.

Figure 7:
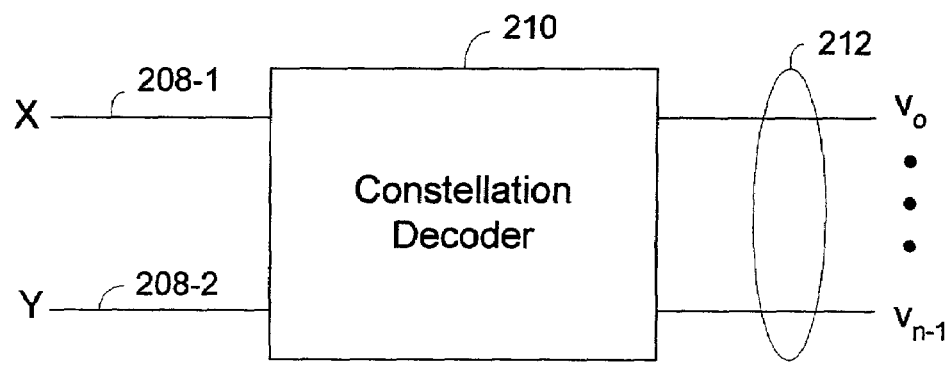
FIG. 7 is a block diagram of a constellation decoder of FIG. 4.

Referring to FIG. 7, for a given QAM channel, or alternately, in DMT communications, for a given QAM subchannel, the constellation decoder 210 receives (X,Y) coordinates representing a received constellation point on leads 208-1 and 208-2. The constellation decoder 210 selects (X,Y) coordinates of a constellation point, that is, a selected constellation point, of a predetermined constellation that is closest to the (X,Y) coordinates of the received constellation point. The constellation decoder 210 determines a binary tuple that is associated with the selected constellation point, and outputs that binary tuple as a decoded QAM symbol on leads 212.

2. QAM Constellation Encoders

Figure 8:
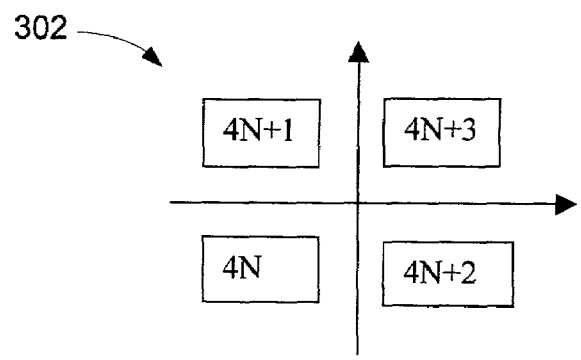
FIG. 8 depicts an exemplary 2×2 block used to expand a constellation point N.

Referring to FIG. 8, the 4-bit constellation of FIG. 5 can be obtained from the 2-bit constellation of FIG. 1 by replacing each constellation point in FIG. 1 with a 2×2 block 302 of constellation points as shown by the template of FIG. 8. For each constellation point of the 2-bit constellation, the value of its label is substituted for N in the 2×2 block 302 of FIG. 8 to generate the labels of the new constellation points. The 2×2 block of FIG. 8 is repeatedly substituted for each constellation point of a constellation to generate a larger constellation. The constellations generated for even values of the constellation size b are square in shape.

Referring also to FIG. 5 and FIG. 1, the expansion of a constellation using the 2×2 block 302 of FIG. 8 will now be described. For the constellation point labeled "1" of the 2-bit constellation of FIG. 1, four constellation points having values of "4," "5," "6" and "7" are generated as shown in block 318 of FIG. 5. Block 320 of FIG. 5 depicts the result of the expansion of the constellation point labeled 0 of the 2-bit constellation. Block 322 of FIG. 5 depicts the result of the expansion of the constellation point labeled 2 of the 2-bit constellation. Block 324 of FIG. 5 depicts the result of the expansion of the constellation point labeled 3 of the 2-bit constellation.

The error control properties of QAM constellation encoders will now be discussed. For a subchannel i, the average fraction of erroneous bits in an erroneous $b_i$-sized QAM symbol at a signal-to-noise ratio $\gamma_i$ is represented as $\omega(\gamma_i, b_i)$. If the symbol error rate is represented as $p_{QAM}(\gamma_i, b_i)$, then the bit error rate for this symbol is equal to $p_{QAM}(\gamma_i, b_i)\omega(\gamma_i, b_i)$. The maximum permitted value of the bit error rate in the system past the demodulation stage is represented by $p_b$. In the absence of forward error correction in the transceiver, in the G.lite and G.dmt standards, the maximum value of a target bit error rate $p_b$ is equal to $10^{-7}$. For a multicarrier system, the bit error rate of each subchannel is determined in accordance with Equation (2.1) as follows:

$$BER = p_{QAM}(\gamma_i, b_i)\omega(\gamma_i, b_i) \leq p_b \quad (2.1)$$

In one embodiment, the size of the QAM symbol $b_i$ is selected to maximize the bit error rate of each bin (subchannel), that is, the left hand side of Equation (2.1), within the limit of the maximum permitted value of the target bit error rate $p_b$.

A well-known expression for the symbol error rate $p_{QAM}$ from communication theory is shown in Equation (2.2) below:

$$P_{QAM}(b_i, \gamma_i) = 1 - \left[1 - (1 - 2^{b_i/2})\text{erfc}\left(\sqrt{3 \cdot 10^{\gamma_i/10}/(2^{b_i+1}-2)}\right)\right]^2 \quad (2.2)$$

In practice, the results of decoding an erroneous constellation tend to group around the correct, that is, the transmitted, constellation point, and are usually the nearest neighbors of the transmitted constellation point. If only the nearest neighbors are considered as having possible errors in constellation decoding, the average fraction of erroneous bits ω(b) in an erroneous b-sized QAM symbol is determined in accordance with Equation (2.3) below:

$$\omega(b) = \frac{12 \cdot 2^b - (3b+2)2^{b/2} - 2b - 4}{6b \cdot 2^b} \quad (2.3)$$

Based on Equation (2.3), the average number of erroneous bits in an erroneous G.lite and/or G.dmt QAM symbol $\langle n_e \rangle$ is determined in accordance with Equation (2.4) below:

$$\langle n_e \rangle = \frac{12 \cdot 2^b - (3b+2)2^{b/2} - 2b - 4}{6 \cdot 2^b} \rightarrow 2 \quad (2.4)$$

Also, based on Equation (2.3), an average number of erroneous bits in an erroneous QAM symbol $\langle n_e \rangle$ approaches two as the size b of the G.lite and/or G.dmt QAM symbol, and therefore the size of the constellation, increases. At large constellation sizes, for a b-bit square constellation, the probability of having k bit errors in an erroneous QAM symbol becomes independent of the size of the constellation b, and such probability is expressed as follows in Equation (2.5):

$$p(k, b) \rightarrow \frac{1}{2^k}, 1 \leq k \leq b/2 \quad (2.5)$$

Equation (2.5) also implies that, assuming that decoding errors are nearest neighbor errors, the maximum number of bit errors in an erroneous G.lite and/or G.dmt QAM symbol may be as high as b/2. For example, a constellation of G.lite and/or G.dmt QAM symbols (tuples) that have eight bits may have up to four bit errors per QAM symbol, and a constellation of G.lite and/or G.dmt QAM symbols that have fourteen bits may have up to seven bit errors per QAM symbol.

Based on the probability of having k bit errors in an erroneous G.lite and/or G.dmt QAM symbol p(k,b), a mean square deviation $\sigma_e$ of the number of bit errors in an erroneous tuple is determined in accordance with Equation (2.6) as follows:

$$\sigma_e^2 = \langle n_e^2 \rangle - \langle n_e \rangle^2 \quad (2.6)$$

$$= 2 - \frac{3b^2 + 24b + 20}{12 \cdot 2^{b/2}} + \frac{(6b+4)2^{b/2} - b^2 - 4}{6 \cdot 2^b} +$$

-continued $$\left(\frac{(3b+2)2^{b/2} + 2b + 4}{3 \cdot 2^b}\right)^2$$

The mean square deviation of the number of bit errors in an erroneous tuple $\sigma_e$ is a measure of fluctuation in the bit error rate that is associated with QAM constellation encoders. The mean square deviation of the number of bit errors in an erroneous tuple $\sigma_e$ determines the relative range of fluctuations in the bit error rate past the demodulation stage. In other words, the mean square deviation of the number of bit errors in an erroneous tuple $\sigma_e$ characterizes the homogeneity of the bit error rate of the information flow at the receiver:

$$\frac{\Delta(BER)}{BER} \sim \sigma_e \quad (2.7)$$

The mean square deviation of the number of bit errors in an erroneous tuple $\sigma_e$ approaches the square root of two at large values of the size b of a G.lite and/or G.dmt QAM symbol.

3. QAM Constellation Encoders With Improved Error Control

Properties: Even-Bit Constellations

Referring back to FIG. 5, the error control properties of constellation encoders discussed above result from constructing larger QAM constellations from smaller QAM constellations in accordance with the G.lite and G.dmt standards.

Figure 9:
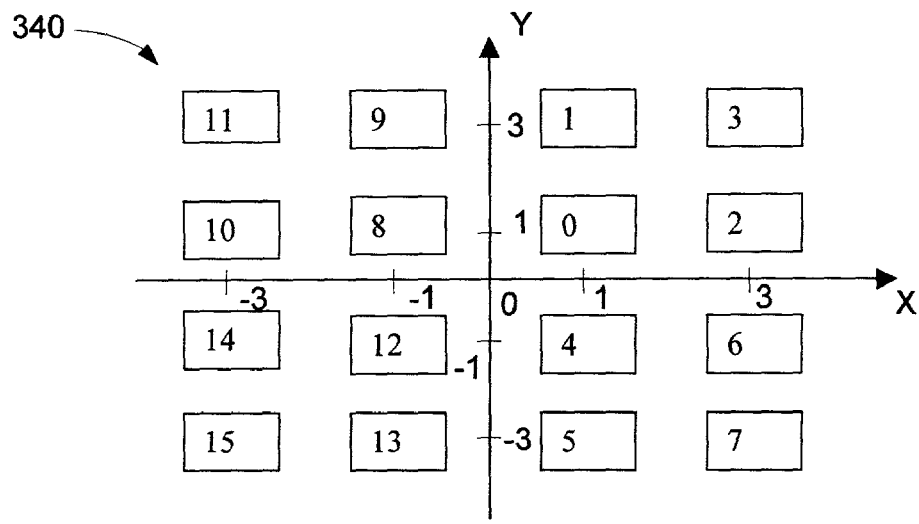
FIG. 9 depicts an exemplary 4-bit constellation that was generated using the mirroring technique of the present invention.

Referring now to FIG. 9, an exemplary 4-bit constellation 340 in accordance with an embodiment of the present invention is shown. The constellation 340 was generated using a mirroring technique. Depending on the embodiment, the mirroring technique is applied either recursively or iteratively, or a combination thereof. A constellation that is generated according to the mirroring technique of the present invention has at least one improved error control property with respect to the constellations implemented in the G.lite and G.dmt standards. In particular, when the mirroring technique is used to generate square constellations, the average number of erroneous bits in an erroneous QAM symbol for those constellations approaches one. In other words, when transmitting data using a constellation of the present invention, fluctuations in the bit error rate due to constellation encoding and decoding are reduced and may be eliminated.

Figure 10:
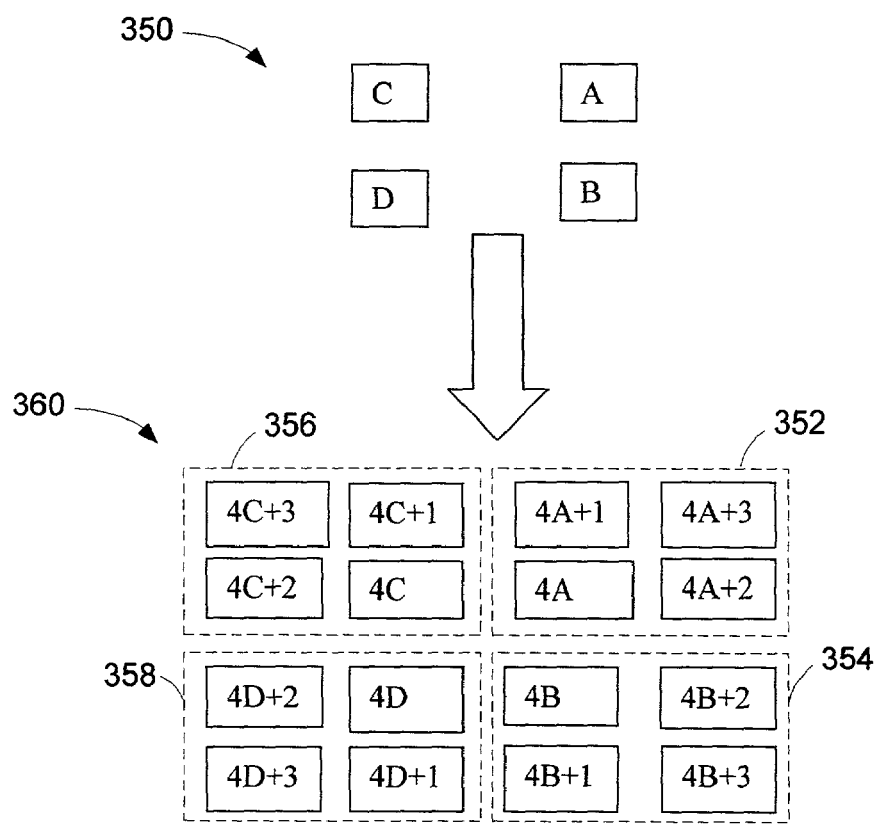
FIG. 10 depicts the expansion of a constellation using the mirroring technique of the present invention.

In FIG. 10, the technique of generating a constellation in accordance with an embodiment of the present invention is shown. In a 2×2 block 350, four neighboring constellation points are labeled A, B, C, and D. The constellation point labeled A expands into 4 new constellation points, and such expansion will be referred to as a 00-template 352. To expand the other three constellation points B, C and D, different templates 354, 356 and 358, respectively, are used. These templates mirror the 00-template. The template used to expand the constellation point labeled B 354 is obtained by interchanging the rows in the 00-template 352, and this template will be referred to as a 01-template 354. The template 356 used to expand the constellation point labeled C is obtained by interchanging the columns of the 00-template 352, and this template 356 will be referred to as a 10-template 356. The template 358 used to expand the constellation point labeled D is obtained either by interchanging the rows in the 10-template 356 or by interchanging the columns in the 01-template 354, or by interchanging both the rows and the columns of the 00 template 352, and this template 358 will be referred to as the 11-template 358. This arrangement of templates, with respect to the constellation points labeled A, B, C and D will be referred to as a 00-configuration 360.

Referring also to FIGS. 1 and 9, the generation of a constellation using the mirroring technique of the present invention will now be described. The four bit constellation of FIG. 9 is generated from the two bit constellation of FIG. 1 using the technique of the present invention. Starting with the 2-bit constellation in FIG. 1, the constellation point having coordinates (1, 1) and labeled "0" corresponds to the constellation point labeled "A" of FIG. 10, and is expanded using the 00-template, 2×2 block 352 of FIG. 10. The constellation point labeled "1" corresponds to the constellation point labeled "B" of FIG. 10, and is expanded using the 01-template, 2×2 block 354 of FIG. 10. The constellation point labeled "2" corresponds to the constellation point labeled "C" of FIG. 10 and is expanded using the 10-template, 2×2 block 356 of FIG. 10. The constellation point labeled "3" corresponds to the constellation point labeled "D" of FIG. 10 and is expanded using the 11-template, 2×2 block 358 of FIG. 10. This expansion results in the constellation shown in FIG. 9.

More particularly, when the constellation point labeled 0 is expanded the resulting four constellation points have labels of 0, 2, 3 and 1. When the constellation point labeled 1 is expanded, the resulting four constellation points have labels of 4, 5, 7 and 6. When the constellation point labeled 2 is expanded, the resulting four constellation points have labels of 10, 8, 9 and 11. When the constellation point labeled 3 is expanded, the resulting four constellation points have labels of 12, 14, 15 and 13.

In another embodiment, the constellation generation technique starts the expansion using a constellation point other than the constellation point having coordinates of (1, 1), and expands that point using a specified one of the templates.

More generally, in yet another embodiment, the mirroring technique is iteratively applied to generate one or more larger constellations.

Figure 11:
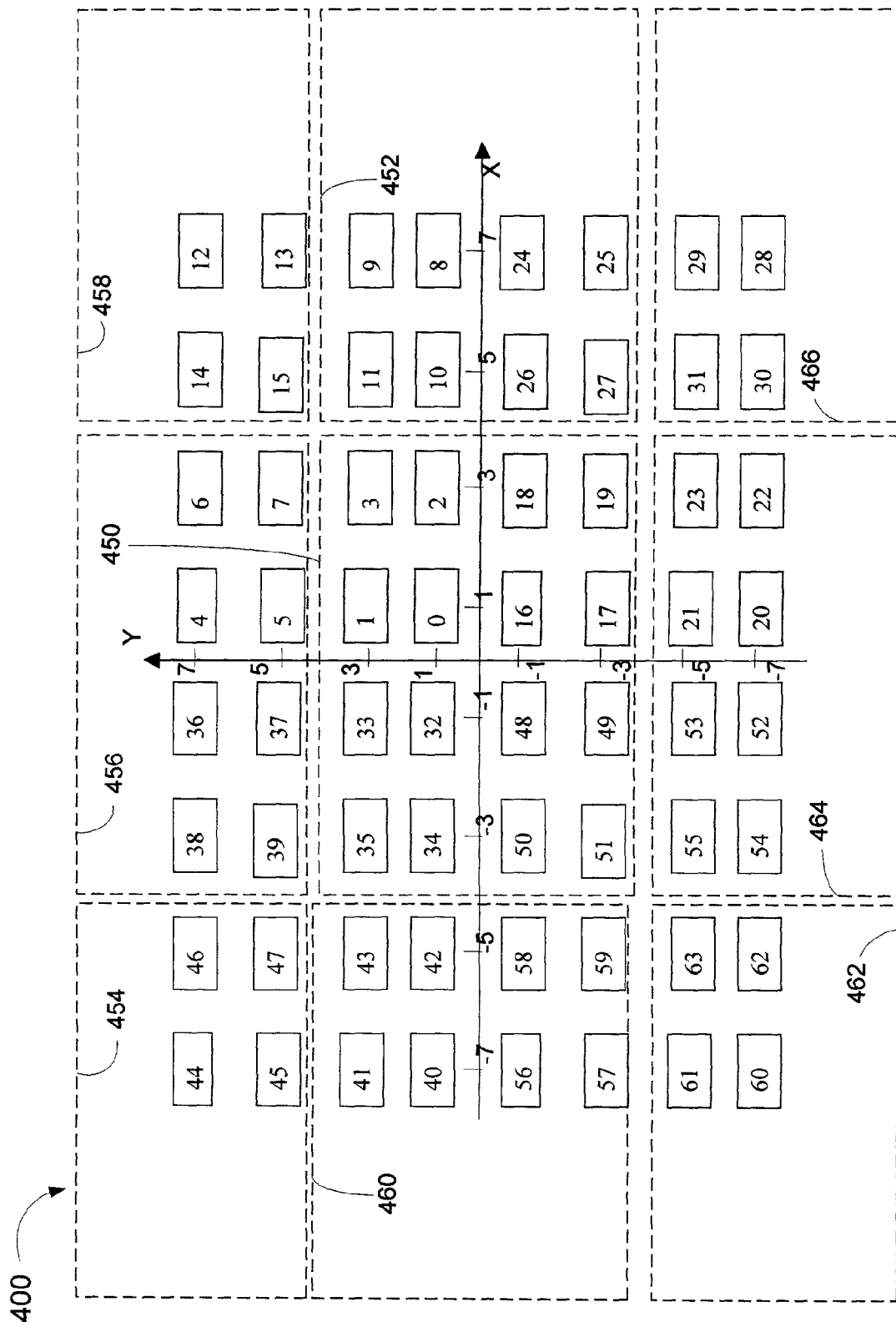
FIG. 11 depicts an embodiment of a six-bit constellation that was generated starting with the two-bit constellation of FIG. 1 and expanded using the 00-configuration of FIG. 10.
Figure 12:
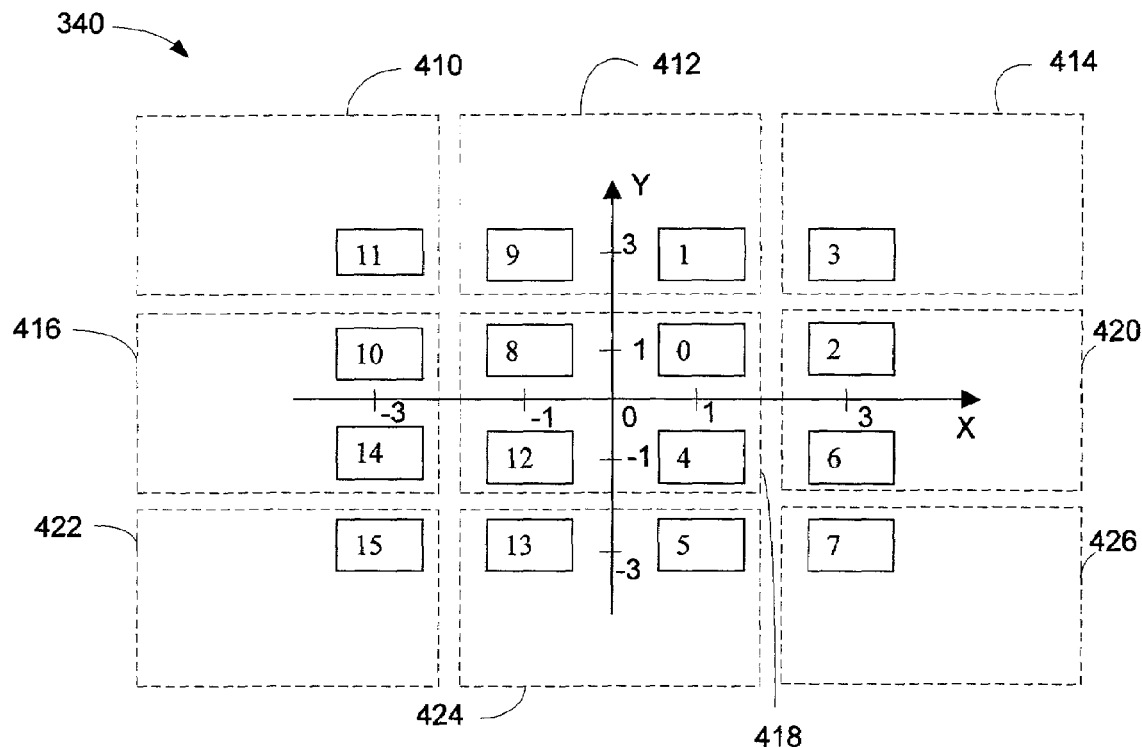
FIG. 12 depicts the grouping of the constellation points of the four-bit constellation of FIG. 9 to generate the six-bit constellation of FIG. 11.

Referring to FIG. 11, in another embodiment, a six-bit constellation that was generated starting with the two-bit constellation of FIG. 1 using the 00-template is shown. As described above, the four bit constellation of FIG. 9 was first generated from the two-bit constellation of FIG. 1. As shown in FIG. 12, to generate the six-bit constellation of FIG. 11, the constellation points of the four-bit constellation of FIG. 9 are associated or grouped into mutually exclusive 2×2 blocks 410–426. In other words, a "grid" of adjacent 2×2 blocks 410–426 is overlaid on the constellation points such that the four constellation points surrounding the origin form one of the 2×2 blocks 418. The block 418 comprising the four constellation points surrounding the origin will be referred to as a center 2×2 block. Depending on the size of the constellation, not all 2×2 blocks may contain four constellation points.

The position of a constellation point within a 2×2 block determines the template that is used to expand that constellation point. For example, the center 2×2 block 418 of FIG. 12 is expanded using the technique of FIG. 10 to generate the sixteen bit block 450 of FIG. 11. In block 420 of FIG. 12, the constellation points labeled "2" and "6" are expanded as constellation points "C" and "D" of FIG. 10, respectively, to generate the eight constellation points of block 452 of FIG. 11. In block 410 of FIG. 12, the constellation point labeled "11" is expanded as constellation point "B" of FIG. 10 to generate the four constellation points of block 454 of FIG. 11. The constellation points of 2×2 blocks 412, 414, 416, 422, 424 and 426 are similarly expanded to generate blocks 456, 458, 460, 462, 464 and 466, respectively.

Some formal results will now be presented for the constellation mapping technique of the present invention.

Proposition 1. If A, B, C, D, and m are integers such that $C<2^m$, $D<2^m$, and $d_H(\ldots,\ldots)$ is the Hamming distance between the binary representations of two integers, then $$d_H(2^m A+C, 2^m B+D) = d_H(A,B) + d_H(C,D) \tag{3.1}$$

Proof:

Binary representations of $2^m A$ and $2^m B$ have zeroes in their m least significant bits. The total number of bits in binary representations of C and D does not exceed m. Therefore, Equation (3.1) follows directly from the definition of the Hamming distance, that is, the total number of different bits in two binary arrays.

The following proposition is based on proposition 1.

Proposition 2. Consider any 2 nearest neighbor constellation points with the Hamming distance of $d_H$ between their labels in a 2n-bit QAM constellation. Suppose, in the (2n+2)-bit constellation generated from this 2n-bit constellation, the constellation points are expanded, as shown in FIG. 10. Then the Hamming distance between the labels of two neighboring constellation points of two different 2×2 blocks generated out of these two constellation points equals $d_H$.

Figure 13:
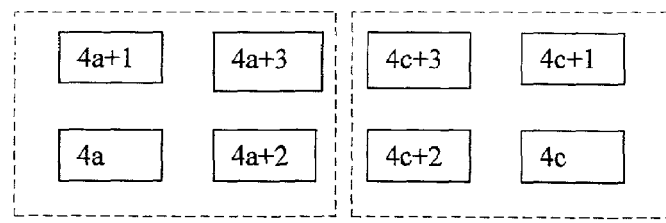
FIG. 13 depicts a case of a constellation point C being to the right of another constellation point A; and this case is used to prove proposition two.

Proof:

Proposition 2 is proven by applying Equation (3.1) at m=2 to any two neighboring constellation points of two different 2×2 blocks generated out constellation points having labels of A and C. FIG. 13 presents the case of constellation point C being to the right of constellation point A. The Hamming distance between the labels of the constellation points resulting from the expansion of constellation points A and C, that is, points "4a+3" and "4c+3", is the same as the Hamming distance of the labels of constellation points A and C. For example, if the label of constellation point A is equal to 0 and the label of constellation point C is equal to 1, their Hamming distance is equal to 1. The labels of the expanded constellation points for A, "3" and "2", generated from "4a+3" and "4a+2", respectively, and for C, "7" and "6," generated from "4c+3" and "4c+2", respectively, also have a Hamming distance equal one. From FIG. 13, it can be seen that the other cases shown in FIG. 10 will also have the same result as to their Hamming distance.

The following proposition follows from Proposition 2.

Proposition 3. Consider a constellation family such that a 2j-bit constellation is generated from a (2j−2)-bit constellation by the "mirroring" technique, as shown in FIG. 10, for j=2, ..., n; and the starting 2-bit constellation is as shown in FIG. 1. Then the Hamming distance between the labels of any two nearest neighbors of the 2n-bit constellation equals 1 regardless of n.

Proof:

This result can be proven by induction. Proposition 3 is correct for n=2 (see FIGS. 1 and 9). Since proposition 3 is also correct for n>2 (e.g., see FIG. 11), applying Proposition 2 proves Proposition 3.

The Hamming distance between the labels of the transmitted and received constellation points characterizes the number of bit errors made when there is a difference between the labels of the received constellation point and the transmitted constellation point. Therefore, Proposition 3 implies that the average number of bit errors in an erroneous QAM symbol, for a constellation encoder of the present invention, is equal to 1. This is two times better than the value of 2 which is typical for standard G.lite and G.dmt-compliant constellation encoders. Also, under the nearest-neighbor-error supposition, the mean square deviation of the number of bit errors in an erroneous tuple is equal to zero for the constellation encoders of the present invention. Therefore, the bit error rate for the constellation encoder for even bit constellations of the present invention does not fluctuate, thus improving the homogeneity of the information flow at the receiver.

The constellations of FIGS. 9 and 11 are part of the same constellation family, referred to as the 00-family, because they were generated using only the 00-configuration of FIG. 10. Other such constellation families are possible. At least four different constellation families, a 00-family, a 01-family, a 10-family and a 11-family, can be constructed depending on whether, in the generating constellations, a specified constellation point in a 2×2 block is expanded using only the 00-template, or 01-template, or 10-template, or 11-template, respectively. In one embodiment, the specified constellation point is the constellation point having coordinates (1, 1), that is, the constellation point in the upper right corner of the center 2×2 block. In an alternate embodiment, any one of the other three constellation points in the center 2×2 block are used as the specified constellation point. For simplicity, the description will refer to a constellation family that is specified in accordance with the (1,1) constellation point.

Figure 14:
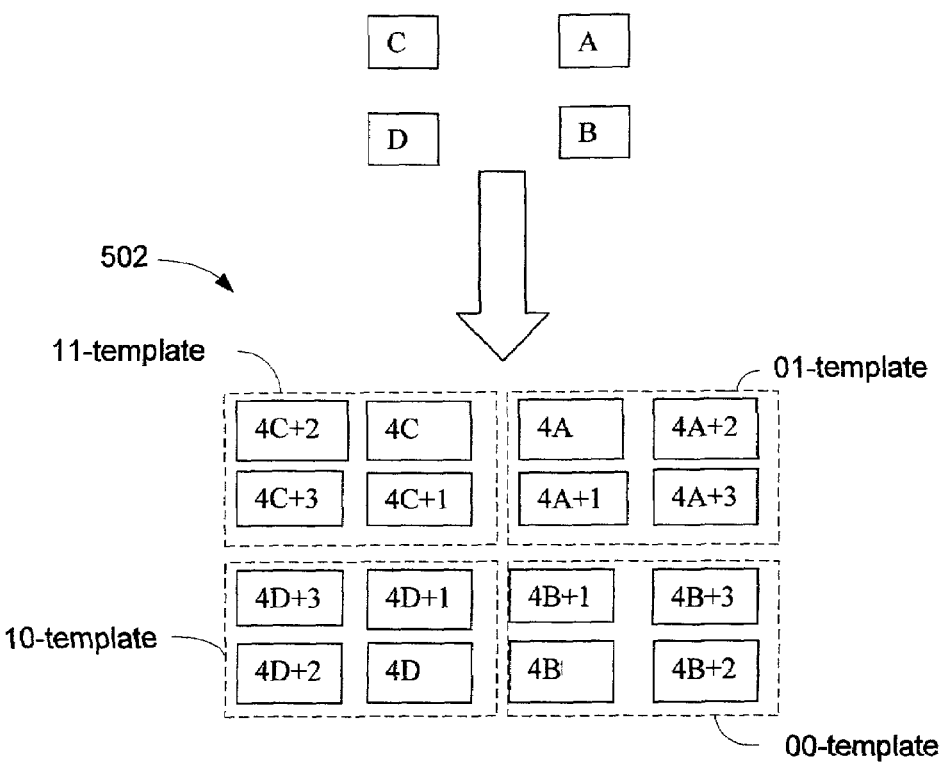
FIG. 14 depicts a template configuration in which a 01-template is used to expand the (1,1) constellation point (A).
Figure 15:
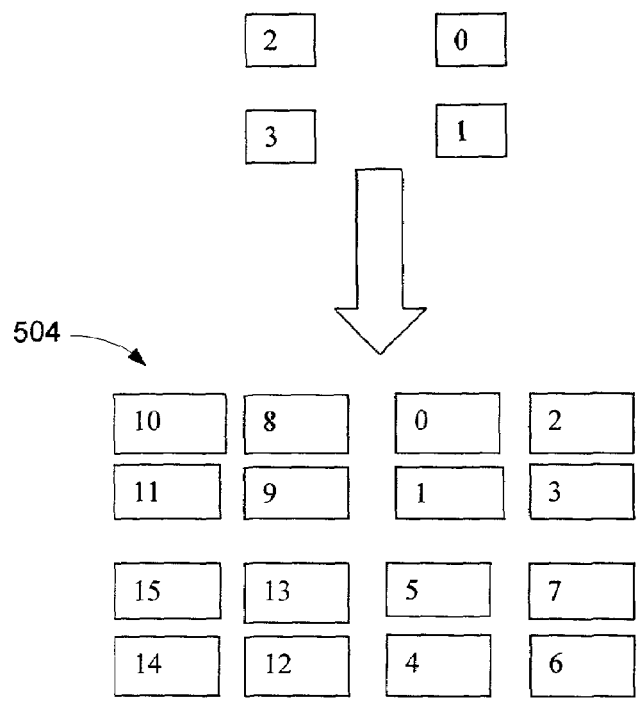
FIG. 15 depicts the result of expanding the two-bit constellation of FIG. 1 into a four-bit constellation using the template configuration of FIG. 14.
Figure 16:
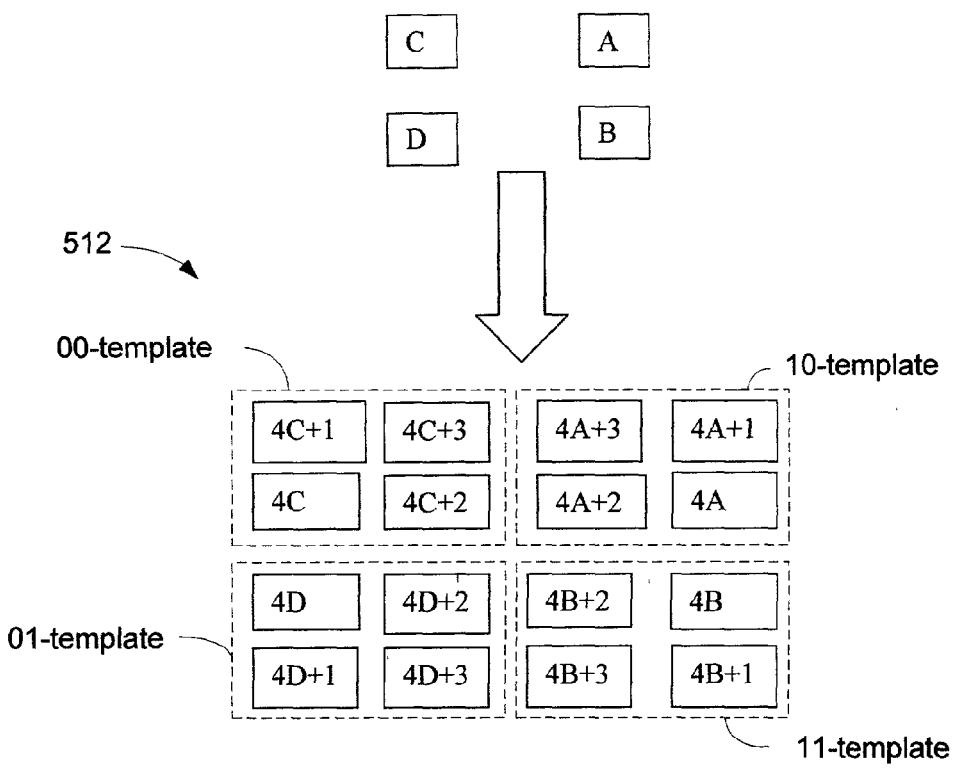
FIG. 16 depicts a template configuration in which a 10-template is used to expand the (1,1) constellation point (A).
Figure 17:
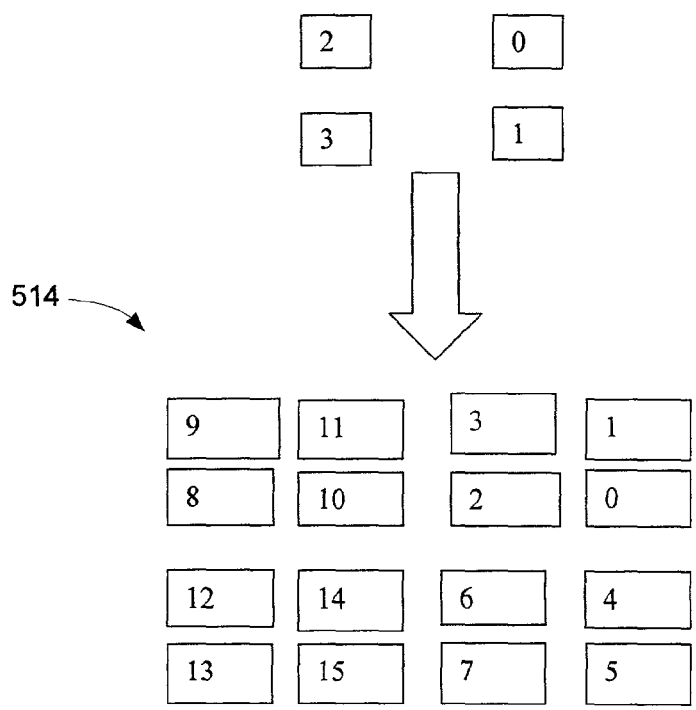
FIG. 17 depicts the result of expanding the two-bit constellation of FIG. 1 into a four bit constellation using the template configuration of FIG. 16.
Figure 18:
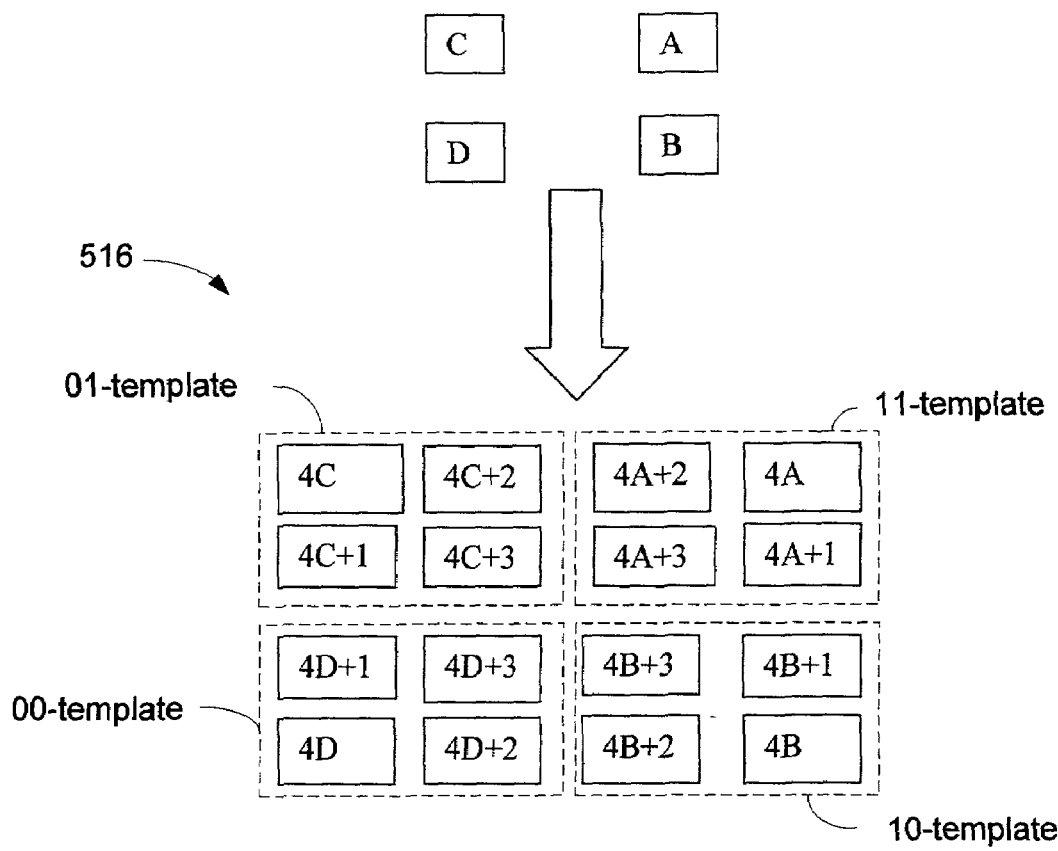
FIG. 18 depicts a template configuration in which a 11-template is used to expand the (1,1) constellation point (A).
Figure 19:
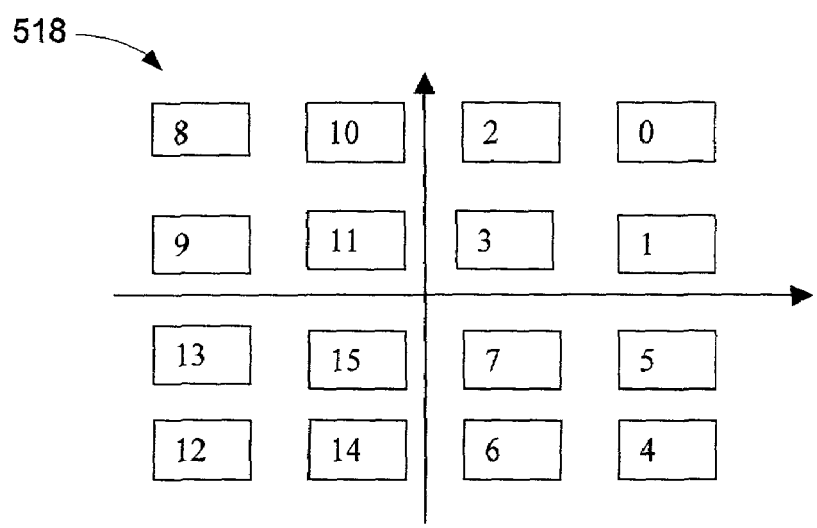
FIG. 19 depicts the result of expanding the two-bit constellation of FIG. 1 into a four bit constellation using the template configuration of FIG. 18.

Other configurations and exemplary constellations will now be described. In FIG. 14, a 01-template is used to expand the (1,1) constellation point (A), and this configuration is referred to as a 01-configuration 502. FIG. 15 depicts the result of expanding the two-bit constellation 100 of FIG. 1 into a four-bit constellation 504 using the 01-configuration 502 of FIG. 14. In FIG. 16, a 10-template is used to expand the (1,1) constellation point (A), and this configuration is referred to as a 10-configuration 512. FIG. 17 depicts the result of expanding the two-bit constellation 100 of FIG. 1 into a four bit constellation 514 using the 10-configuration 512 of FIG. 16. In FIG. 18, a 11-template is used to expand the (1,1) constellation point (A), and this configuration is referred to as a 11-configuration 516. FIG. 19 depicts the result of expanding the two-bit constellation 100 of FIG. 1 into a four bit constellation 518 using the 11-configuration 516 of FIG. 18.

A constellation may be recursively or iteratively expanded using the same configuration for each expansion. The choice of configuration determines the family of constellation encoders. If constellations are expanded using only the 00-configuration, those constellations belong to a 00-family of constellation encoders. If constellations are expanded using only the 01-configuration, those constellations belong to a 01-family of constellation encoders. If constellations are expanded using only the 10-configuration, those constellations belong to a 10-family of constellation encoders. If constellations are expanded using only the 11-configuration, those constellations belong to a 11-family of constellation encoders. For example, FIG. 19 presents a 4-bit constellation generated from the 2-bit constellation of FIG. 1 using a 11-configuration, and therefore belongs to the 11-family of constellation encoders.

Figures 20, 21A, 21B, 21C, 22:
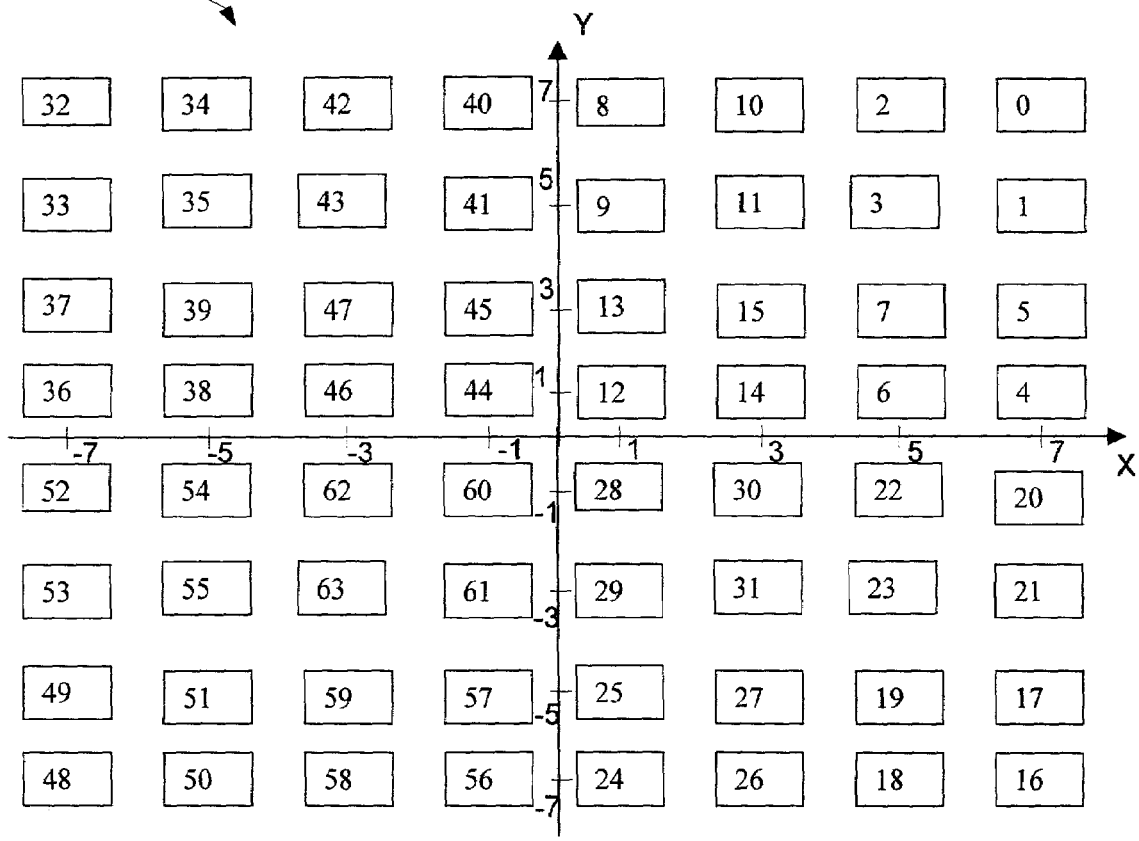
FIG. 20 depicts a general form for defining an expansion sequence for a constellation having n bits.
FIG. 21A depicts an exemplary expansion sequence.
FIG. 21B depicts an embodiment of an exemplary expansion sequence table that stores the expansion sequence of FIG. 21A in memory.
FIG. 21C depicts an alternate embodiment of an exemplary expansion sequence table that stores the expansion sequence of FIG. 21A in memory.
FIG. 22 depicts an exemplary six bit constellation that was generated by an expansion sequence that uses different template configurations.

Referring to FIG. 20, in another embodiment, different configurations are used to iteratively expand a constellation. An expansion sequence is an array of pairs that specify a constellation bit size and the type of configuration used to expand that constellation. In FIG. 20, a general form for defining an expansion sequence for a constellation having n bits is shown. The first variable, j, defines the size (in bits) of the source constellation to be expanded. The second variable configuration (j) defines configuration used to expand the source constellation.

FIG. 21A depicts an exemplary expansion sequence. The first pair (2,00) specifies that for a two bit constellation, a 00-configuration is used to expand the two-bit constellation to produce a four-bit constellation. The second pair (4,01) specifies that a 01-configuration is used to expand the four-bit constellation to produce a six-bit constellation. The third pair (6,10) specifies that a 10-configuration is used to expand the six-bit constellation to produce an eight bit constellation. The fourth pair (8,01) specifies that a 01-configuration is used to expand the eight bit constellation to produce a ten bit constellation. The fifth pair (10,11) specifies that a 11-configuration is used to expand the ten bit constellation to produce a twelve bit constellation.

FIG. 21B depicts an embodiment of an exemplary expansion sequence table that stores the expansion sequence of FIG. 21A in memory. The left column stores the constellation size j, and the right column stores two bits representing the configuration.

FIG. 21C depicts an alternate embodiment of an exemplary expansion sequence table that stores the expansion sequence of FIG. 21A in memory. In this embodiment, the left column stores a value i that is equal to j/2, and the right column stores two bits representing the configuration associated with that value of i.

Referring to FIG. 22, an exemplary six bit constellation 560 in accordance with another embodiment of the present invention is shown. The expansion sequence for constellation 560 is (2,11), (4,00).

4. Encoding and Decoding Technique for a 00-Family of Constellations

An encoding technique for a 00-family of constellations will now be described. The 00-family of constellations is generated by, starting with the two-bit constellation of FIG. 1, applying the 00-configuration to repeatedly expand each constellation point of a constellation until a desired constellation size is reached. The encoding technique used by a constellation encoder to encode a constellation in the 00-family of constellations is described below.

Encoding Technique for a Constellation of the 00-Family

Figure 23:
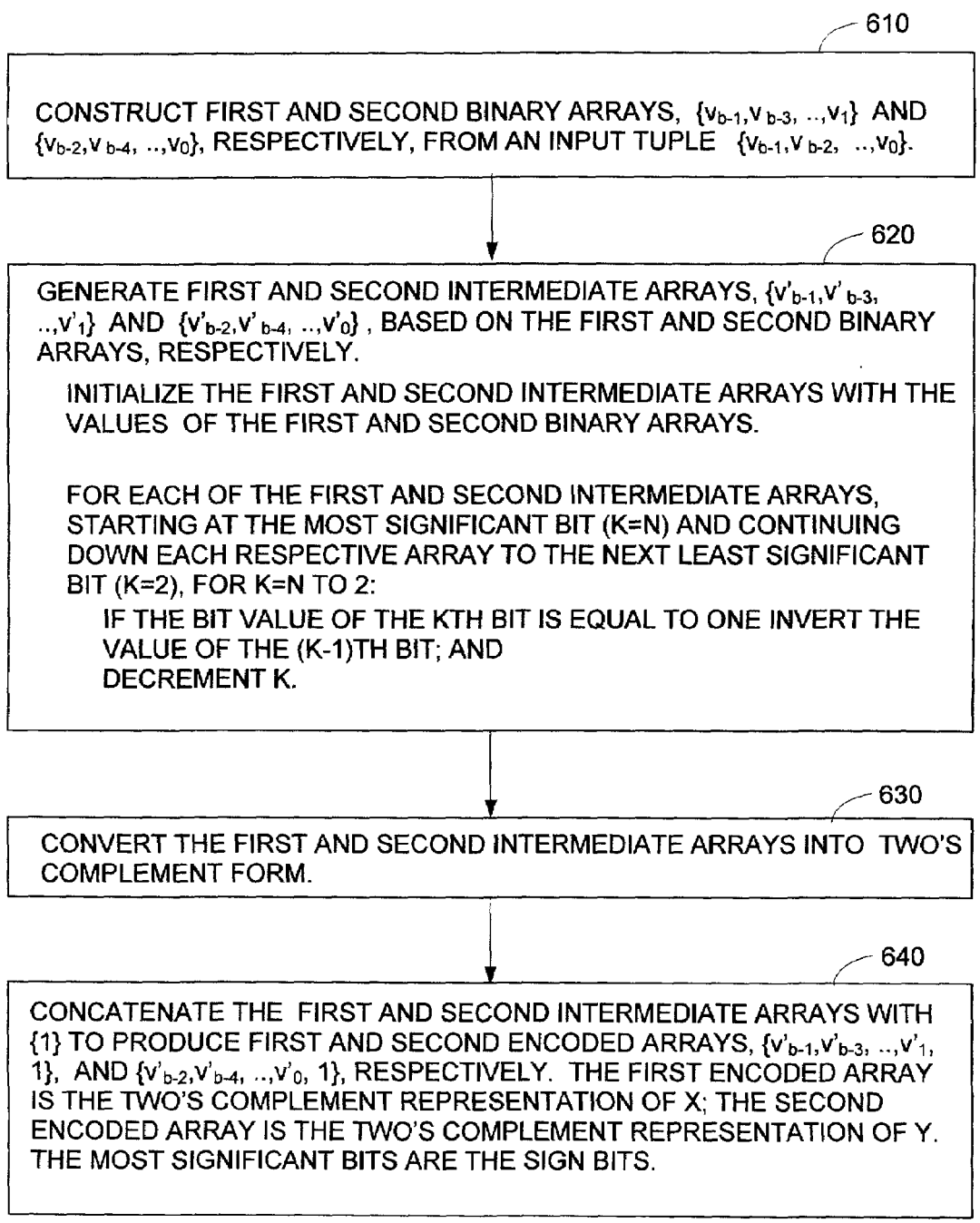
FIG. 23 is a flowchart illustrating an embodiment of a method for encoding a constellation of the 00-family of the present invention.

Referring to FIG. 23, an embodiment of a method for encoding a constellation of the 00-family of the present invention is shown. In a constellation family, the 2j-bit constellation is generated from the (2j−2)-bit constellation by the "mirroring" technique, as shown in FIG. 10, for j=2, . . . , n. At j=2, the starting 2-bit constellation is shown in FIG. 1; and for all j=2, . . . , n, w the (1,1) point is expanded using the 00-template. In other words, the 00-configuration is always used to expand the constellation. Then for a 2n-bit constellation, the encoding technique determines an odd-integer constellation point (X,Y) based on the binary b-bit (b=2n) representation of an input tuple of bits $\{v_{b-1}, v_{b-2}, \ldots, v_1, v_0\}$, as follows:

(i) In step 610, construct two binary n-bit arrays, a first binary array $\{v_{b-1}, v_{b-3}, \ldots, v_1\}$ and a second binary array $\{v_{b-2}, v_{b-4}, \ldots, v_0\}$ based on the input tuple.

(ii) In step 620, first and second intermediate arrays, $\{v'_{b-1}, v'_{b-3}, \ldots, v'_1\}$ and $\{v'_{b-2}, v'_{b-4}, \ldots, v'_0\}$ are generated based on the first and second binary arrays, $\{v_{b-1}, v_{b-3}, \ldots, v_1\}$ and $\{v_{b-2}, v_{b-4}, \ldots, v_0\}$, respectively. The bits of the binary arrays and the intermediate arrays will be referenced by a variable k having values of 1 to n, such that the most significant bit of each array ($v'_{b-1}$ and $v'_{b-2}$) is referenced when k is equal to n, and the least significant bit of each n-bit array referenced when k is equal to 1 ($v'_1$ and $v'_0$). A first intermediate array is initialized with the values of the first binary array, and a second intermediate array is initialized with the values of the second binary array. This effectively copies the most significant bit from the first and second binary arrays to the first and second intermediate arrays, respectively.

For each of the first and second intermediate arrays, for k=n to 2, if the bit value of the $k^{th}$ bit of the intermediate array is equal to one, invert the $(k-1)^{th}$ bit, and decrement k until k is equal to 2.

(iii) In step 630, convert the first and second intermediate arrays obtained in step 620 into two's complement form.

(iv) In step 640, concatenate the first and second intermediate arrays obtained in step 630 with {1} to produce first and second encoded arrays, respectively. The first encoded array, $\{v'_{b-1}, v'_{b-3}, \ldots, v'_1, 1\}$, is the two's complement binary representation of X; the second encoded array, $\{v'_{b-2}, v'_{b-4}, \ldots, v'_0, 1\}$, is the two's complement binary representation of Y. The most significant bits are the sign bits. In an alternate embodiment, step 630 is combined with step 640. In yet another alternate embodiment, step 630 is omitted.

Proof:

The correctness of this encoding technique will now be proven by induction. For n=2, the correctness of the encoding technique can be checked by comparing the X and Y values resulting from encoding an input tuple having four bits to the constellation of FIG. 9. Now assuming that the encoding technique is correct for values of n>2, i.e., that the 2n-bit constellation was generated recursively using the "mirroring" method and the relationship between the coordinates of each constellation point and its label value is described by steps 610–640 above, to prove the correctness of this encoding technique at n+1, several cases are considered:

Case 1: The (2n−2)-bit constellation point is expanded as the point labeled A in FIG. 10 using the 00-template. All points of that kind have coordinates X=2*M+1, Y=2*N+1, for some even integers M and N, because the point with coordinates (1, 1) is always expanded using the 00-template. Since M and N have binary representations of $\{v'_{b-1}, v'_{b-3}, \ldots, v'_1\}$, and $\{v'_{b-2}, v'_{b-4}, \ldots, v'_0\}$, respectively, $v'_1$ and $v'_0$ are both equal to 0. Next, the (2n−2)-bit constellation point expands into a 2×2 block of 2n-bit points labeled 4*A, 4*A+1, 4*A+3, and 4*A+2 (from the lower left corner clockwise). The binary representation of each new label looks like a concatenation of $\{v_{b-1}, v_{b-2}, \ldots, v_1, v_0\}$ and one of the arrays {0,0}, {0,1}, {1,1}, {1,0}, respectively. Applying steps 610–640 to each of these representations, the new 2n-bit points have coordinates of (4*M+1, 4*N+1), (4*M+1, 4*N+3), (4*M+3, 4*N+3), (4*M+3, 4*N+1) (from the lower left corner clockwise). For each 2n-bit constellation point in this case, the $2^{nd}$ least significant bits in both intermediate arrays obtained in step 630 are the same as the least significant bits in binary representations of M and N. Since the latter were shown to be equal to 0, the least significant bits in these arrays will not be inverted. This completes the proof for case 1.

Figure 24:
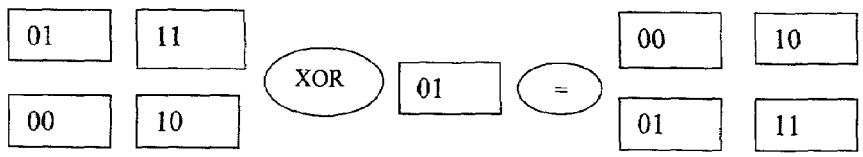
FIG. 24 illustrates the modification in the last two bits of labels of a 2n-bit constellation between constellation points that are expanded using the 00-template (A) versus constellation points that are expanded using the 01-template (B).

Case 2: The (2n−2)-bit constellation point is expanded as the point labeled B using the 01-template of FIG. 10. All points of that kind have coordinates X=2*M+1, Y=2*N+1, for some even M and odd N. Since M and N have binary representations, $\{v'_{b-1}, v'_{b-3}, \ldots, v'_1\}$ and $\{v'_{b-2}, v'_{b-4}, \ldots, v'_0\}$, respectively, $v'_1 = v_1 = 0$ and $v'_0 = v_0 = 1$. Next, the (2n−2)-bit constellation point expands into a 2×2 block of 2n-bit constellation points labeled 4*B+1, 4*B, 4*B+2, and 4*B+3 (from the lower left corner clockwise). The binary representation of each new label looks like the concatenation of $\{v_{b-1}, v_{b-2}, \ldots, v_1, v_0\}$ and one of the arrays {0,1}, {0,0}, {1,0}, {1,1}, respectively. Applying the 01-template can be represented as applying the 00-template followed by interchanging the rows of the resulting 2×2 block of labels. FIG. 24 illustrates the modification in the last two bits of labels of a 2n-bit constellation between constellation points that are expanded using the 00-template (A) versus constellation points that are expanded using the 01-template (B). In FIG. 24, the "+" sign designates an exclusive-OR operation (modulo 2 addition). FIG. 24 shows that the interchanging of the rows is equivalent to inverting the least significant bit in the binary representations of labels in this block. Taking into account that, for each 2n-bit constellation point here, the $2^{nd}$ least significant bit in the intermediate array for Y obtained in step 630 is shown to be equal to the least significant bits in the binary representation of N, i.e., equals 1, proves this case.

Case 3: The 2n-bit constellation point expanded is the point labeled C in FIG. 10. The proof is the same as above for case 2 except that the X and Y coordinates change roles, therefore the least significant bits, $v_1 = 1$ and $v_0 = 0$.

Case 4: The 2n-constellation point expanded is the point labeled D in FIG. 10. The proof is a combination of the proofs for cases 2 and 3 above, therefore the least significant bits, $v_1 = 1$ and $v_0 = 1$.

In an alternate embodiment, step 630 is not performed. In another alternate embodiment, the intermediate arrays are not used, and the bitwise operations are performed directly on the first and second binary arrays.

Referring also to FIG. 11, examples of the encoding technique, described above, will now be provided. For example, an input tuple has the following bit sequence: (001010). In this example, the constellation has six bits (b=6) and the value of n is equal to three.

Applying step 610, the first binary array is equal to {011} and the second binary array is equal to {000}.

In step 620, the values in the first and second binary arrays are copied to first and second intermediate arrays, respectively. Then step 620 is further applied to the first intermediate array as follows: For k=3 to 2, if the value of the kth bit is equal to one, invert the (k−1)th bit and decrement k. Hence, for k=3, if the value of bit 3 is equal to one, invert bit 2. Since the most significant bit (bit 3) of the first intermediate array is equal to 0, the value of bit 2 is not inverted and the first intermediate array is equal to {011}. For k=2, if the value of bit 2 is equal to one, invert bit 1. Since the value of bit 2 of the first intermediate array is equal to one, the value of bit 1 is inverted to produce a first intermediate array equal to {010}.

Step 620 is also applied to the second intermediate array. Since all values in the second intermediate array are equal to zero, no inversions occur and the second intermediate array equal to {000}.

Step 630 converts the first and second intermediate arrays into two's complement form. Note that this step does not affect the bit values of the first and second intermediate arrays.

In step 640, the first and second intermediate arrays are concatenated with {1} to produce first and second encoded arrays having values of {0101} and {0001}, respectively. Therefore, the decimal value of the two's complement representation of the X coordinate is equal to 5, and the decimal value of the two's complement representation of the Y coordinate is equal to 1. Referring back to FIG. 11, the input tuple having a decimal label of "10", which corresponds to a binary value of {001010}, has an (X,Y) coordinate of (5,1).

In another example, an input tuple has the following bit sequence: (110111). Applying step 610, the first binary array is equal to {101} and the second binary array is equal to {111}.

In step 620, the values in the first and second binary arrays are copied to first and second intermediate arrays, respectively. Then step 620 is further applied to the first intermediate array as follows: For k=3 to 2, if the value of the kth bit is equal to one, invert the (k–1)th bit and decrement k. Hence, for k=3, if the value of bit 3 is equal to one, invert bit 2. Since the most significant bit (bit 3) of the first intermediate array is equal to 1, the value of bit 2 is inverted and the first intermediate array is equal to {111}. For k=2, if the value of bit 2 is equal to one, invert bit 1. Since the value of bit 2 of the first intermediate array is now equal to one, the value of bit 1 is inverted to produce a first intermediate array equal to {110}.

Step 620 is also applied to the second intermediate array which results in the second intermediate array equal to {101}.

Step 630 converts the first and second intermediate arrays into two's complement form. Note that this step does not affect the bit values of the first and second intermediate arrays.

In step 640, the first and second intermediate arrays are concatenated with {1} to produce first and second encoded arrays having values of {1101} and {1011}, respectively. The two's complement representation of a –3 is {1101}, and of a –5 is {1011}. Therefore, the decimal value of the two's complement representation of the value of the first encoded array, the X coordinate, is equal to a –3. The decimal value of the two's complement representation of the value in the second encoded array, the Y coordinate, is equal to –5.

Referring back to FIG. 11, the input tuple having a decimal label of "55", which corresponds to a binary value of {110111}, has an (X,Y) coordinate of (–3,–5).

Next a method of decoding constellations of the 00-family will be described.

Decoding Technique for a Constellation of the 00-Family

Figure 25:
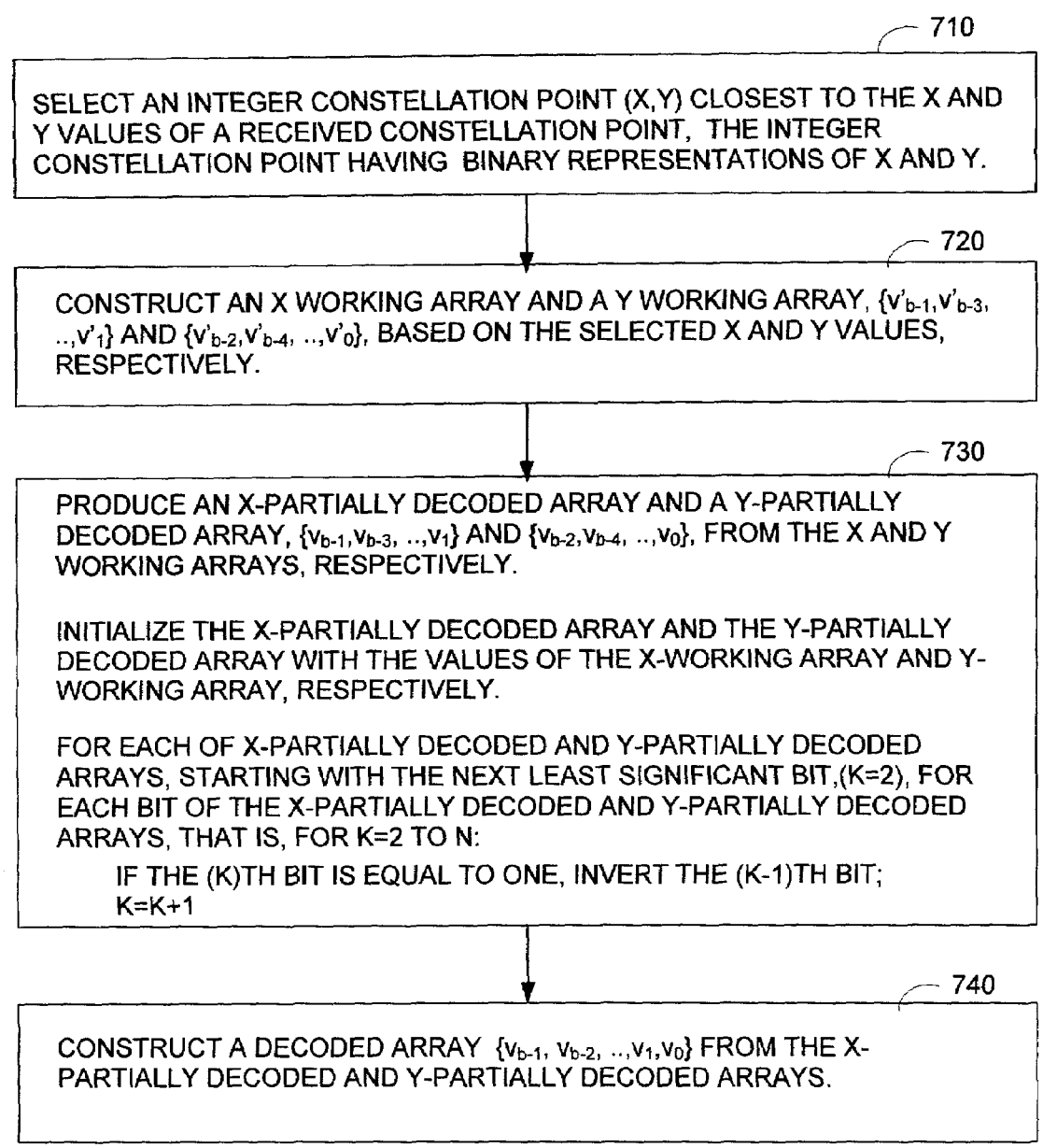
FIG. 25 is a flowchart illustrating an embodiment of a method for decoding a constellation in the 00-family of the present invention.

Referring to FIG. 25, a flowchart illustrates an embodiment of the decoding method of the present invention. In a constellation family, the 2j-bit constellation is generated from the (2j–2)-bit constellation by the "mirroring" technique, as shown in FIG. 10, for j=2, . . . , n. At j=2, the starting 2-bit constellation is as shown in FIG. 1; and for all j=2, . . . , n, constellations are expanded using the 00-configuration. Then for a 2n-bit constellation, the decoding technique is as follows:

(i) In step 710, select an odd-integer constellation point having selected coordinates (X,Y) that are closest to the coordinates (XR,YR) of a received constellation point, and construct binary representations of the selected coordinates X and Y, in which each binary representation has n+1 bits, which results in two (n+1)-bit arrays, referred to as an X-received array $\{v'_{b-1}, v'_{b-3}, \ldots, v'_1, 1\}$ and a Y-received array $\{v'_{b-2}, v'_{b-4}, \ldots, v'_0, 1\}$, where b=2n. Note that because X and Y are odd integers, the least significant bit is equal to one.

(ii) In step 720, construct two working n-bit arrays, an X working array $\{v'_{b-1}, v'_{b-3}, \ldots, v'_1\}$ and a Y working array $\{v'_{b-2}, v'_{b-4}, \ldots, v'_0\}$. Note that the X and Y working arrays are the same as the X-received and Y-received arrays, respectively, except that the least significant bit of the X-received and Y-received arrays, the {1}, is dropped.

(iii) In step 730, an X-partially-decoded array and a Y-partially-decoded array, $\{v_{b-1}, v_{b-3}, \ldots, v_1\}$ and $\{v_{b-2}, v_{b-4}, \ldots, v_0\}$, are produced from the X and Y working arrays, respectively. The bits of the X and Y working arrays will be referenced by a variable k having values of 1 to n, such that the most significant bit of each n-bit array is referenced when k is equal to n, and the least significant bit of each n-bit array referenced when k is equal to 1. The X and Y working arrays are initialized with the values of the X-received and Y-received arrays, respectively. For each of the X working and Y working arrays, starting with the next least significant bit (k=2), for k=2 to k=n, if the $k^{th}$ bit is equal to one, invert the $(k-1)^{th}$ bit, and increment k until k=n, to produce an X-partially-decoded array and a Y-partially-decoded array, $\{v_{b-1}, v_{b-3}, \ldots, v_1\}$ and $\{v_{b-2}, v_{b-4}, \ldots, v_0\}$, respectively.

(iv) In step 740, a decoded array $\{v_{b-1}, v_{b-2}, \ldots, v_1, v_0\}$ is constructed from the bits of the X-partially-decoded array and the Y-partially-decoded array.

Proof:

Because decoding performs the steps of encoding in reverse, and because the encoding technique has been proven above, the decoding technique is also correct.

Referring also to FIG. 11, an example of the decoding technique will now be described. In this case, in step 710, the selected constellation point has an X-received array equal to {0111}, and a Y-received array equal to {1011}. In step 720, the X working array is equal to {011}, and the Y working array is equal to {101}.

In step 730, each working array has n bits, thus value of n is equal to three. For each of the X and Y working arrays, starting with the next least significant bit (k=2), if bit 2 is equal to one, invert bit 1. For simplicity, the further application of step 730 will be described separately for the X and Y working arrays. In the X working array, since bit 2 is equal to 1, bit 1 is inverted to produce an X working array of {010}. Since bit 3 is equal to 0, bit 2 is not inverted to produce an X working array of {010}, and the X-partially-decoded array is equal to {010}.

Since bit 2 of the Y working array is equal to 0, bit 1 is not inverted to produce a Y working array of {101}. Since bit 3 of the Y working array is equal to 1, bit 2 is inverted to produce a Y working array of {111} which becomes the Y-partially-decoded array.

In step 740, the X-partially-decoded and the Y-partially decoded arrays are combined to produce a decoded array of {011101}. The decoded array has a decimal value of 29. Referring to FIG. 11, the constellation point having label 29 has an (X,Y) coordinate of (7,–5) which corresponds to the X-received and Y-received arrays.

5. General Technique for Encoding and Decoding

This section provides a general technique for encoding and decoding constellations of the present invention using different constellation families, defined by an expansion sequence. A constellation family may be represented as an expansion sequence. For example, the 11-constellation family may be represented as: (2,11), (4,11), (6,11), (8, 11) . . . . The term "constellation family" also includes those constellations that were generated using different configurations and are represented by an expansion sequence.

General Encoding Technique

Figure 26A:
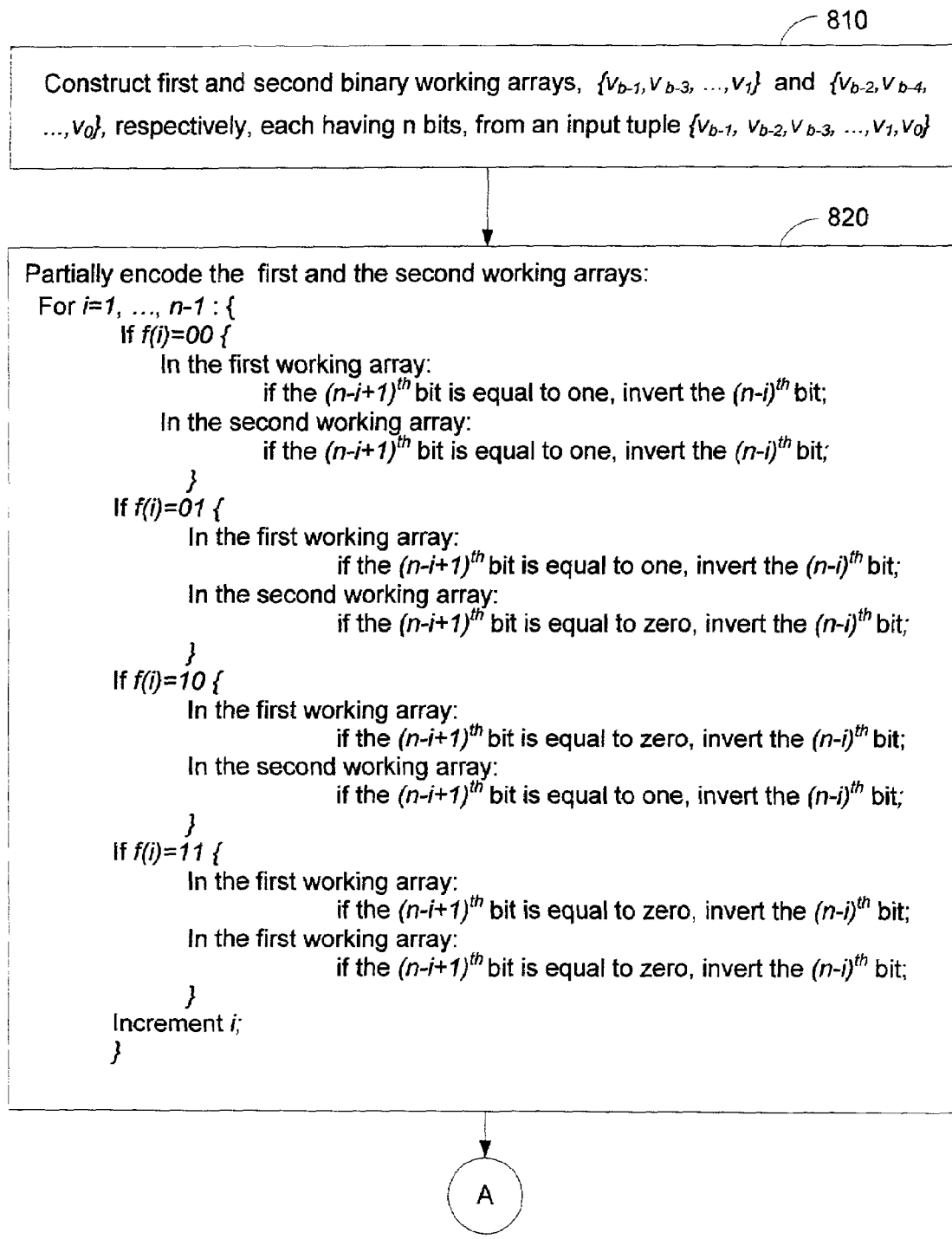
FIGS. 26A and 26B are a flowchart of a general method of encoding in accordance with an embodiment of the present invention.
Figure 26B:
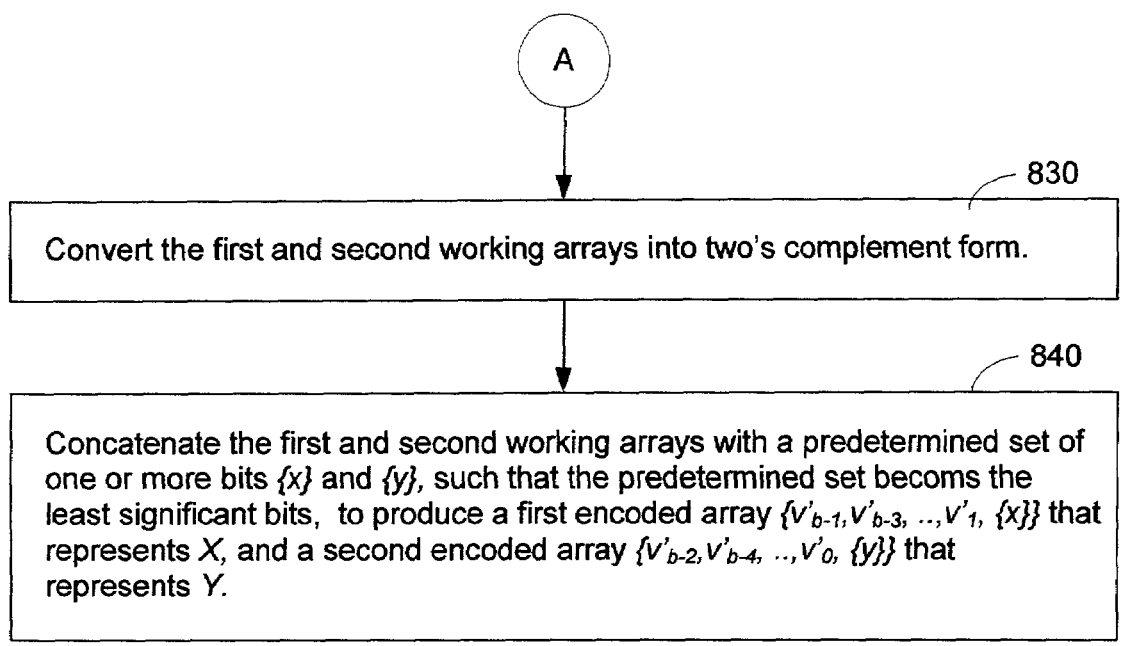

Referring to FIGS. 26A and 26B, a flowchart of a general method of encoding in accordance with the present invention is shown.

Consider a constellation family such that the 2j-bit constellation is generated from the (2j−2)-bit constellation by the "mirroring" technique, described above, for j=2, . . . , n. At j=2, the starting 2-bit constellation is as shown in FIG. 1; and there is an expansion sequence {j, f(j)}, j=2, . . . , n, defined so that the (1,1) point in the 2j-bit constellation is expanded using the f(j)-configuration. In other words, f(j) refers to a specified configuration that was used to expand that constellation. As described above with respect to FIG. 20, the expansion sequence has even values for the size of the constellation. Alternately, the expansion sequence may also be represented as {i, f(j)}, where i=j/2. Referring to FIG. 21C, an expansion sequence table having values for i and f(j) is stored in a table in memory. This table is referenced below. For the 2n-bit constellation, the encoding technique selects an integer constellation point (X,Y) based on the binary b-bit (b=2n) representation of an input tuple $\{v_{b-1}, v_{b-2}, \ldots, v_1, v_0\}$, as follows:

(i) In step 810, construct first and second working arrays, $\{v_{b-1}, v_{b-3}, \ldots, v_1\}$ and $(v_{b-2}, v_{b-4}, \ldots, v_0)$, respectively, each having n bits, from the input tuple.

(ii) In step 820, the first and the second working arrays are partially encoded. The bits of the first and second working arrays are referenced such that the most significant bit is the $n^{th}$ bit, and the least significant bit is the "1" bit. The working arrays are analyzed starting with the most significant bit.

For i=1, . . . , n−1, perform the following: {
  If f(i)=00 {
    In the first working array: if the $(n-i-1)^{th}$ bit is equal to one, invert the $(n-i)^{th}$ bit;
    In the second working array: if the $(n-i+1)^{th}$ bit is equal to one, invert the $(n-i)^{th}$ bit;
  }
  If f(i)=01 {
    In the first working array: if the $(n-i+1)^{th}$ bit is equal to one, invert the $(n-i)^{th}$ bit;
    In the second working array: if the $(n-i+1)^{th}$ bit is equal to zero, invert the $(n-i)^{th}$ bit;
  }
  If f(i)=10 {
    In the first working array: if the $(n-i+1)^{th}$ bit is equal to zero, invert the $(n-i)^{th}$ bit;
    In the second working array: if the $(n-i1)^{th}$ bit is equal to one, invert the $(n-i)^{th}$ bit;
  }
  If f(i)=01 {
    In the first working array: if the $(n-i+1)^{th}$ bit is equal to zero, invert the $(n-i)^{th}$ bit;
    In the first working array: if the $(n-i+1)^{th}$ bit is equal to zero, invert the $(n-i)^{th}$ bit;
  }
  Increment i;
}

(iii) In step 830, convert the first and second working arrays into two's complement form. In an alternate embodiment, step 830 is not performed.

(iv) In step 840, concatenate the first and second working arrays with a predetermined set of one or more bits {x} and {y}, such that the predetermined set becomes the least significant bits, to produce a first encoded array $\{v'_{b-1}, v'_{b-3}, \ldots, v'_1, \{x\}\}$ that represents X, and a second encoded array $\{v'_{b-2}, v'_{b-4}, \ldots, v'_0, \{y\}\}$ that represents Y.

The most significant bits are the sign bits. In one embodiment, the predetermined sets {x} and {y} are equal to {1}.

In an alternate embodiment, the predetermined sets x and y are binary representations of odd integers. In yet another alternate embodiment, the predetermined sets x and y are binary representations of even integers. In another embodiment one of the predetermined sets is a binary representation of an even integer and the other predetermined set is a binary representation of an odd integer.

Referring back to FIG. 22, for example, a constellation generated by an expansion sequence of (2,11), (4,00) is shown. The expansion sequence is alternately represented as (1,11), (2,00), and stored in an expansion sequence table in memory.

For example, the input tuple {110101} will be encoded. In step 810, the first working array is {100} and the second working array is {111}. Each binary working array has three bits, thus n is equal to three.

In step 820, the first and second working arrays are partially encoded. Step 820 will first be discussed with respect to the first working array. Initially, a counter and bit pointer i is equal to one. The expansion sequence table is referenced to determine f(i). Since f(1) is equal to 11, if bit 3 of the first working array is equal to zero, invert bit 2. In this case bit 3 is equal to 1, therefore, bit two is not inverted and the first working array remains as {100}. The counter i is incremented. Next, since f(2) is equal to 00, if bit 2 is equal to one, invert bit 1. In this case bit 2 is equal to 0, and bit one is not inverted thus providing a first partially encoded array of {100}.

Now, the second working array will be analyzed. Since f(1) is equal to 11, if bit 3 of the second working array is equal to 0, invert bit 2. In this case, bit 3 of the second working array is equal to 1, therefore bit 2 is not inverted and the second working array is {111}. Since f(2) is equal to 00, since bit 2 is equal to 1, bit 1 is inverted and the second partially decoded array is equal to {110}.

Step 830 is omitted. In step 840, a {1} is concatenated with the first and second partially decoded arrays to produce first and second encoded arrays of {1001} and {1101}, representing X and Y, respectively.

Referring to FIG. 22, the first encoded array, X, represents a −7 and the second encoded array, Y, represents a −3. In FIG. 22, the constellation point associated with coordinates of (−7,−3) has a label of 53 which has the same binary value as the input tuple.

Referring back to FIGS. 26A and 26B, in another alternate embodiment, a method of encoding using the 11-family will be described. This method is the same as in FIGS. 26A and 26B except that step 820 is simplified to:

For i=1, . . . n−1 {
  In the first working array: if the $(n-i+1)^{th}$ bit is equal to zero, invert the $(n-i)^{th}$ bit
  In the second working array: if the $(n-i+1)^{th}$ bit is equal to zero, invert the $(n-i)^{th}$ bit
}
Increment i
}

In yet another alternate embodiment, a method of encoding using the 01-family will be described. This method is the same as in FIGS. 26A and 26B except that step 820 is simplified to:

For i=1, . . . n−1 {
  In the first working array: if the $(n-i+1)^{th}$ bit is equal to one, invert the $(n-i)^{th}$ bit In the second working array: if the (n-i+)$^{th}$ bit is equal to zero, invert the (n-i)$^{th}$ bit
}
Increment i
}

In another embodiment, a method of encoding using the 10-family will be described. This method is the same as in FIGS. 26A and 26B except that step 820 is simplified to:
For i=1, . . . n−1{
In the first working array: if the (n-i+1)$^{th}$ bit is equal to zero, invert the (n-i)$^{th}$ bit
In the second working array: if the (n-i+1)$^{th}$ bit is equal to one, invert the (n-i)$^{th}$ bit
{
Increment i
}

General Decoding Technique

Figure 27:
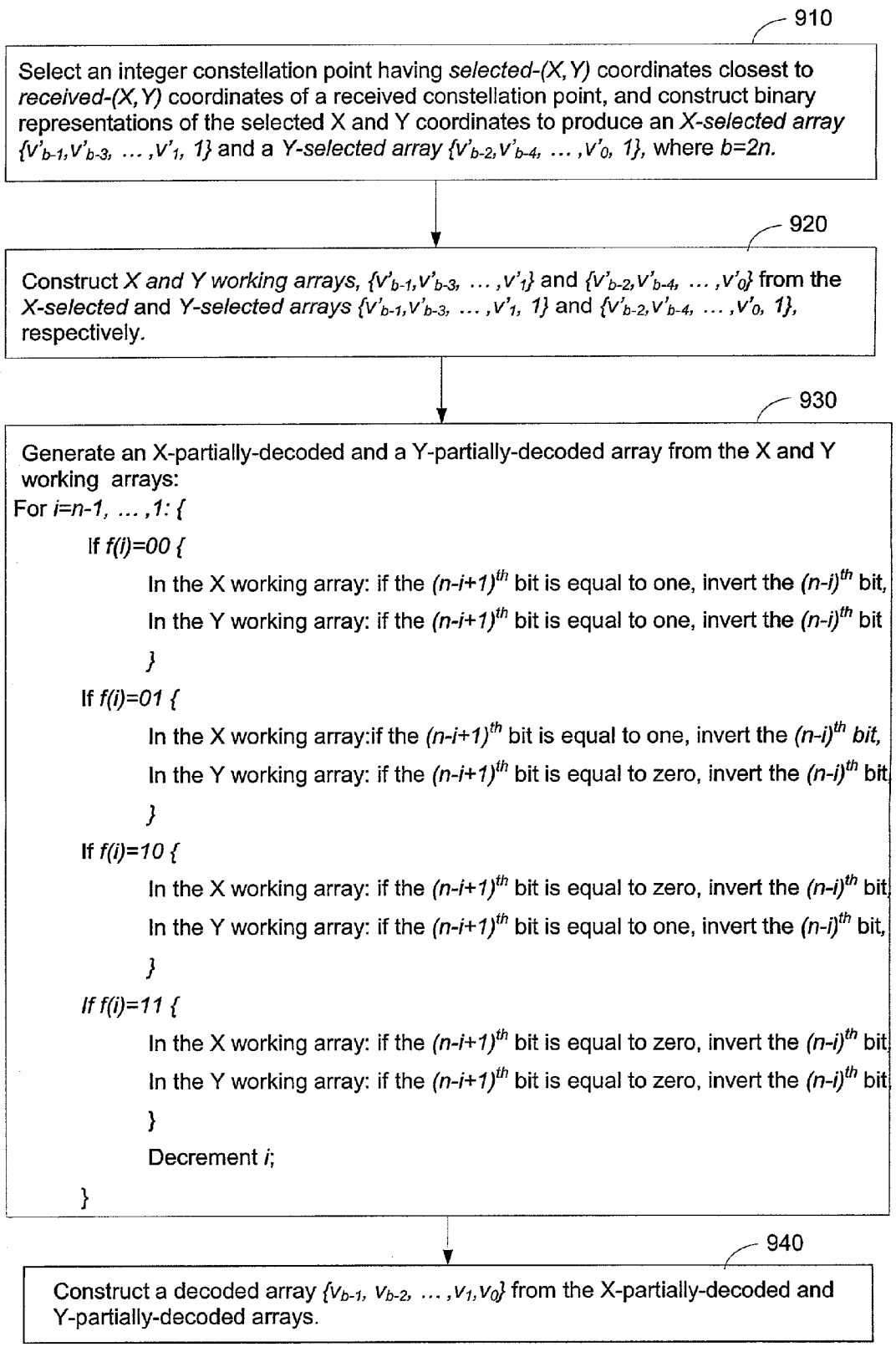
FIG. 27 is a flowchart of a general method of decoding in accordance with an embodiment of the present invention.

Referring to FIG. 27, a flowchart of a general decoding technique is shown.

In a constellation family, the 2j-bit constellation is generated from the (2j−2)-bit constellation using the "mirroring" technique described above, for j=2, . . . , n. At j=2, the starting 2-bit constellation is as shown in FIG. 1; and there is an expansion sequence {j, f(j)}, j=2, . . . , n, defined such that the (1,1) point in the 2j-bit constellation is expanded using the f(j)-template. In other words, f(j) refers to a specified configuration. Alternately, the expansion sequence is represented as {i, f(i)}, where i=j/2, and stored in an expansion sequence table. The expansion sequence table is referenced below. For a 2n-bit constellation, the decoding technique comprises:

(i) In step 910, select an integer constellation point having selected-(X,Y) coordinates closest to received-(X,Y) coordinates of a received constellation point, and construct binary representations of the selected X and Y coordinates to produce an X-selected array {v'$_{b-1}$, v'$_{b-3}$, . . . , v'$_1$, 1} and a Y-selected array {v'$_{b-2}$, v'$_{b-4}$, . . . , v'$_0$, 1}, where b=2n, and the X-selected and Y-selected arrays have n+1 bits. In this embodiment, the selected-(X,Y) coordinates are odd. The selected-(X,Y) coordinates use the same constellation that was used for encoding. In an alternate embodiment, the selected-(X,Y) coordinates are even. In yet another alternate embodiment, one of the selected-(X,Y) coordinates is even and the other is odd. In yet another embodiment, the X-selected and Y-selected arrays have n+t bits where t represents a number of bits concatenated onto a partially encoded constellation point.

(ii) In step 920, construct X and Y working arrays, {v'$_{b-1}$, v'$_{b-3}$, . . . , v'$_1$} and {v'$_{b-2}$, v'$_{b-4}$, . . . , v'$_0$} from the X-selected and Y-selected arrays {v'$_{b-1}$, v'$_{b-3}$, . . . , v'$_1$, 1} and {v'$_{b-2}$, v'$_{b-4}$, . . . , v'$_0$, 1}, respectively.

(iii) In step 930, generate an X-partially-decoded and a Y-partially-decoded array from the X and Y working arrays. The bits of the X and Y working arrays will be referenced such that bit "n" is the most significant bit and bit "1" is the least significant bit.

For i=n−1, . . . , 1:
{
If f(i)=00 {
In the X working array: if the (n-i+1)$^{th}$ bit is equal to one, invert the (n-i)$^{th}$ bit,
In the Y working array: if the (n-i+1)$^{th}$ bit is equal to one, invert the (n-i)$^{th}$ bit
}

If f(i)=01 {
In the X working array: if the (n-i+1)$^{th}$ bit is equal to one, invert the (n-i)$^{th}$ bit,
In the Y working array: if the (n-i+1)$^{th}$ bit is equal to zero, invert the (n-i)$^{th}$ bit,
}

If f(i)=10 {
In the X working array: if the (n-i+1)$^{th}$ bit is equal to zero, invert the (n-i)$^{th}$ bit,
In the Y working array: if the (n-i+1)$^{th}$ bit is equal to one, invert the (n-i)$^{th}$ bit,
}

If f(i)=10{
In the X working array: if the (n-i+1)$^{th}$ bit is equal to zero, invert the (n-i)$^{th}$ bit,
In the Y working array: if the (n-i+1)$^{th}$ bit is equal to zero, invert the (n-i)$^{th}$ bit,
{
Decrement i;
}

This results in the X-partially-decoded and Y-partially-decoded arrays, {v$_{b-1}$, v$_{b-3}$, . . . , v$_1$} and {v$_{b-2}$, v$_{b-4}$, . . . , v$_0$}, respectively.

(iv) In step 940, construct a decoded array {v$_{b-1}$, v$_{b-2}$, . . . v$_1$, v$_0$} from the X-partially-decoded and Y-partially-decoded arrays.

For example, in step 910, a received constellation point has an X-selected coordinate of 7 and a Y-selected coordinate of −5. In step 920, the X working array is {011}, and the Y working array is {101}. In step 930, the X-partially-decoded and Y-partially-decoded arrays are generated. For simplicity, the generation of the X-partially-decoded array will be described first. The number of bits n is equal to three. For i equals 2, since f(2) is equal to 00, and since bit 2 of the X-working array is equal to 1, bit 1 is inverted resulting in an X-working array of {010}. The bit counter i is now decremented. For i equals 1, f(1) is equal to 11. Since bit 3 of the X-working array is equal to 0, bit 2 is inverted resulting in an X-partially decoded array of {000}.

For the Y-working array, when the bit counter i equals 2, since f(2) is equal to 00, and since bit 2 of the Y-working array is equal to 0, bit one is not inverted resulting in a Y-working array of {101}. When the bit counter i equals 1, since f(1) is equal to 11 and bit 3 of the Y-working array is equal to 1, bit 2 is not inverted resulting in a Y-partially decoded array of {101}.

In step 940, a decoded array that is equal to {010001} is constructed from the X and Y partially decoded arrays. The decoded array corresponds to a label of 17. Referring to FIG. 22, the constellation point having label 17 has (X,Y) coordinates of (7,−5), which match the X and Y selected coordinates of step 910.

Referring to FIG. 27, in another embodiment, a method of decoding using the 11-family will be described. This method is the same as in FIG. 27 except that step 930 is simplified to:

For i=n−1, . . . , 1 {
In the X working array: if the (n-i+1)$^{th}$ bit is equal to zero, invert the (n-i)$^{th}$ bit
In the Y working array: if the (n-1)$^{th}$ bit is equal to zero, invert the (n-i)$^{th}$ bit
}
Decrement i
}

In yet another embodiment, a method of decoding using the 01-family will be described. This method is the same as in FIG. 27 except that step 930 is simplified to:

For i=n−1, . . . , 1 {
  In the X working array: if the (n−i+1)$^{th}$ bit is equal to one, invert the (n−i)$^{th}$ bit
  In the Y working array: if the (n−i+1)$^{th}$ bit is equal to zero, invert the (n−i)$^{th}$ bit
}
Decrement i
}

In another alternate embodiment, a method of decoding using the 10-family will be described. This method is the same as in FIG. 27 except that step 930 is simplified to:
For i=n−1, . . . , 1 {
  In the X working array: if the (n−i+1)$^{th}$ bit is equal to zero, invert the (n−i)$^{th}$ bit
  In the Y working array: if the (n−i+1)$^{th}$ bit is equal to one, invert the (n−i)$^{th}$ bit
{
Decrement i
}

6. Odd-bit Constellations

Figure 28:
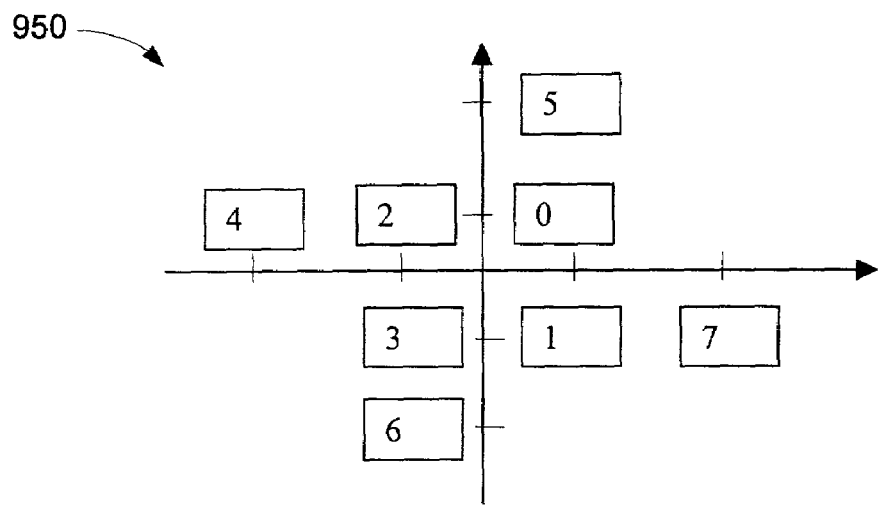
FIG. 28 depicts a typical 3-bit constellation used in the G.lite and G.dmt standards.
Figure 29:
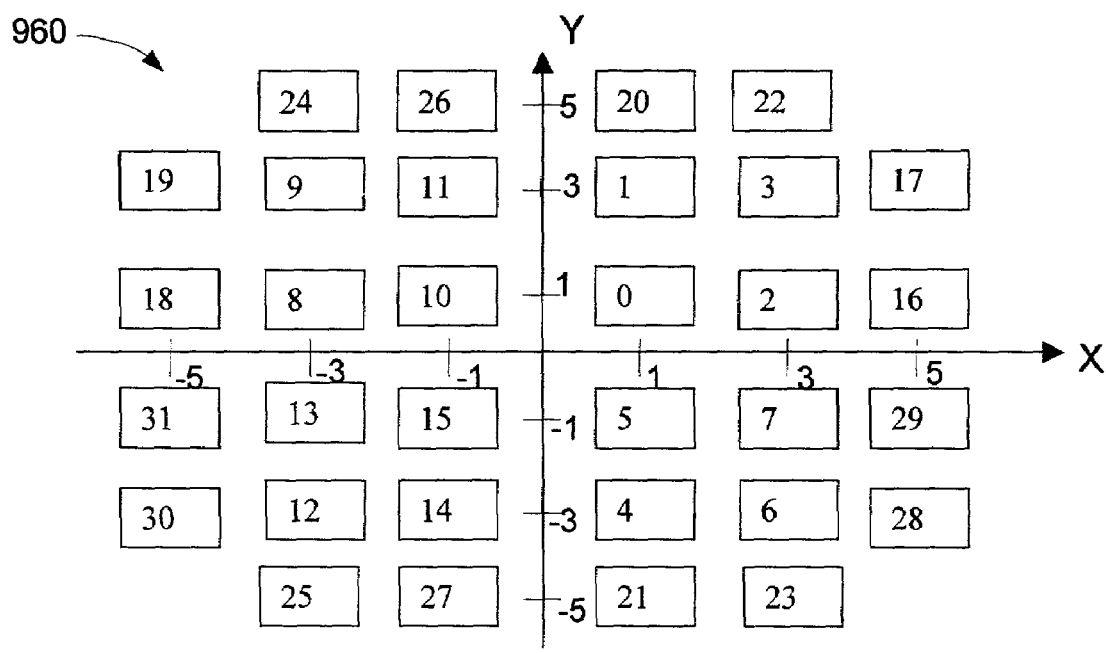
FIG. 29 depicts a typical 5-bit constellation used in the G.lite and G.dmt standards.

Odd bit constellations have a non-square shape. Referring to FIG. 28, a typical constellation 950 used in the G.lite and G.dmt standards has a propeller shape. This constellation has three bits and its shape is an exception from larger odd-bit constellations. Referring to FIG. 29, another constellation 960, having five bits and used in the G.lite and G.dmt standards has a cross shape.

An encoding method for an odd constellation having a number of bits b greater than three of the G.lite and G.dmt standards will now be described. The two most significant bits of X and Y coordinates are determined by the five most significant bits of the b bits of the label. Let c=(b+1)/2, then the X and Y coordinates have the two's complement binary representations $(X_c, X_{c-1}, v_{b-4}, v_{b-6}, \ldots, v_3, v_1, 1)$ and $(Y_c, Y_{c-1}, v_{b-5}, v_{b-7}, \ldots, v_2, v_0 1)$, where $X_c$ and $Y_c$ are the sign bits of the X and Y coordinates. The relationship between $X_c, X_{c-1}$ and $Y_c, Y_{c-1}$, and $v_{b-1}, v_{b-2}, v_{b-3}, v_{b-4}, v_{b-5}$ is shown in Table 7 of the G.lite standard. A 7-bit constellation can be obtained from the 5-bit constellation by expanding each label into 2×2 block, as shown in FIG. 8.

Figure 30:
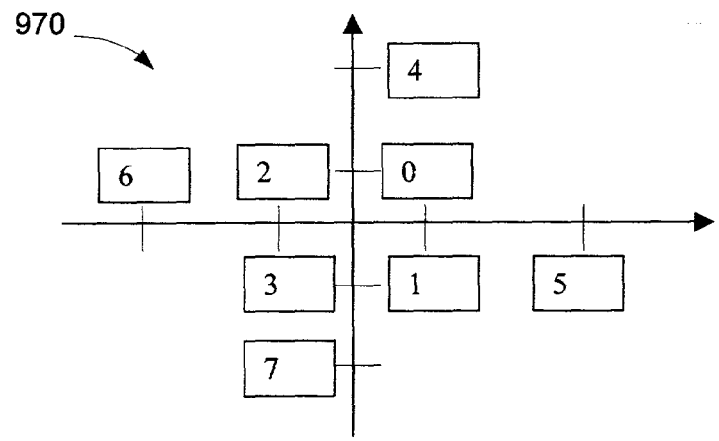
FIG. 30 depicts a 3-bit constellation with improved error control properties in accordance with an embodiment of the present invention.

Referring to FIG. 30, a 3-bit constellation 970 with improved error control properties in accordance with an embodiment of the present invention is constructed by re-labeling the four external points of the constellation of FIG. 28. The Hamming distance between nearest neighbors of the 3-bit constellation of FIG. 30 is equal to one.

Figure 31:
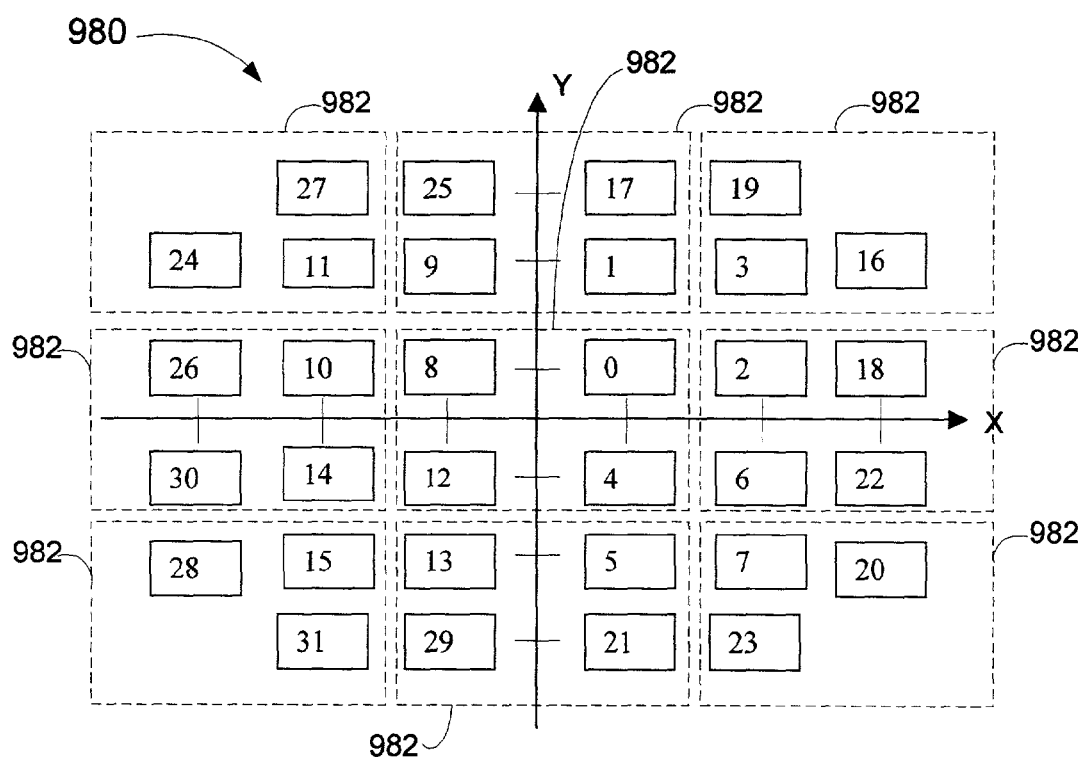
FIG. 31 depicts a 5-bit constellation with improved error control properties in accordance with an embodiment of the present invention.

Referring to FIG. 31, a 5-bit constellation 980 with improved error control properties in accordance with an embodiment of the present invention is shown. The constellation of FIG. 31 is constructed using the 4-bit constellation in FIG. 10. The values of the labels in the new horizontal rows differ by sixteen from the values of the labels of their nearest neighbors, and the values of the labels in the new vertical rows, except for the 4 corner points labeled 16, 20, 24, and 28, differ by sixteen from the values of their nearest neighbor labels. The Hamming distance between nearest neighbors of the new 5-bit constellation is equal to one, except for the four points labeled 16, 20, 24, and 28, the Hamming distance between each of these points and its internal neighbor is equal to three.

Figure 32:
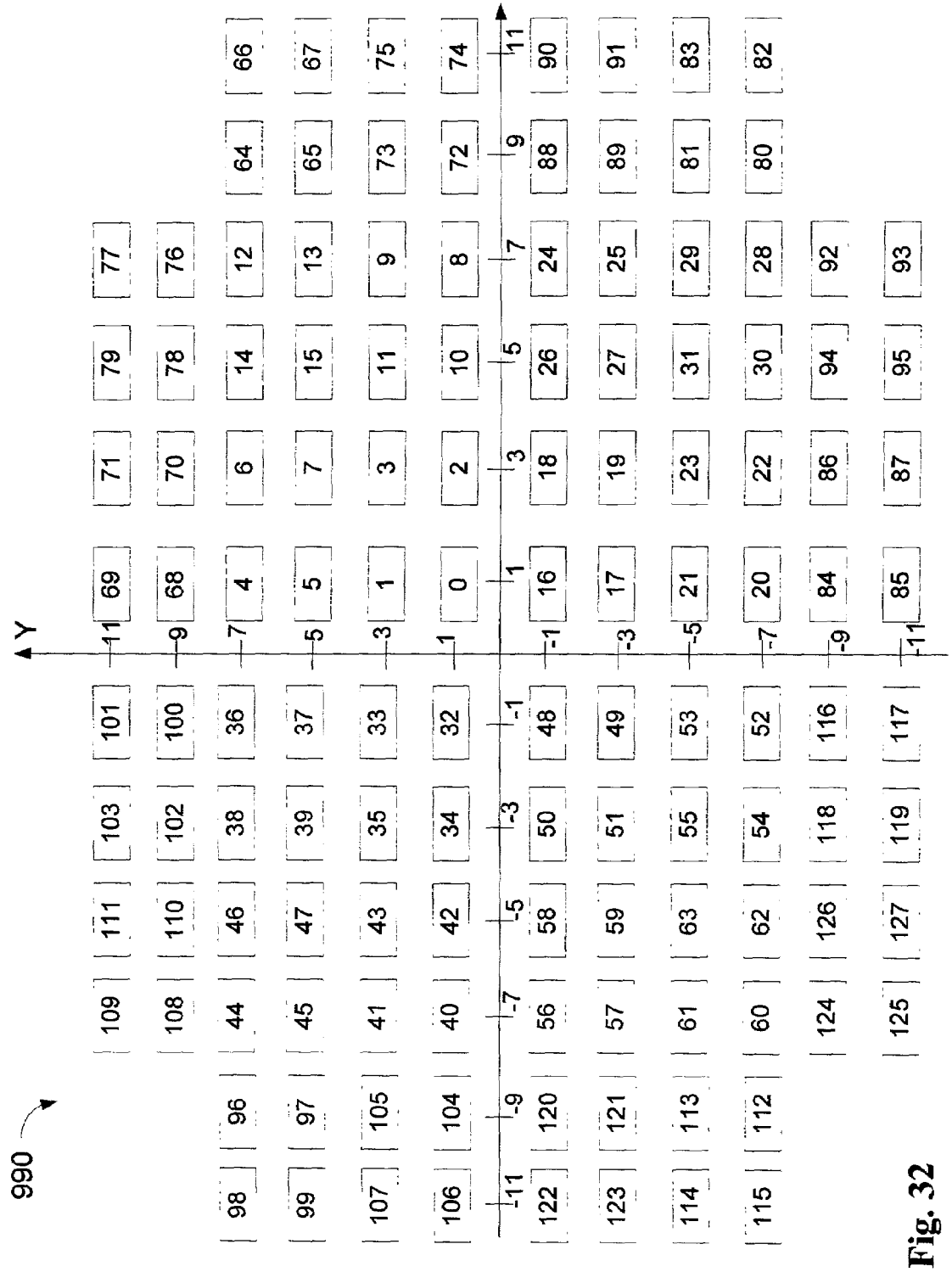
FIG. 32 depicts a 7-bit constellation in the 00-family of encoders, having a 5-bit starting constellation as shown in FIG. 31.

Referring to both FIGS. 31 and 32, larger (7-bit, 9-bit, . . . ) odd constellations with improved error control properties can be constructed from smaller odd constellations by applying the "mirroring technique" of the present invention. FIG. 32 depicts a 7-bit constellation 990 in the 00-family of encoders, having a 5-bit starting constellation 980 as shown in FIG. 31. For example, in FIG. 31, as shown by the dashed rectangles 982, 2×2 blocks of constellation points are grouped and expanded in accordance with the technique shown in FIG. 10 to generate the 7-bit constellation 990 of FIG. 32. As in the case of even bit sizes, different constellation families can be obtained by using different expansion sequences, i.e., by specifying the template for expanding the point with coordinates (1,1).

The encoding and decoding techniques are formulated based on the similarity between the odd-bit constellations and even-bit constellations. One difference is that for odd constellations, having seven or more bits, the starting constellation is the 5-bit constellation of FIG. 31, while for even constellations, the starting constellation is the 2-bit constellation of FIG. 1. Generally, the mapping used in the starting constellation determines a lookup table for encoding a first predetermined number of bits in larger constellations.

Referring to FIG. 33, a lookup table for the constellation of FIG. 31 is shown. In FIG. 33, the constellation point labeled "26" has an X coordinate of −5 and a Y coordinate of 1. The label "26" has a binary value of {11010}. In FIG. 33, the binary value {11010} in the left column is associated with a first binary value $\{v'_3, v'_2, v'_1\}$ equal to 101 in the middle column, and a second binary value $\{v''_3, v''_2, v''_1\}$ equal to {000} in the right column. A {1} is concatenated with the values of $\{v'_3, v'_2, v'_1\}$ and $\{v'_3, v''_2, v''_1\}$ to produce X and Y coordinates having values of {1011} and {0001}, respectively. The value {1011} is a two's complement representation of a −5; and the value {0001} is a two's complement representation of 1.

Although the table of FIG. 33 is for constellations having five bits, tables can be constructed for other constellation sizes, each constellation having a predetermined number of bits.

For an arbitrary starting constellation in the 00-family, an encoding technique is described below.

Figure 34:
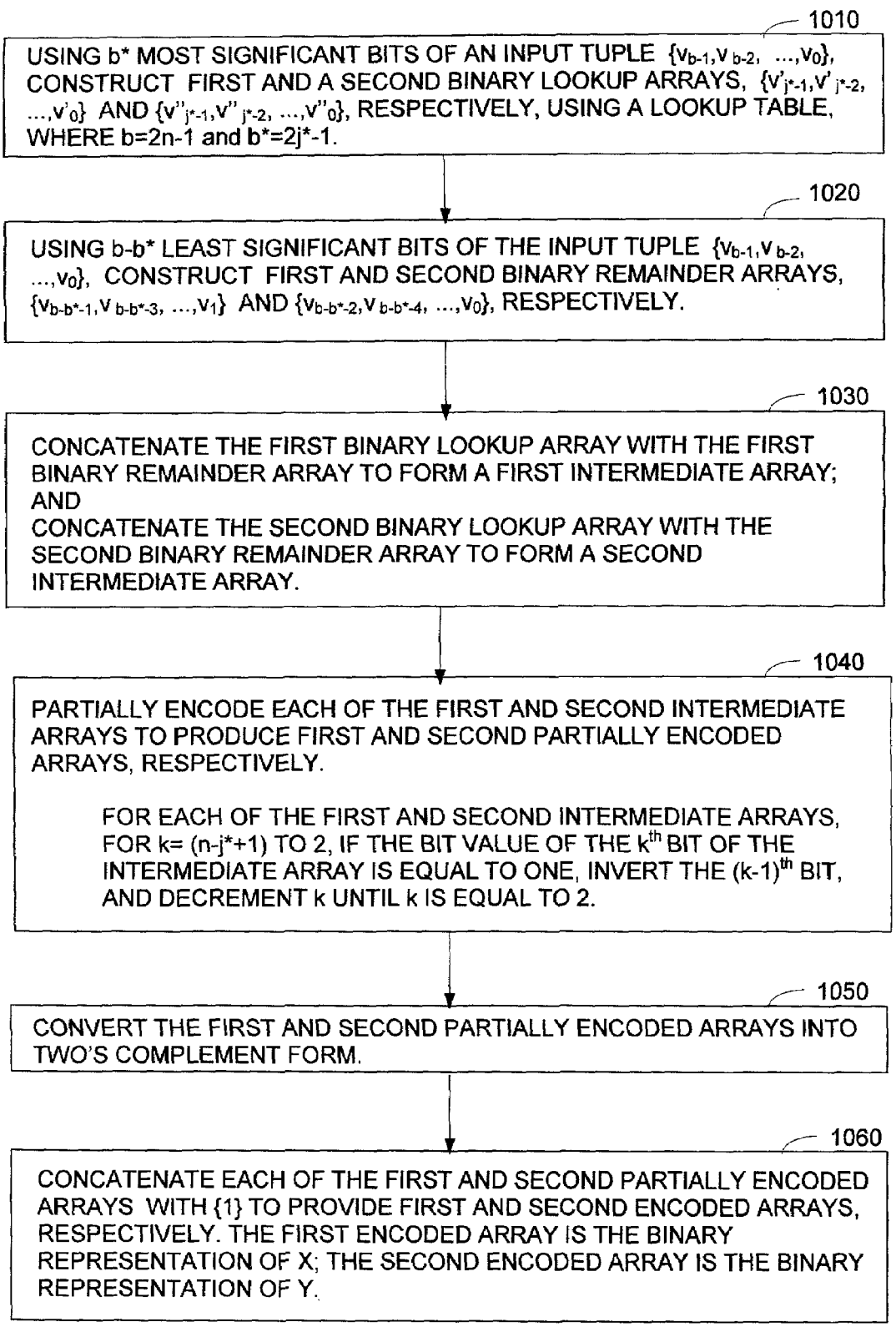
FIG. 34 is a flowchart of a method of encoding odd constellations belonging to the 00-family of encoders.

Encoding Technique for Odd Constellations Belonging to the 00-Family of Encoders Referring to FIG. 34, a flowchart of an encoding technique for odd constellations belonging to the 00-family of encoders is shown. In a constellation family, the (2j+1) bit constellation is generated from the (2j−1)-bit constellation using the "mirroring" technique, as shown in FIG. 10, for j=j*, . . . , n. Denote b*=2j*−1. At j=j*, the starting (2j*−1)-bit constellation is defined by a lookup table as follows:

$$\{v_{b*-1}, v_{b*-2}, \ldots, v_1, v_0\} \rightarrow (\{v'_{j*-1}, v'_{j*-2}, \ldots, v'_0\}, \{v''_{j*-1}, v''_{j*-2}, \ldots, v''_0\}). \quad (6.1)$$

The X and Y coordinates in that constellation have two's complement binary representations, $\{v'_{j*-1}, v'_{j*-2}, \ldots, v'_0, 1\}$ and $\{v''_{j*-1}, v''_{j*-2}, \ldots, v''_0, 1\}$ respectively; and the most significant bits are the sign bits. Referring also to FIG. 33, an exemplary lookup table in accordance with Equation (6.1) is shown.

For j=j*, . . . , n, the (1,1) constellation point is always expanded using the 00-template. Then for a (2n−1)-bit constellation, the encoding technique selects an odd-integer constellation point having coordinates (X,Y) based on the binary b-bit (b=2n−1) representation of an input tuple $\{v_{b-1}, v_{b-2}, \ldots, v_1, v_0\}$, as follows:

(i) In step 1010, using b* most significant bits of the input tuple $\{v_{b-1}, v_{b-2}, \ldots, v_1, v_0\}$ construct a first and a second binary lookup array, $\{v'_{j*-b*-1}, v'_{j*-2}, \ldots, v'_0\}$ and $\{v''_{j*-1}, v''_{j*-2}, \ldots, v''_0\}$ respectively, using the lookup table described in Equation (6.1) above.

(ii) In step 1020, using b–b* least significant bits of the input tuple $\{v_{b-1}, v_{b-2}, \ldots, v_1, v_0\}$, construct first and second binary remainder arrays, $\{v_{b-b^*-1}, v_{b-b^*-3}, \ldots, v_1\}$ and $\{v_{b-b^*-2}, v_{b-b^*-4}, \ldots, v_0\}$, respectively.

(iii) In step 1030, concatenate the first binary lookup array with the first binary remainder array to form a first intermediate array, such that the first binary lookup array becomes the most significant bits of the first intermediate array; and concatenate the second binary lookup array with the second binary remainder array to form a second intermediate array, such that the first binary lookup array becomes the most significant bits of the first intermediate array. The first and second intermediate arrays each have n' bits.

(iv) In step 1040, partially encode each of the first and second intermediate arrays to produce first and second partially encoded arrays, respectively.

The bits of the intermediate arrays will be referenced by a variable k having values of 1 to n, such that the most significant bit of each n-bit array is referenced when k is equal to n, and the least significant bit of each n-bit array referenced when k is equal to 1.

For each of the first and second intermediate arrays, for k=(n–j*+1) to 2, if the bit value of the $k^{th}$ bit of the intermediate array is equal to one, invert the $(k-1)^{th}$ bit, and decrement k until k is equal to 2.

(v) In step 1050, convert the first and second partially-encoded arrays into two's complement form. In an alternate embodiment, step 1050 is omitted.

(vi) In step 1060, concatenate each of the first and second partially-encoded arrays with $\{1\}$ to provide first and second encoded arrays, respectively. The first encoded array is the two's complement representation of X; the second encoded array is the two's complement representation of Y. The most significant bits are the sign bits.

In an alternate embodiment, step 1060 is performed prior to step 1050.

Referring to FIGS. 32, 33 and 34, an example of the encoding technique, described above, will be provided. In FIG. 32, the constellation point having the label "98" has an X coordinate of –11 and a Y coordinate of +7. The label "98" has a seven bit binary value of $\{1100010\}$. The number of bits b is equal to seven. Because the starting constellation was the five bit constellation, the value of b* is equal to five, thus the value of j* is equal to three.

In step 1010, using the five most significant bits of an input tuple $\{1100010\}$, the lookup table of FIG. 33 is accessed to construct a first binary lookup array $\{101\}$ and a second binary lookup array $\{001\}$. In step 1020, using the two (b–b*) least significant bits of the input tuple $\{10\}$, first and second binary remainder arrays, $\{1\}$ and $\{0\}$, respectively, are constructed.

In step 1030, the first binary lookup array is concatenated with the first remainder array to produce a first intermediate array of $\{1011\}$. The second binary lookup array is concatenated with the second remainder array to produce a second intermediate array of $\{0010\}$.

In step 1040, the most significant bit in the first and second intermediate arrays is accessed when n' is equal to four. For each of the first and second intermediate arrays, for k=(n'–j*+1) to 2, if the bit value of the $k^{th}$ bit is equal to one, invert the $(k-1)^{th}$ bit, and decrement k. Therefore, for k=(4–3+1)=2 to 2, if bit 2 is equal to one, invert bit one to produce first and second intermediate arrays having values of $\{1010\}$ and $\{0011\}$, as first and second partially encoded arrays, respectively.

Step 1050 is omitted. In step 1060, each of the first and second partially encoded arrays is concatenated with $\{1\}$ to provide first and second encoded arrays, having values of $\{10101\}$ and $\{00111\}$, respectively. The first encoded array is the two's complement representation of X. The second encoded array is the two's complement representation of Y. In this example, the value of the first encoded array $\{10101\}$ is the two's complement representation of a –11 which matches the value of the X coordinate for the constellation point labeled "98" of FIG. 32. The value of the second encoded array $\{00111\}$ is the two's complement representation of a +7 which matches the value of the Y coordinate for the constellation point labeled "98" of FIG. 32.

A decoding technique for an odd-bit constellation belonging to the 00-family of decoders will now be described.

Decoding Technique for Odd Constellations Belonging to the 00-Family

Figure 35:
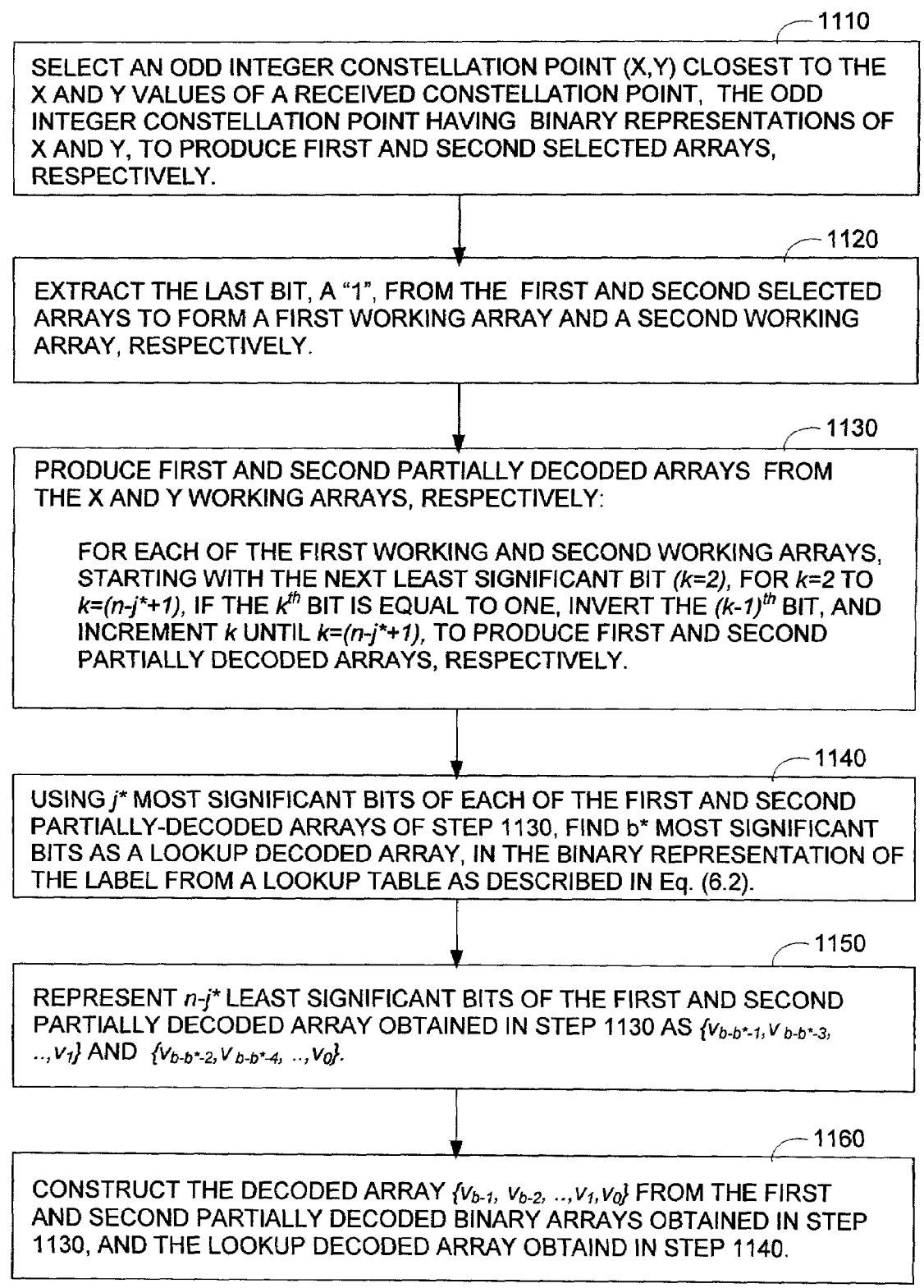
FIG. 35 is a flowchart of a method of decoding odd constellations belonging to the 00-family.

Referring to FIG. 35, a flowchart of a decoding technique for odd constellations belonging to the 00-family is shown. In a constellation family, the (2j+1) bit constellation is generated from the (2j–1)-bit constellation using the "mirroring" technique of FIG. 10, for j=j*, . . . , n. Denote b*=2j*–1. At j=j*, the starting (2j*–1)-bit constellation is defined by a lookup table as follows:

$$(\{v'_{j^*-1}, v'_{j^*-2}, \ldots, v'_0\}, \{v''_{j^*-1}, v''_{j^*-2}, v''_0\}) \to \{v_{b^*1}, v_{b^*2}, \ldots, v_1, v_0\} \quad (6.2)$$

The X and Y coordinates of that constellation have two's complement binary representations, $(v'_{j^*-1}, v'_{j^*-2}, \ldots, v'_0, 1\}$ and $\{v''_{j^*-1}, v''_{j^*-2}, \ldots, v''_0 1\}$, respectively; and the most significant bits are the sign bits. In one embodiment, the lookup table of FIG. 33 is used as the lookup table for Equation (6.2). For j=j*, . . . , n, the (1,1) point is always expanded using the 00-template, that is, the 00-configuration is used. Denote b=2n–1. Then for a (2n–1)-bit constellation, the decoding technique comprises:

(i) In step 1110, select an odd-integer constellation point (X,Y) closest to the X and Y coordinates of a received constellation point, based on the binary representations, $\{v'_{n-1}, v'_{n-2}, \ldots, v'_0, 1\}$ and $\{v''_{n-1}, v''_{n-2}, \ldots, v''_0, 1\}$, for X and Y, respectively. Extract (n+1) least significant bits from these representations resulting in a first and a second selected array.

(ii) In step 1120, extract the last bit, a "1," from the first and second selected arrays to provide a first working array and a second working array, respectively, each working array having n-bits.

(iii) In step 1130, partially decode the first and second working arrays to provide first and second partially decoded arrays.

The bits of the first and second working arrays will be referenced by a variable k, such that the most significant bit of each n-bit array is referenced when k is equal to n, and the least significant bit of each n-bit array referenced when k is equal to 1.

For each of the first and second working arrays, starting with the next least significant bit (k=2), for k=2 to k=(n–j*+1), if the $k^{th}$ bit is equal to one, invert the $(k-1)^{th}$ bit, and increment k until k=(n–j*+1), to produce first and second partially decoded arrays, respectively.

(iv) In step 1140, using j* most significant bits of each of the first and second partially-decoded arrays of step 1130, find b* most significant bits $\{v_{b-1}, v_{b-2}, \ldots, v_{b-b^*}\}$, as a lookup decoded array, in the binary representation of the label from the lookup table described in Equation (6.2).

Referring also to FIG. 33, in Table 1, the middle column corresponds to the first partially decoded array, and the right column corresponds to the second partially decoded arrays.

(v) In step 1150, represent n–j* least significant bits of the first and second partially decoded arrays obtained in step 1130 as $\{v_{b-b^*-1}, V_{b-b^*-3}, \ldots, v_1\}$ and $\{v_{b-b^*-2}, V_{b-b^*-4}, \ldots, v_0\}$.

(vi) In step 1160, construct the decoded array $\{v_{b-1}, v_{b-2}, \ldots, v_1, v_0\}$ from the first and second partially decoded binary arrays obtained in step 1130, and the lookup decoded array obtained in step 1140.

In one embodiment, in the decoding technique above the term first is associated with the X coordinate, and the term second is associated with the Y coordinate.

Referring to FIGS. 32, 33 and 35, an exemplary input tuple will be decoded. In step 110, assume that n odd integer constellation point was selected such that the first selected array is {00001}, and the second selected array is {11111}. In step 1120, the last bit is extracted from the first and second selected arrays to provide first and second working arrays having values of {0000} and {1111}, respectively.

In step 1130, for each of the first and second working arrays, starting with the next least significant bit (k=2), for k=2 to (n–j*+1), if the $k^{th}$ bit is equal to one, invert the $(k-1)^{th}$ bit. In this case, n is equal to four and j* is equal to 3. Therefore, for k=2 to 2, if bit 2 is equal to one, invert bit 1. In the first working array, bit 2 is equal to 0, therefore bit one is not inverted to produce a first partially decoded array of {0000}. In the second working array, bit 2 is equal to 1, therefore bit 1 is inverted to produce a second partially decoded array of {1110}.

In step 1140, using the j*=3 most significant bits of each of the first and second partially decoded arrays of step 1130, find b*=5 most significant bits as a lookup decoded array. Accessing the table of FIG. 33 based on the values of {000} and {111}, the associated lookup decoded array $\{v_6\ v_5\ v_4\ v_3\ v_2\}$ is {00100}.

In step 1150, the one (n–j*) least significant bit of the first and second partially decoded arrays is represented as $\{v_1\}=\{0\}$ and $\{v_0\}=\{0\}$, respectively. In step 1160, the decoded array is constructed as {0010000} which corresponds to the label "16."

In FIG. 32, the constellation point having the label "16" has an X coordinate equal to 1 and a Y coordinate equal to –1. The value of the X coordinate is equal to the decimal representation of the value of the first selected array {00001}, that is, a +1. The value of the Y coordinate is equal to the decimal representation of the value of the second selected array {11111}, which is a –1.

General Encoding Technique for Odd Constellations

Figure 36A:
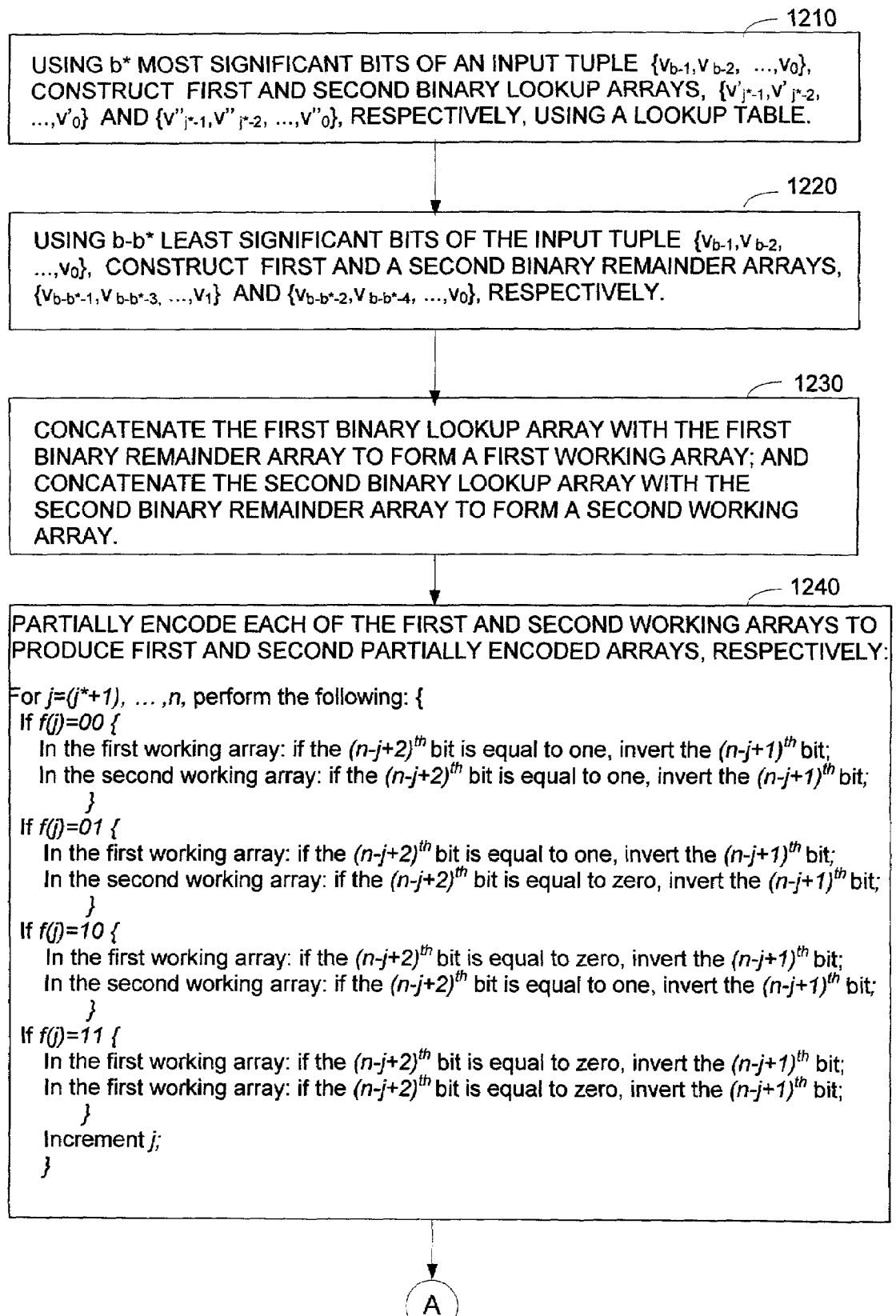
FIGS. 36A and 36B are a flowchart of a general method of encoding odd constellations of the 00-family, 01-family, 10-family, 11-family, and combinations thereof.
Figure 36B:
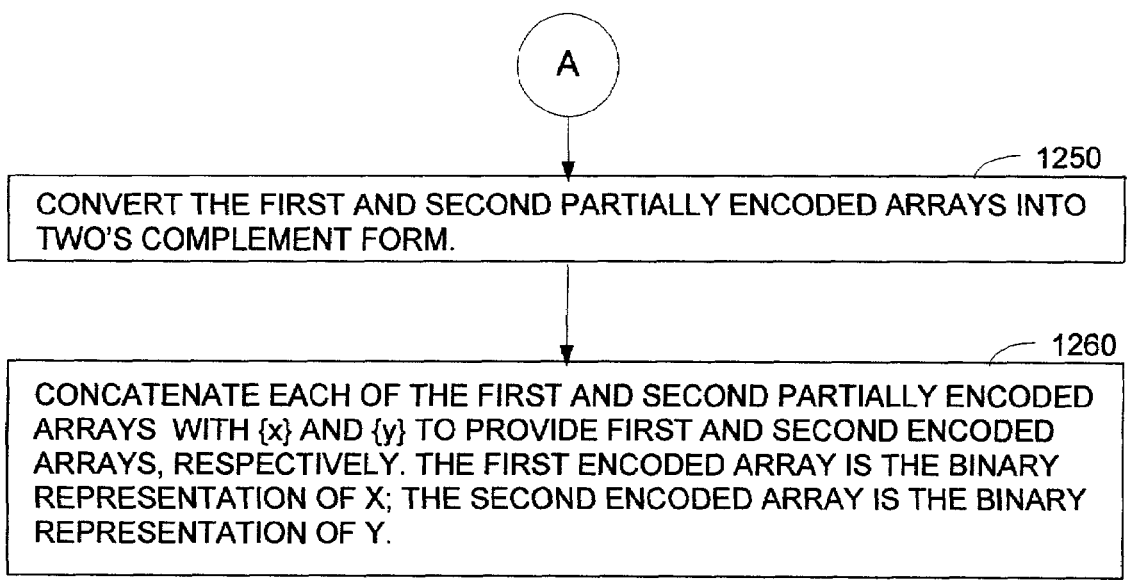

Referring to FIGS. 36A and 36B, a general flowchart of a method for encoding odd constellations of the 00-family, 01-family, 10-family, 11-family, and combinations thereof is shown. An odd constellation is described by an expansion sequence.

In a constellation family, the (2j+1) bit constellation is generated from the (2j–1)-bit constellation by the "mirroring" technique, as shown in FIG. 10, for j=j*, ..., n. Denote b*=2j*–1. At j=j*, the starting (2j*–1)-bit constellation is defined by a lookup table as follows:

$$\{v_{b^*-1}, v_{b^*-2}, \ldots, v_1, v_0\} \to (\{v'_{j^*-1}, v'_{j^*-2}, \ldots, v'_0\}, \{v''_{j^*-1}, v''_{j^*-2}, \ldots, v''_0\}) \quad (6.1)$$

The X and Y coordinates in that starting constellation have two's complement binary representations, $\{v'_{j^*-1}, v'_{j^*-2}, \ldots, v'_0, 1\}$ and $\{v''_{j^*-1}, v''_{j^*-2}, \ldots, v''_0, 1\}$, respectively; and the most significant bits are the sign bits. Referring to FIG. 33, an exemplary lookup table in accordance with Equation (6.1) is shown.

For j=j*+1, ..., n, there is an expansion sequence {j, f(j)}, j=j*+1, ..., n, defined so that the (1,1) point in the (2j–1)bit constellation is expanded using the f(j)-template to generate the (2j+1) constellation. In other words, f(j) refers to a specified configuration that was used to expand the (2j–1) constellation. For example, when j=j*+1, the starting constellation is expanded using the f(j)-configuration. For example, for the 7 bit constellation of FIG. 32 that was generated from the 5 bit constellation of FIG. 31, b=7, n=4, b*=5 and j*=3. The expansion sequence to generate the 7 bit constellation from the 5 bit constellation is represented as follows: (4,00). The expansion sequence may be stored in an expansion sequence table in memory as described above.

Then for a (2n–1)-bit constellation, the encoding technique selects an integer constellation point having coordinates (X,Y) based on the binary b-bit (b=2n–1) representation of an input tuple $\{v_{b-1}, v_{b-2}, \ldots, v_1, v_0\}$, as follows:

(i) In step 1210, using b* most significant bits of the input tuple $\{v_{b-1}, v_{b-2}, \ldots, v_1, v_0\}$, construct a first and a second binary lookup array, $\{v'_{j^*-1}, v_{j^*-2}, \ldots, v'_0\}$ and $\{v'_{j^*-1}, v''_{j^*-2}, \ldots, v''_0\}$, respectively, using the lookup table described in Equation (6.1) above.

(ii) In step 1220, using b–b* least significant bits of the input tuple $\{v_{b-1}, v_{b-2}, \ldots, v_1 v_0\}$, construct first and second binary remainder arrays, $\{v_{b-b^*-1}, v_{b-b^*-3}, \ldots, v_1\}$ and $\{v_{b-b^*-2}, v_{b-b^*-4}, \ldots, v_0\}$, respectively.

(iii) In step 1230, concatenate the first binary lookup array with the first binary remainder array to form a first working array, such that the first binary lookup array becomes the most significant bits of the first working array; and concatenate the second binary lookup array with the second binary remainder array to form a second working array, such that the second binary lookup array becomes the most significant bits of the second working array.

(iv) In step 1240, partially encode each of the first and second working arrays to produce first and second partially encoded arrays, respectively.

The bits of the first and second working arrays are referenced such that the most significant bit is the $n^{th}$ bit, and the least significant bit is the "1" bit. The working arrays are analyzed starting with the most significant bit. In the following, f(j) refers to the template used to expand the $j^{th}$ bit, and is stored in the expansion sequence table.

For j=j*+1, ..., n, perform the following: {
If f(j)=00 {
   In the first working array: if the $(n-j+_2)^{th}$ bit is equal to one, invert the $(n-j+1)^{th}$ bit;
   In the second working array: if the $(n-j+_2)^{th}$ bit is equal to one, invert the $(n-j+1)^{th}$ bit;
}
If f(j)=01 {
   In the first working array: if the $(n-j+_2)^{th}$ bit is equal to one, invert the $(n-j+1)^{th}$ bit;
   In the second working array: if the $(n-j+_2)^{th}$ bit is equal to zero, invert the $(n-j+1)^{th}$ bit;
}
If f(j)=10 {
   In the first working array: if the $(n-j+_2)^{th}$ bit is equal to zero, invert the $(n-j+1)^{th}$ bit;

In the second working array: if the $(n-j+_2)^{th}$ bit is equal to one, invert the $(n-j+1)^{th}$ bit;
}
If f(j)=01 {
In the first working array: if the $(n-j+2)^{th}$ bit is equal to zero, invert the $(n-j+1)^{th}$ bit;
In the first working array: if the $(n-j+_2)^{th}$ bit is equal to zero, invert the $(n-j+1)^{th}$ bit;
}
Increment j;
}

(v) In step 1250, convert the first and second partially-encoded arrays into two's complement form. In an alternate embodiment, step 1250 is omitted.

(vi) In step 1260, concatenate each of the first and second partially-encoded arrays with a predetermined set x and y to provide first and second encoded arrays, respectively. The first encoded array is the binary representation of X; the second encoded array is the binary representation of Y. The most significant bits are the sign bits.

In one embodiment, the predetermined sets x=y={1}. In an alternate embodiment, the predetermined sets x and y are odd integers. In yet another alternate embodiment, the predetermined sets x and y are even integers.

In another alternate embodiment, when a starting constellation is iteratively expanded using the same configuration, step 1240 of FIG. 36A can be simplified. For example, if the 11-configuration is always used to expand the starting constellation, step 1240 can be simplified to:

For j=(j*+1), . . . , n: {
In the first working array: if the $(n-j+2)^{th}$ bit is equal to zero, invert the $(n-j+1)^{th}$ bit;
In the first working array: if the $(n-j+2)^{th}$ bit is equal to zero, invert the $(n-j+1)^{th}$ bit;
}
Increment j;
}

In other alternate embodiments, step 1240 may be similarly simplified when a constellation is iteratively expanded using a 00, 01, or 10 configuration.

General Technique for Decoding Odd Constellations

Figure 37A:
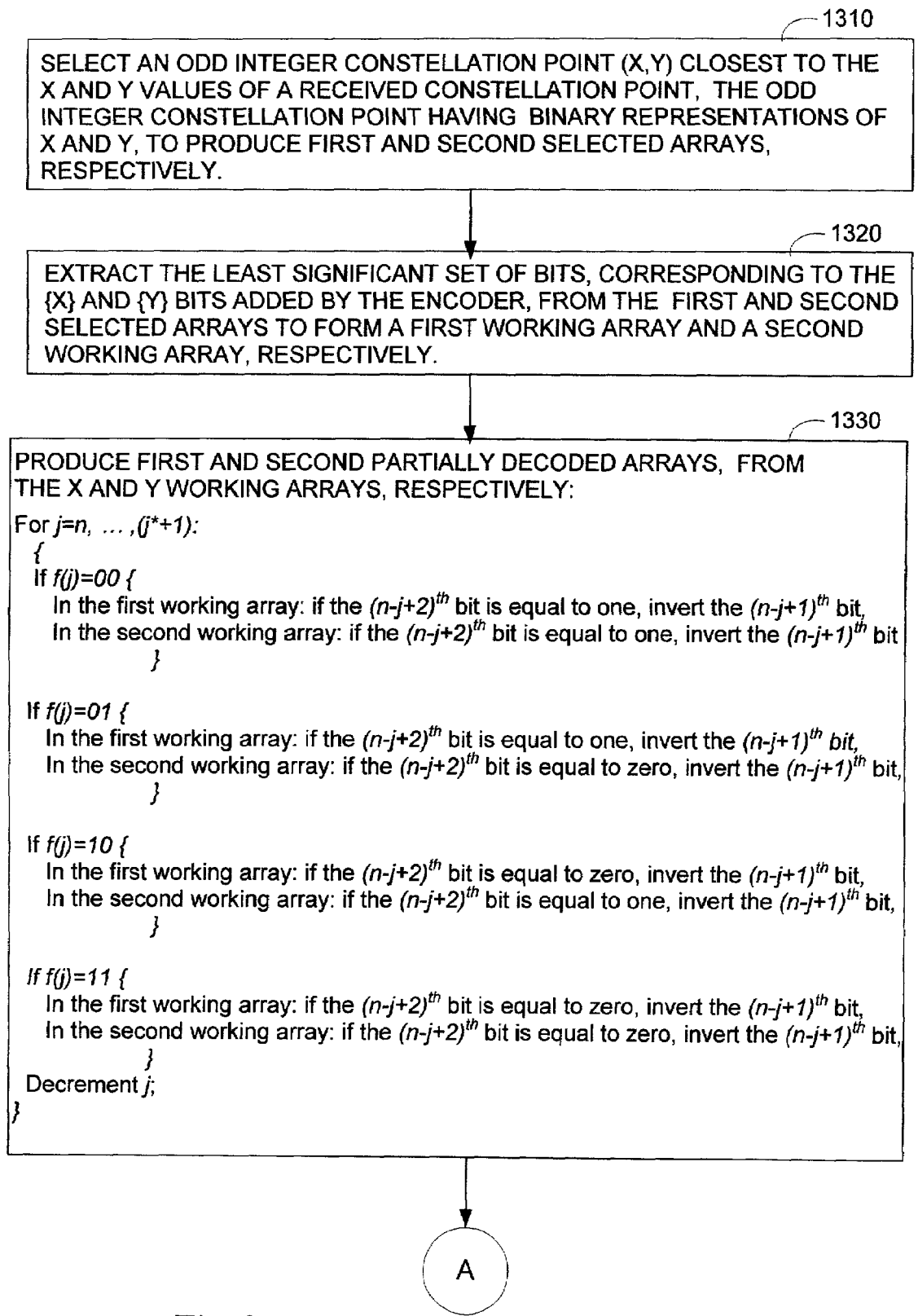
FIGS. 37A and 37B are a flowchart of a general method of decoding odd constellations of the 00-family, 01-family, 10-family, 11-family, and combinations thereof.
Figure 37B:
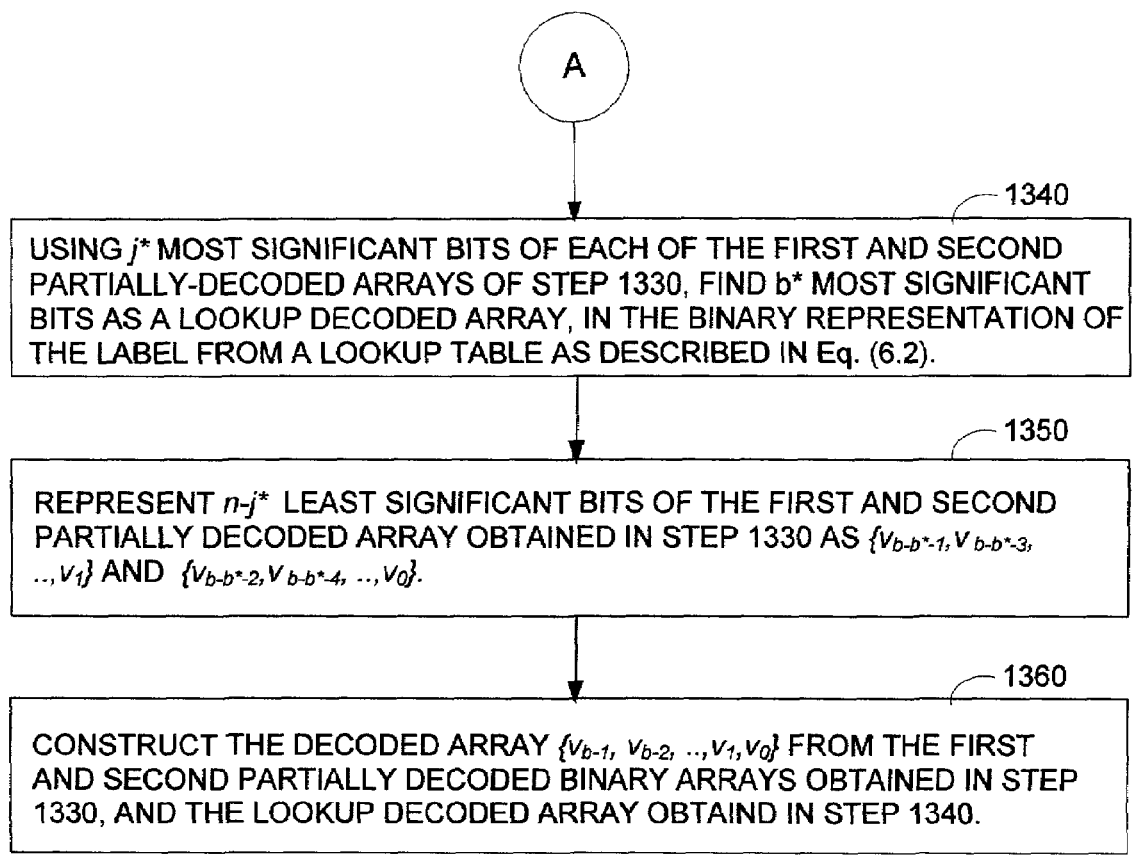

Referring to FIGS. 37A and 37B, a flowchart of a general method of decoding odd constellations is shown.

In a constellation family, the (2j+1) bit constellation is generated from the (2j−1)-bit constellation using the "mirroring" technique of FIG. 4, for j=j*, . . . , n. Denote b*=2j*−1.

At j=j*, the starting (2j*−1)-bit constellation is defined by a lookup table as follows:

$$(\{v'_{j*-1}, v'_{j*-2}, \ldots, v'_0\}, \{v''_{j*-1}, v''_{j*-2}, \ldots, v''_0\}) \rightarrow \{v_{b*-1}, v_{b*-2}, \ldots, v_1, v_0\} \quad (6.2)$$

The X and Y coordinates of that constellation have two's complement binary representations, $\{v'_{j*+1}, v'_{j*-2}, \ldots, v'_0, 1\}$ and $\{v''_{j*+1}, v''_{j*-2}, \ldots, v''_0, 1\}$, respectively; and the most significant bits are the sign bits. In one embodiment, the lookup table of FIG. 33 is used as the lookup table for Equation (6.2).

For j=j*+1, . . . , n, there is an expansion sequence {j, f(j)}, j=5, . . . , n, defined such that the (1,1) point in the 2j+1-bit constellation is expanded using the f(j)-template. In other words, f(j) refers to a specified configuration and each f(j) is associated with an expansion, and thus particular bits.

Denote b=2n−1. Then for a (2n−1)-bit constellation, the decoding technique comprises:

(i) In step 1310, select an odd-integer constellation point (X,Y) closest to the X and Y coordinates of a received constellation point, based on the binary representations, $\{v'_{n-1}, v'_{n-2}, \ldots, v'_0, x\}$ and $\{v''_{n-1}, v''_{n-2}, \ldots, v''_0, y\}$, for X and Y, respectively. The terms "x" and "y" represent sets having a predetermined number t of bits. Extract (n+t) least significant bits from these representations resulting in a first and a second selected array.

(ii) In step 1320, extract the least significant set of bits, the predetermined sets x and y added by the encoder, from the first and second selected arrays to provide a first working array and a second working array, respectively, each working array having n-bits. In another embodiment, the predetermined sets x and y have t bits where t represents a number of bits concatenated onto a partially encoded constellation point by the encoder.

(iii) In step 1330, partially decode the first and second working arrays to provide first and second partially decoded arrays.

The bits of the first and second working arrays will be referenced by a variable k, such that the most significant bit of each array is referenced when k is equal to n, and the least significant bit of each array referenced when k is equal to 1.

For j=n, . . . , *+1:
{
If f(j)=00 {
In the first working array: if the $(n-j*+_2)^{th}$ bit is equal to one, invert the $(n-j*+1)^{th}$ bit,
In the second working array: if the $(n-j*+_2)^{th}$ bit is equal to one, invert the $(n-j*+1)^{th}$ bit
}
If f(j)=01 {
In the first working array: if the $(n-j*+2)^{th}$ bit is equal to one, invert the $(n-j*+1)^{th}$ bit,
In the second working array: if the $(n-j*+2)^{th}$ bit is equal to zero, invert the $(n-j*+1)^{th}$ bit,
}
If f(j)=10 {
In the first working array: if the $(n-j*+2)^{th}$ bit is equal to zero, invert the $(n-j*+1)^{th}$ bit, In the second working array: if the $(n-j*+_2)^{th}$ bit is equal to one, invert the $(n-j*+1)^{th}$ bit,
}
If f(j)=11 {
In the first working array: if the $(n-j*+_2)^{th}$ bit is equal to zero, invert the $(n-j*+1)^{th}$ bit,
In the second working array: if the $(n-j*+_2)^{th}$ bit is equal to zero, invert the $(n-j*+1)^{th}$ bit,
}
Decrement j;
}

(iv) In step 1340, using j* most significant bits of each of the first and second partially-decoded arrays of step 1330, find b* most significant bits $\{v_{b-1}, v_{b-1}, \ldots, v_{b-b*}\}$, as a lookup decoded array, in the binary representation of the label from the lookup table described in Equation (6.2).

(v) In step 1350, represent n-j* least significant bits of the first and second partially decoded arrays obtained in step 1330 as $\{v_{b-b*-1}, v_{b-b*-3}, \ldots, V_1\}$ and $\{v_{b-b*-2}, v_{b-b*-4}, \ldots, v_0\}$.

(vi) In step 1360, construct the decoded array $\{v_{b-1}, v_{b-2}, \ldots, v_1, v_0\}$ from the first and second partially decoded binary arrays obtained in step 1330, and the lookup decoded array obtained in step 1340.

For the odd-bit constellations of the present invention, the average number of bit errors in an erroneous QAM symbol is not identically equal to one. However, as the ratio of the number of nearest neighbor pairs with a non-unity Hamming distance to the total number of nearest neighbor pairs tends to zero at large values of b, the average number of bit errors in an erroneous QAM symbol approaches one for large odd-bit constellations.

In another alternate embodiment, when the same configuration is used to expand a starting constellation, step 1330 can be simplified. For example, if a 11-configuration is used to expanding a starting constellation, step 1330 becomes:

For j=n, . . . , (j*+1):
In the first working array: if the $(n-j+2)^{th}$ bit is equal to zero, invert the $(n-j+1)^{th}$ bit;
In the first working array: if the $(n-j+2)^{th}$ bit is equal to zero, invert the $(n-j+1)^{th}$ bit;
}
Decrement j;
}

In other alternate embodiments, step 1330 is similarly modified for constellations expanded using only the 00, 01 or 10 configurations.

7. Coding Gain

The coding gain of the constellation encoders of the present invention can be estimated, given the twofold decrease in the bit error rate. Table 2, below, shows the change in bit error rate with respect to the signal to noise ratio (SNR) in a 1024 QAM channel. At a BER~$10^{-5}$ a twofold decrease in BER yields a coding gain ~0.35 dB. As the bit error rate increases, the coding gain increases and reaches 0.5 dB at BER~$10^{-3}$. In Table 3 below, similar coding gain improvements were observed in a 16 QAM channel.

TABLE 2

BER versus SNR in a $2^{10}$ QAM channel.

| SNR, dB | BER |
|---|---|
| 35 | 2.347501e–003 |
| 35.5 | 1.269574e–003 |
| 36 | 6.402486e–004 |
| 36.5 | 2.985862e–004 |
| 37 | 1.275729e–004 |
| 37.5 | 4.941307e–005 |
| 38 | 1.714662e–005 |

TABLE 3

BER versus SNR in a $2^4$ QAM channel.

| SNR, dB | BER |
|---|---|
| 17.5 | 1.304761e–003 |
| 18 | 6.246997e–004 |
| 18.5 | 2.748903e–004 |
| 19 | 1.100500e–004 |
| 19.5 | 3.962875e–005 |
| 20 | 1.267232e–005 |
| 20.5 | 3.547137e–006 |

These estimates show that using the constellation encoders of the present invention may result in an improvement of 0.5 dB in coding gain, with respect to the constellation encoders used in the G.lite and G.dmt standards.

8. A Hardware Implementation

The constellation encoder can be implemented either in hardware or in software, and these embodiments will be discussed separately. An exemplary hardware implementation for the 00-family of encoders for b=2n constellations will now be described.

Figure 38:
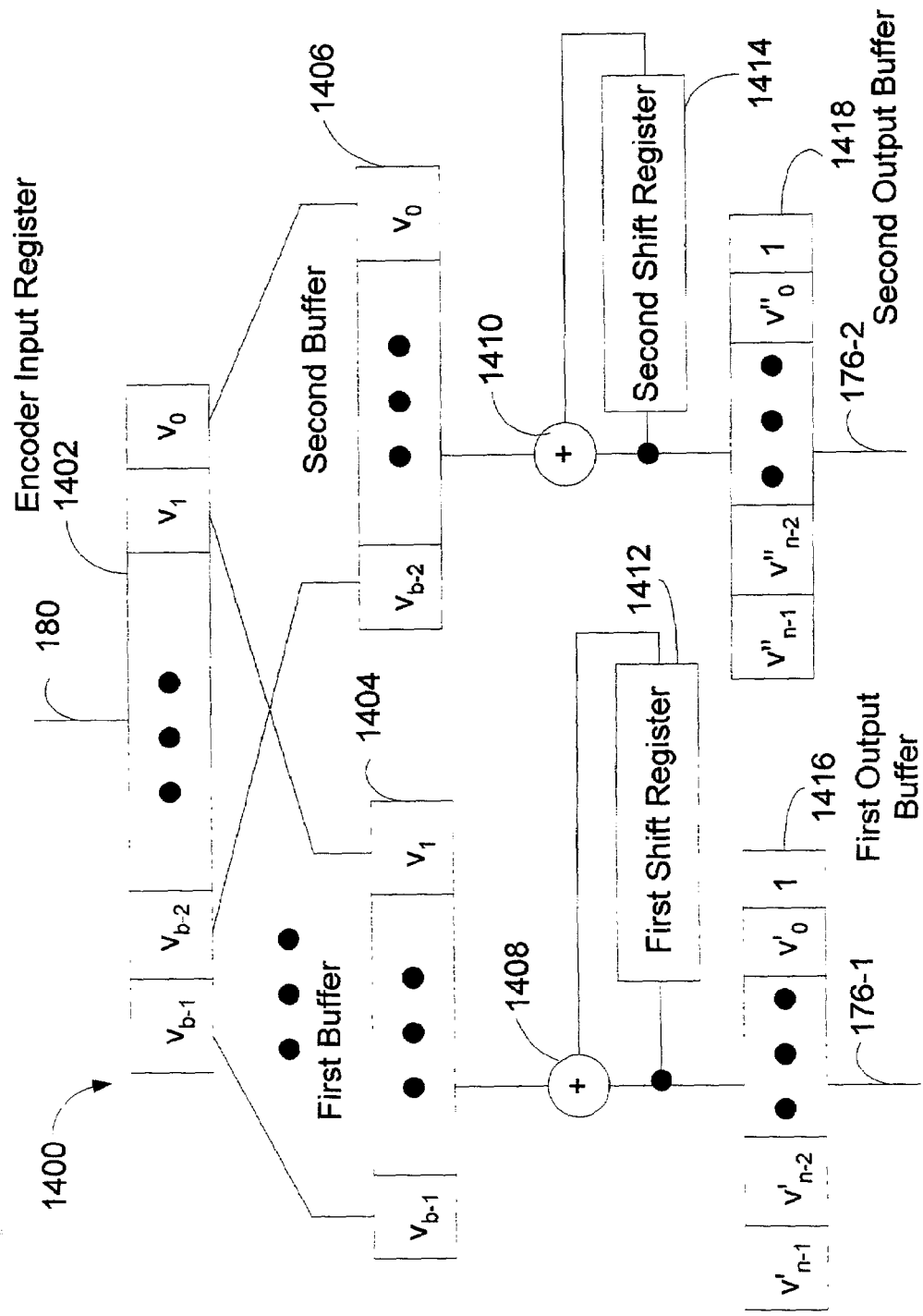
FIG. 38 is a block diagram of an exemplary hardware implementation of a constellation encoder for a constellation in the 00-family.

Referring to FIG. 38, an exemplary implementation of a constellation encoder 1400 for a constellation in the 00-family of encoders is shown. An input register 1402 receives, on leads 180, an input tuple having b bits to be encoded. Alternating bits of the input tuple are supplied to a first buffer 1404 and a second buffer 1406. The first and second buffers, 1404 and 1406, output their bits serially, starting with the most significant bit, to respective exclusive-or gates 1408 and 1410. The exclusive-or gates, 1408 and 1410, also receive an input from first and second linear shift registers, 1412 and 1415, respectively. The output of the exclusive-or gates, 1408 and 1410, is supplied the first and a second linear shift registers, 1412 and 1414, and to a first and a second output buffer, 1416 and 1418, which output the X and Y coordinates on leads 176-1 and 176-2, respectively.

One difference between a typical constellation encoder and a constellation encoder in accordance with the present invention is step 620 of the encoding technique of FIG. 23. Step 620 is equivalent to performing an exclusive-or operation 1408 and 1410, on the bits with bits delayed through the one-stage linear shift registers 1412 and 1414. In other words, the first and second linear shift registers, 1412 and 1414, respectively, store one bit. The arrays of bits in the first and second buffers, 1404 and 1406, respectively, are processed starting with the most significant bit (MSB) and proceeding to the least significant bit. The first and second buffers 1404 and 1406, respectively, store each of the b bits, and outputs the bits serially, starting with the MSB. The exclusive-or gates 1410 and 1412 are equivalent to step 620 of FIG. 23, and perform an exclusive-or operation between the bit output by the buffer v; and the bit output $v_{j-2}$ by the shift registers 1412 and 1414, respectively. Initially, the shift registers 1412 and 1414 are initialized to zero.

Figure 39:
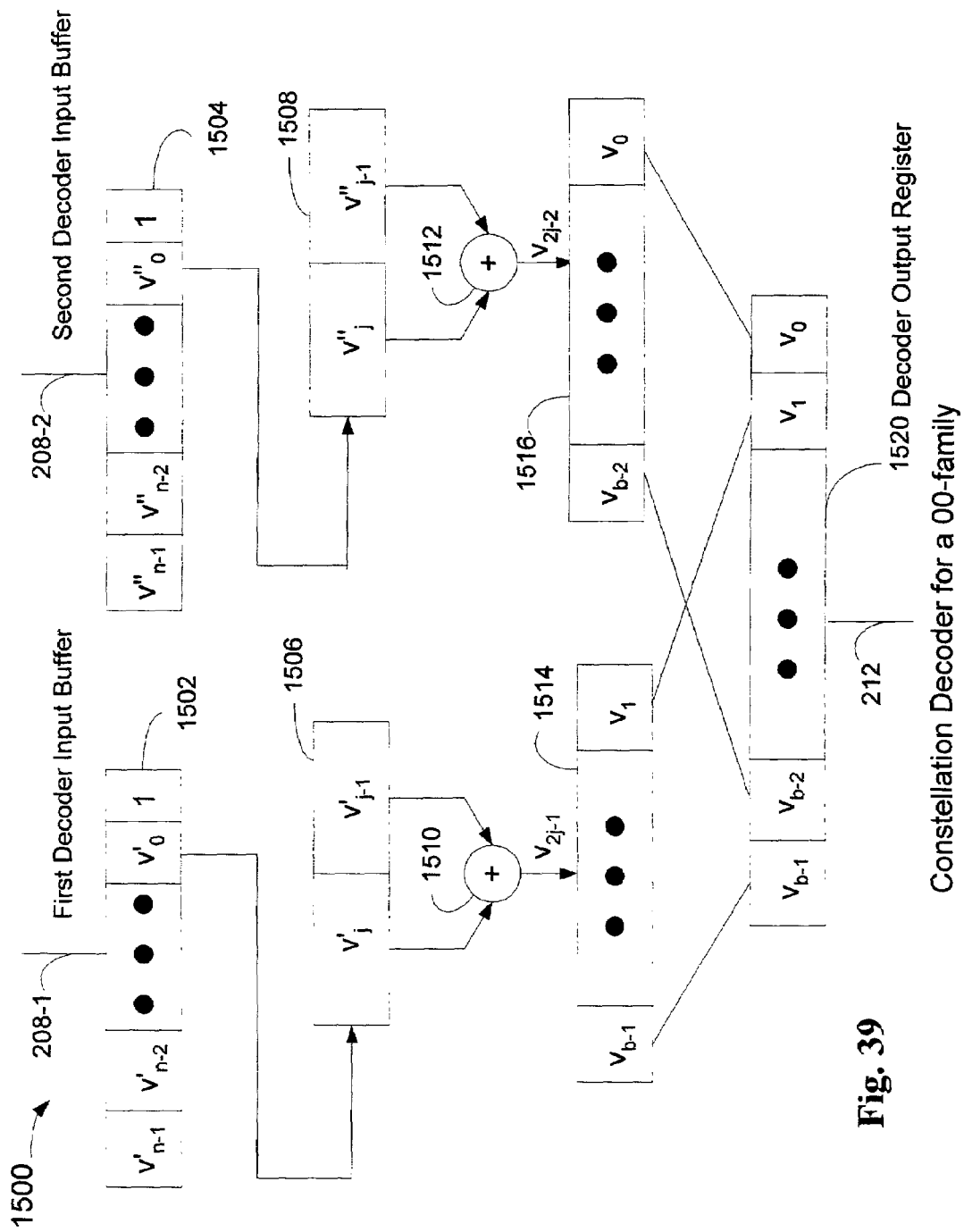
FIG. 39 is a block diagram of an exemplary hardware implementation of a constellation decoder for a constellation in the 00-family.

Referring to FIG. 39, an exemplary constellation decoder 1500 for b=2n bit constellations of the 00-family in accordance with the present invention is shown. First and second decoder input buffers, 1502 and 1504, receive the selected X and Y coordinates closest to the X and Y coordinates of a received constellation point on leads 208-1 and 208-2, respectively. The least significant bit of the first and second decoder input buffers, 1502 and 1504, is not used. Starting with the next least significant bits $v'_0$ and $v''_0$, the bits in the first and second decoder input buffers, 1502 and 1504, are passed to first and second decoder shift registers, 1506 and 1508, respectively. The first and second decoder shift registers, 1506 and 1508, store two bits, and supply those bits to first and second decoder exclusive-or gates, 1510 and 1512, respectively. The first and second decoder exclusive-or gates, 1510 and 1512, perform an exclusive-or operation on their respective input bit, and output the result to first and second decoder output buffers 1514 and 1516, respectively. The first and second decoder output buffers 1514 and 1516 are implemented as shift registers which serially receive the respective output from the exclusive-or gates 1510 and 1512. A decoder output register 1520 receives alternating bits from the output of the first and second decoder output buffers, 1514 and 1516, to provide a decoded output sequence on leads 212.

One difference between a standard constellation decoder and a constellation decoder in accordance with the present invention is performing step 730 of FIG. 25. Step 730 is equivalent to passing the bit sequence through the 2-stage linear shift registers 1506 and 1508 and performing an exclusive-or operation 1510 and 1512. The X and Y coordinates of b bits to be decoded is processed starting with the least significant bit (LSB) and continuing to the MSB. In an alternate embodiment, the bits to be decoded are not collected in a buffer prior to passing them through the shift register 1506 and 1508. Step 730 is equivalent to exclusive-or'ing, via exclusive-or gates 1510 and 1512, each two adjacent bits, outputting the result, and then shifting a new bit into the registers 1506 and 1508, respectively, starting with the LSB. Initially, the shift registers 1506 and 1508 are initialized to zero.

Figure 40:
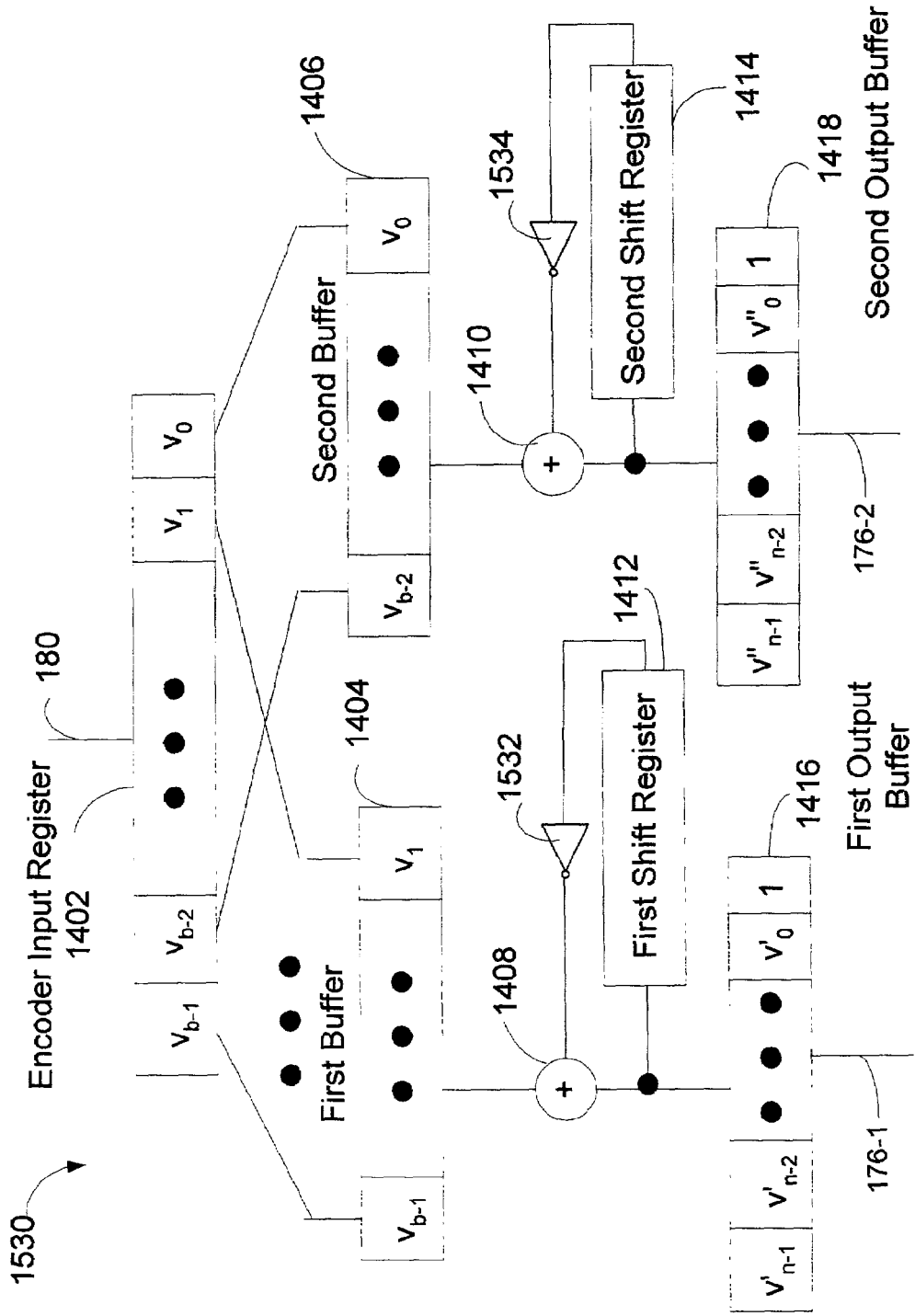
FIG. 40 is a block diagram of an exemplary hardware implementation of a constellation encoder for a constellation in the 11-family.

Referring to FIG. 40, an exemplary implementation of a constellation encoder 1530 for an even-bit constellation in the 11-family of encoders is shown. The circuit is the same as in FIG. 38 except that inverters 1532 and 1534 invert the output of the first and second shift registers 1412 and 1414, respectively, to implement the encoding technique for a 11-constellation.

Figure 41:
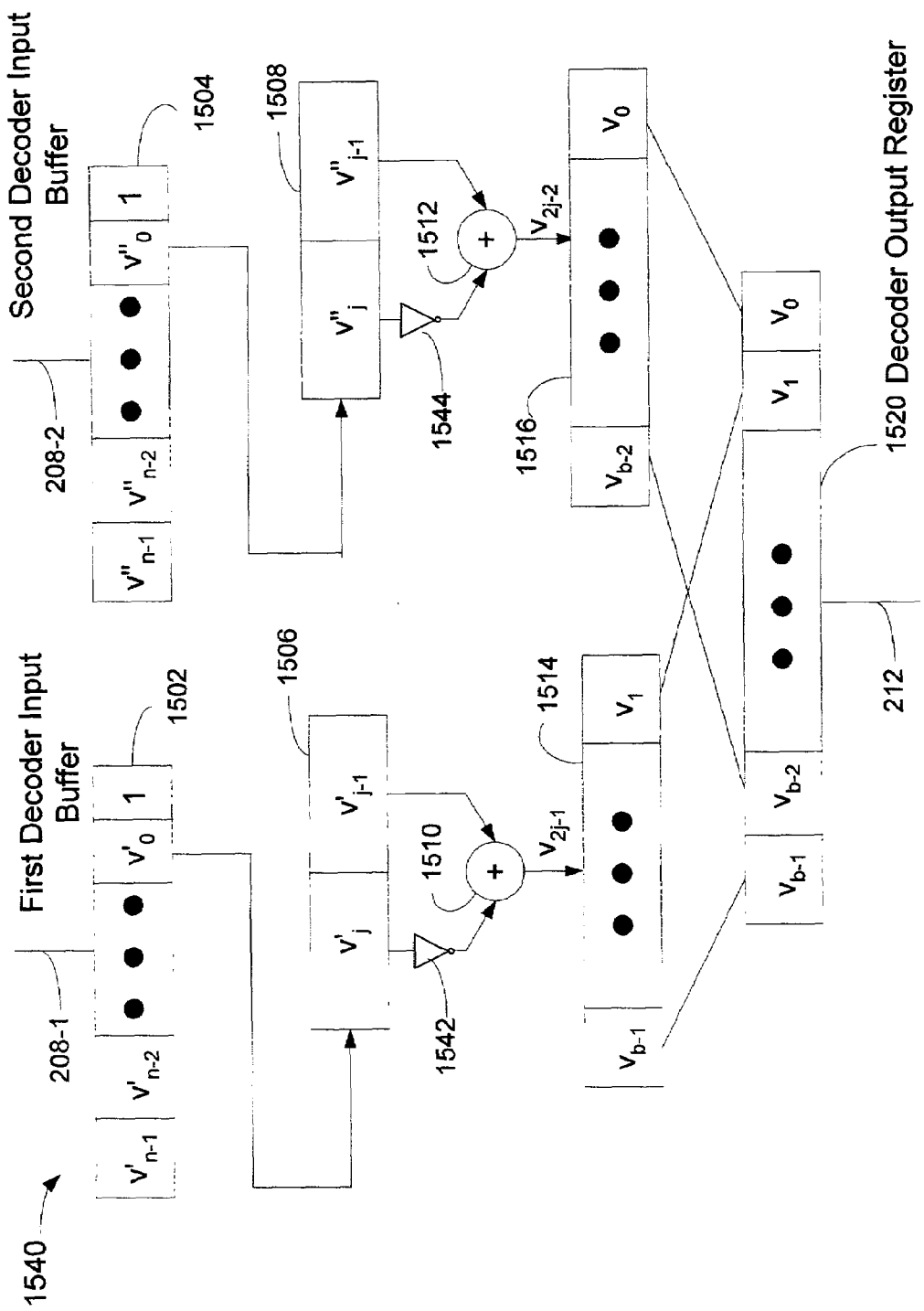
FIG. 41 is a block diagram of an exemplary hardware implementation of a constellation decoder for a constellation in the 11-family.

Referring to FIG. 41, an exemplary constellation decoder 1540 for b=2n bit constellations of the 11-family in accordance with the present invention is shown. The circuit is the same as in FIG. 39 except that inverters 1542 and 1544 invert the output of the first and second shift registers 1506 and 1508, respectively, to implement the decoding technique for a 11-constellation.

Figure 42:
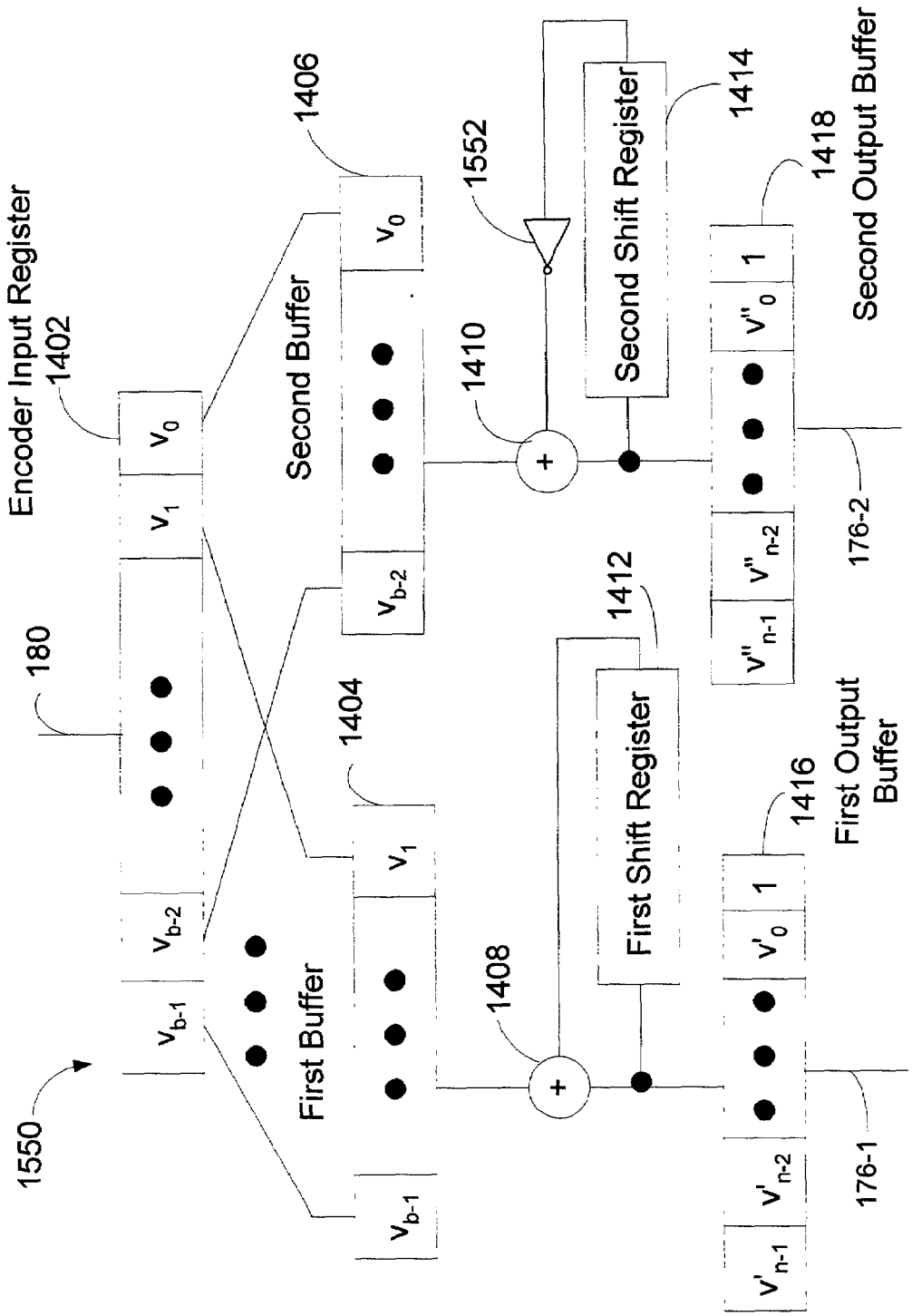
FIG. 42 is a block diagram of an exemplary hardware implementation of a constellation encoder for a constellation in the 01-family.

Referring to FIG. 42, an exemplary implementation of a constellation encoder 1550 for an even-bit constellation in the 01-family of encoders is shown. The circuit is the same as in FIG. 38 except that inverter 1552 inverts the output of the second shift register 1414 to implement the encoding technique for a 01-constellation.

Figure 43:
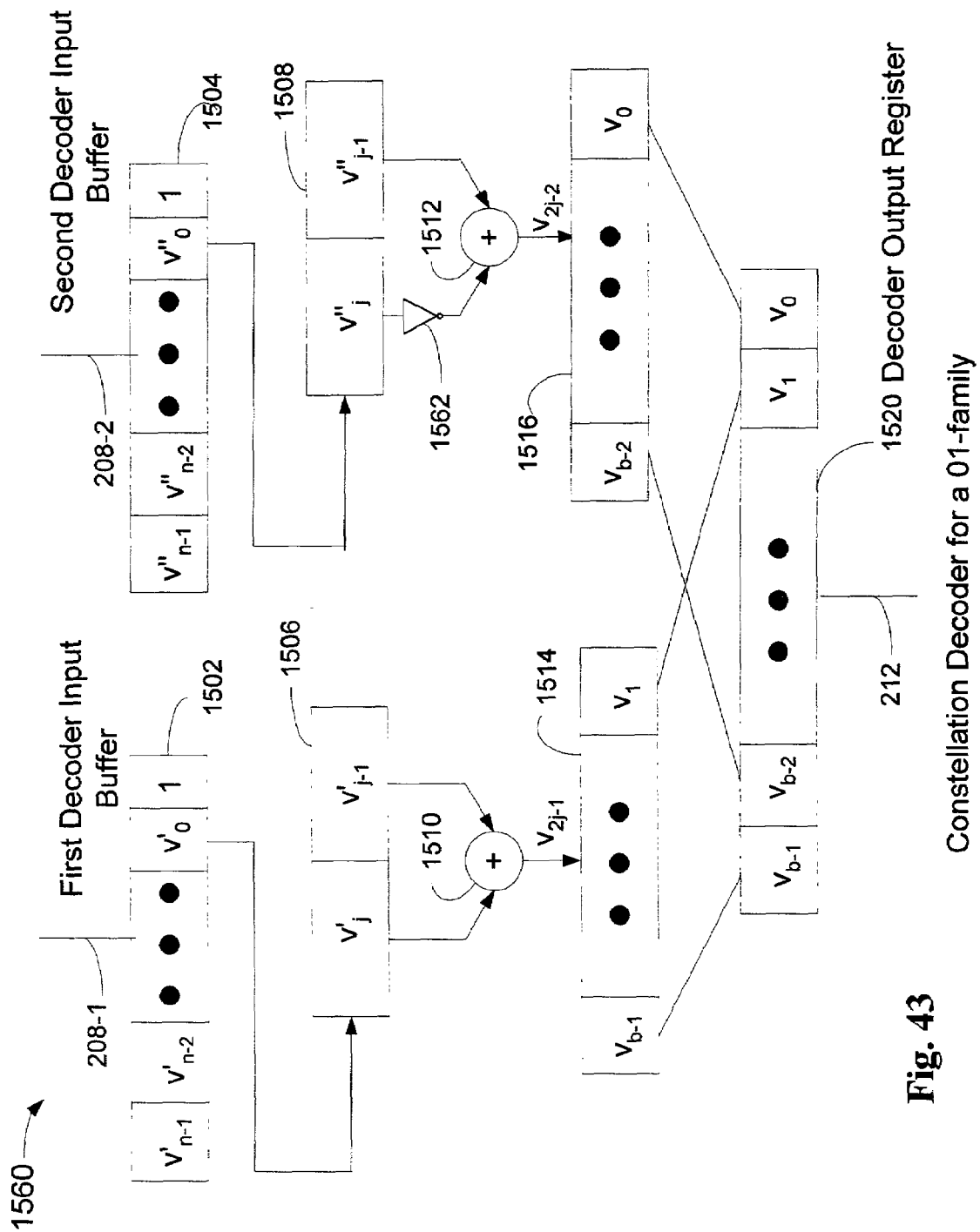
FIG. 43 is a block diagram of an exemplary hardware implementation of a constellation decoder for a constellation in the 01-family.

Referring to FIG. 43, an exemplary constellation decoder 1560 for b=2n bit constellations of the 01-family in accordance with the present invention is shown. The circuit is the same as in FIG. 39 except that inverter 1562 inverts the output of the second shift register 1508 to implement the decoding technique for a 01-constellation.

Figure 44:
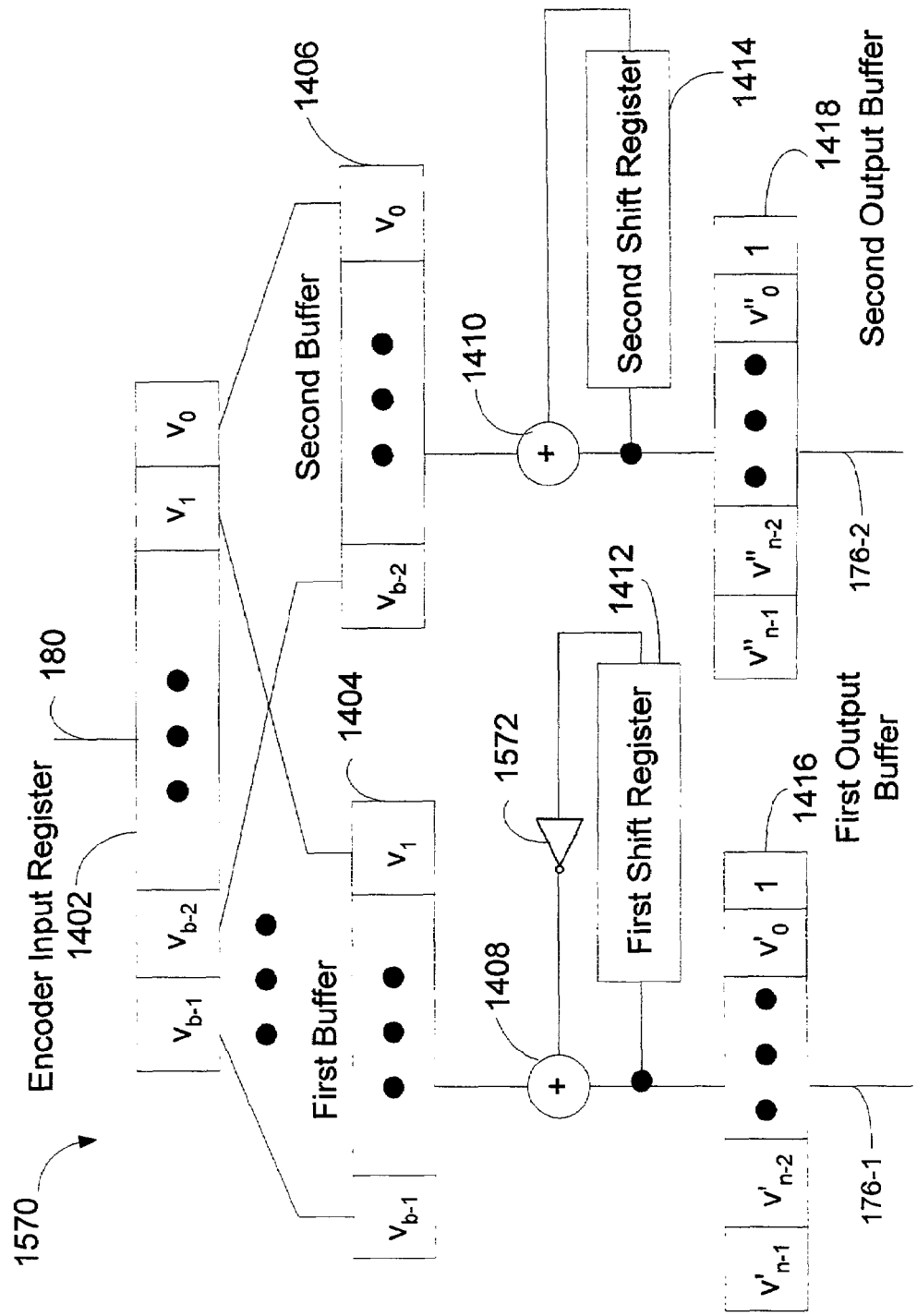
FIG. 44 is a block diagram of an exemplary hardware implementation of a constellation encoder for a constellation in the 10-family.

Referring to FIG. 44, an exemplary implementation of a constellation encoder 1570 for an even-bit constellation in the 10-family of encoders is shown. The circuit is the same as in FIG. 38 except that inverter 1572 inverts the output of the first shift register 1412 to implement the encoding technique for a 10-constellation.

Figure 45:
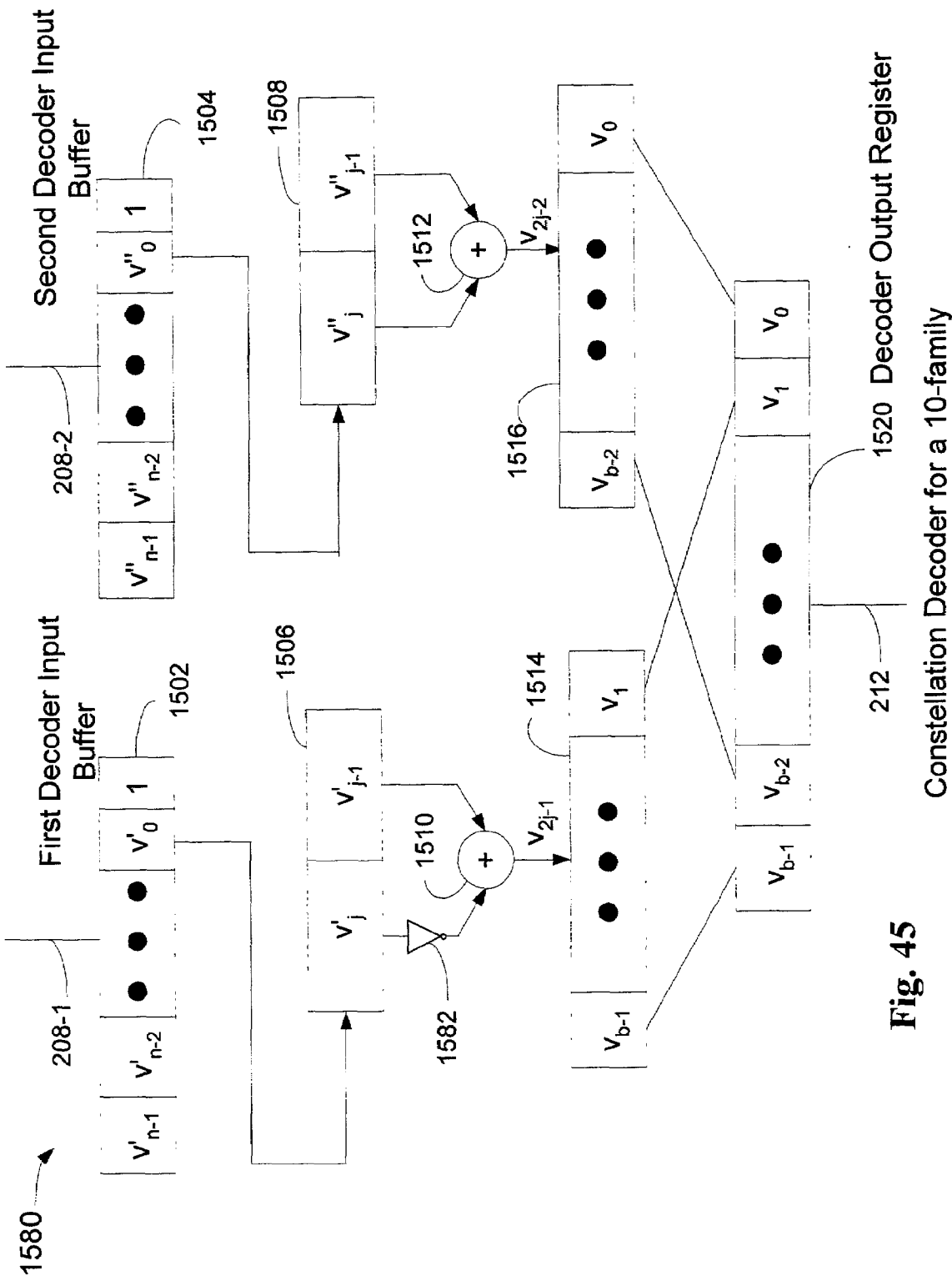
FIG. 45 is a block diagram of an exemplary hardware implementation of a constellation decoder for a constellation in the 10-family.

Referring to FIG. 45, an exemplary constellation decoder 1580 for b=2n bit constellations of the 10-family in accordance with the present invention is shown. The circuit is the same as in FIG. 39 except that inverter 1582 inverts the output of the first shift register 1506 to implement the decoding technique for a 10-constellation.

9. Software Embodiments

In this Section, exemplary software embodiments will be discussed.

Even-bit constellations

A Constellation Decoder

Figure 46:
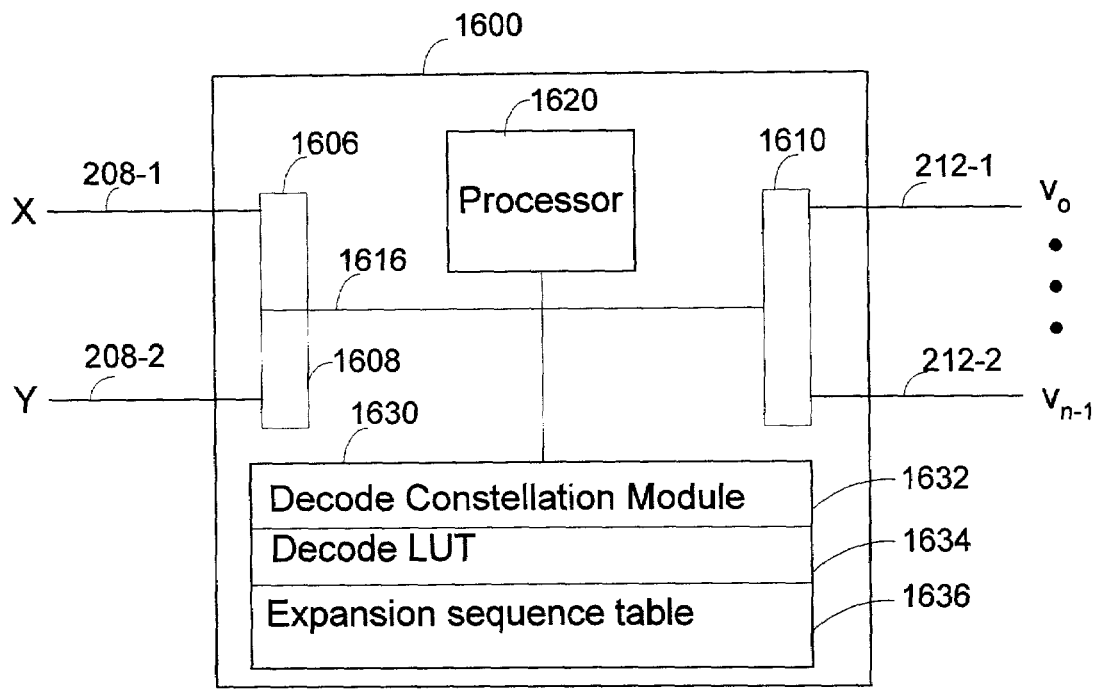
FIG. 46 is a block diagram of an alternate embodiment of a constellation decoder using a software implementation of the present invention.

Referring to FIG. 46, a block diagram of a constellation decoder 1600 in accordance with an alternate embodiment of the present invention is shown. The constellation decoder 1600 receives X and Y coordinates on leads 208-1 and 208-2, and outputs a decoded tuple on leads 212-1 and 212-2. X and Y input buffers, 1606 and 1608, receive and store the values of the X and Y coordinates, respectively. An output buffer 1610 stores the values of the decoded tuple to be output. A bus 1616 interconnects a processor 1620, a memory 1630, the output buffer 1610 and the X and Y input buffers, 1606 and 1608, respectively. The memory 1630 stores an decode constellation module procedure 1632, a decoder lookup table (LUT) 1634 and, for some embodiments, an expansion sequence table 1636. In one embodiment, the modem initialization module 148 (FIG. 2), generates and loads the decoder lookup table 1634, and expansion sequence table 1636 in the memory 1630. In an alternate embodiment the channel initialization module 143 (FIG. 2) generates and loads the decoder lookup table 1634, and expansion sequence table 1636 in the memory 1630. In another alternate embodiment, memory 138 (FIG. 2) is used as memory 1630.

Referring to FIG. 47, an exemplary decoder lookup table shown. This decoder lookup table decodes specific received X and Y coordinates to respective bit patterns for constellations in accordance with the G.lite and G.dmt standards. A "C" programming language, source array is used to decode received square G.lite and G.dmt constellations having up to fourteen bits. The total number of table entries is $2^{(b/2)}$ which is equal to 128 entries for a fourteen bit constellation.

Referring to FIG. 48, an exemplary decode constellation module 1632 is shown. In FIG. 48, assuming the values of X and Y are in the range of $(2^{(b/2)}-1)$ to $-(2^{(b/2)}-1)$, where b is the number of bits to be decoded from this carrier, then the decoded output tuple is determined using the following exemplary C programming language source code.

For example, using the decoder lookup table of FIG. 47, assume that the Number Of Bits =6, X=3, and Y=−7.

Then;
   Mask =7
   IndexX =1
   IndexY =4   since  −7  is  represented  as  twos complement=0b1111111111111001
   DecodeTable{IndexX}=0×0002
   (DecodeTable{IndexY}>>1)=0×0010

The decoded output tuple, "Data" is equal to 0×12 or 18. The final result is the addition of the table entry for X and the shifted entry for Y, since the table for Y results in the same table as X but shifted 1 bit.

Referring to FIG. 49, in Table 5, an exemplary decoder lookup table 1634 to decode a constellation that was expanded using the 00-configuration is shown. The decode constellation module 1632 is used for constellations generated using the "mirroring" technique of the present invention by replacing the decode lookup table of FIG. 47 with the decoder lookup table 1634 of FIG. 49.

Referring to FIGS. 50A, 50B and 50C, in Table 6, the association between the X and Y values for some even constellation sizes b that were generated using the 00-configuration (Table 5) and the standard G.lite/G.dmt table (Table 4) is shown. To show the continuity of Table 6 between Figures, although not done in practice, the last table entry on FIG. 50A is repeated as the first entry in FIG. 50B, and the last table entry of FIG. 50B is repeated as the first entry in FIG. 50C.

In an alternate embodiment, the decode constellation module 1632 of FIG. 46 implements any of the embodiments for decoding shown in the flowcharts of FIGS. 25, 27, 35, and 37A and 37B.

Constellation Encoder

Figure 51:
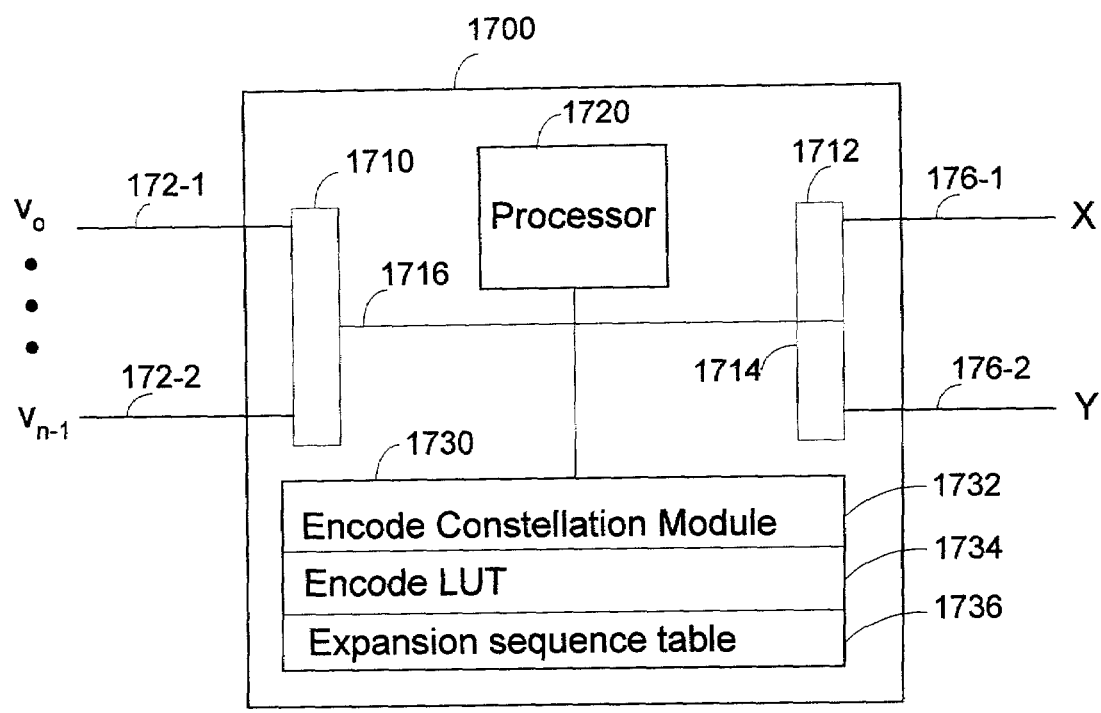
FIG. 51 is a block diagram of an alternate embodiment of a constellation encoder using a software implementation of the present invention.

Referring to FIG. 51, a block diagram of a constellation encoder 1700 is shown. The constellation encoder 1700 receives an input tuple on leads 172-1 to 172-2, and outputs X and Y coordinates on leads 176-1 and 176-2, respectively. An encoder input buffer 1710 receives and stores the values of the input tuple, and X and Y output buffers, 1712 and 1714, store the values of respective X and Y coordinates. A bus 1716 interconnects a processor 1720, a memory 1730, the input buffer 1710 and the X and Y output buffers, 1712 and 1714, respectively. The memory 1730 stores an encode constellation module 1732, an encoder lookup table (LUT) 1734, and for some embodiments, an expansion sequence table 1736. In one embodiment, the modem initialization module 148 (FIG. 2), generates and loads the encoder lookup table 1734, and expansion sequence table 1736 in the memory 1730. In an alternate embodiment the channel initialization module 143 (FIG. 2) generates and loads the encoder lookup table 1734, and expansion sequence table 1736 in the memory 1730. In another alternate embodiment, memory 138 (FIG. 2) is used as memory 1730.

Referring to FIG. 52, a portion of exemplary source code of an encode constellation module 1732 is shown. One additional table look up is required for both the X and Y values in the encoder. The following portion of C programming language code assumes that the G.lite/G.dmt X and Y calculation were completed up to and not including sign extension for square constellations up to fourteen bits.

Referring to FIG. 53, an exemplary encode lookup table 1734 is shown. A C programming language source array is used to encode the X and Y values based on values calculated for G.lite/G.dmt prior to sign extension for square constellations, expanded such that the (1,1) point was expanded using the 00-template, that is, the 00-configuration. The total number of table entries is $2^{(b/2)}$ which is 128 entries for a fourteen bit constellation. Table 7 was generated in accordance with the method for the 00-family of constellations described above with respect to FIG. 23 and applied to values between and 127. Table 7 of FIG. 54 works with the exemplary source code of FIG. 52 to encode a 00-constellation in accordance with an embodiment of the present invention.

In an alternate embodiment, the encoder lookup table 1734 of FIG. 53 has values to encode for any of the 00-family, 01-family, 10-family and 11-family of constellations. In yet an alternate embodiment the encode lookup table has values to encode a constellation generated using an expansion sequence that specifies at least two different configurations.

Odd Constellations

Referring to FIG. 54, an exemplary lookup table (Table 8) that works with the lookup table of FIG. 53 (Table 7) is shown. Table 8 is used for odd constellations that are expanded such that the (1,1) point is always expanded using the 00-template and are based on the 5-bit constellation in FIG. 31.

Table 8 allows the method used to encode square constellations from Table 7 to also be used for odd constellations. In Table 8, the left column is the most significant bits of the tuple, the middle column corresponds to bits associated with the X coordinate, and the right column corresponds to bits associated with the Y coordinate.

Using Table 8, the initial coding of X and Y in the 5-bit constellation of FIG. 54 will now be described. The three most significant bits of X and Y are determined by the five most significant bits of the b bits of the tuple. Let $c=(b+1)/2$, then X and Y have two's complement binary representations $(X_c, X_{c-1}, X_{c-2}, v_{b-4}, v_{b-6}, \ldots, v_3, v_1, 1)$ and $(Y_c, Y_{c-1}, Y_{c-2}, v_{b-5}, v_{b-7}, \ldots, v_2, v_0, v_1)$, where $X_c$ and $Y_c$ are the sign bits of X and Y, respectively. The final values of X and Y are derived from Table 7 as they are for square constellations.

In an alternate embodiment, the encode constellation module 1732 of FIG. 51, implements any of the embodiments for encoding shown in the flowcharts of FIGS. 23, 26A and 26B, 34, and 36A and 36B.

Although various embodiments and associated modifications which incorporate the teachings of the present invention have been described herein, those skilled in the art can readily devise many other embodiments and variants thereof that utilize these teachings.

What is claimed is:

1. A method of encoding data having one or more subsets of data, to one or more constellation points, each constellation point having coordinates, comprising:

initializing a first binary array and a second binary array with bits from one subset of the subsets of data, wherein the first binary array and second binary array are initialized with the values of alternating bits from the one subset;

starting at the most significant bit for each of the first and second binary arrays, for each successive pair of bits of each array, modifying the value of the lesser significant bit of that pair based on the value of the more significant bit of that pair and a template;

and concatenating each of the first and second binary arrays with one or more end bits having predetermined values, such that the one or more end bits become the one or more least significant bits of each of the first and second binary arrays, whereby the first binary array is a two's complement representation of one of the coordinates of a constellation point, and the second binary array is a two's complement representation of another coordinate of the constellation point.

2. The method of claim 1 wherein the one or more end bits are equal to {1}.

3. The method of claim 1 wherein the one or more end bits generate odd coordinate values.

4. The method of claim 1 wherein the one or more end bits generate even coordinate values.

5. The method of claim 1 wherein two or more pairs of bits of each of the first and second binary arrays are associated with different templates, and the template of said modifying is the template associated with that pair of bits of the first and second binary arrays.

6. A method of encoding data having one or more subsets of data, to one or more constellation points, each constellation point having coordinates comprising at least an X coordinate and a Y coordinate, comprising:

initializing a first binary array and a second binary array with bits from one subset of the subsets of data, wherein the first binary array and second binary array are initialized with the values of alternating bits from the one subset;

starting at the most significant bit for each of the first and second binary arrays, for each successive pair of bits of each first and second binary arrays, if the value of the more significant bit of that pair is equal to one, then invert the value of the lesser significant bit of that pair;

concatenate each of the first and second binary arrays with {1}, such that the {1} becomes the least significant bit of each of the first and second binary arrays, whereby the first binary array is a two's complement representation of one of the coordinates of a constellation point, and the second binary array is a two's complement representation of another coordinate of the constellation point.

7. A method of encoding data having one or more subsets of data, each subset comprising bits, each bit having a value, comprising:

determining values of a first upper bit array and a second upper bit array based on a first predetermined number of bits from one subset of the subsets of data, the first predetermined number of bits being the more significant bits of the one subset;

providing a first lower bit array and a second lower bit array using a second predetermined number of bits from the one subset, different from said first predetermined number of bits, wherein the first lower bit array and the second lower bit array are initialized with the values of alternating bits from the second predetermined number of bits;

concatenating the first upper bit array with the first lower bit array to produce a first intermediate array, and concatenating the second upper bit array with the second lower bit array to produce a second intermediate array;

in the first and second intermediate arrays, starting at the bit position of the least significant bit of the first and second upper bit arrays, for each successive pair of bits of each of the first and second intermediate arrays, modifying the value of the lesser significant bit of that pair based on the value of the more significant bit of that pair and a specified template associated with that pair, to produce first and second modified intermediate arrays, respectively; and concatenating each of the first and second modified intermediate arrays with one or more predetermined end bits to produce a first and a second coordinate of a constellation, respectively.

8. The method of claim 7 wherein an expansion sequence associates specified templates with bit pairs.

9. The method of claim 7 wherein the same template is specified for each bit pair.

10. The method of claim 7 wherein two or more bit pairs are associated with different templates.

11. The method of claim 7 wherein the one or more predetermined end bits are odd.

12. A constellation encoder comprising:
first and second encoder buffers to store alternating bits of an input tuple;
first and second shift registers;
first and second exclusive or gates to perform an exclusive or operation of an output of the first and second encoder buffers and an output of the first and second shift registers, respectively;
wherein each the first and second shift registers store at least one bit output from the first and second exclusive-or gates, said at least one bit to be exclusive or'ed with a subsequent bit output by the first and second encoder buffers, respectively; and
first and second output buffers to store the output from the first and second exclusive or gates, and to concatenate one or more end bits with the output of the exclusive or gates to produce first and second encoded data, respectively.

13. A constellation encoder comprising:
a processor;
a memory to store one or more modules having instructions to be executed by the processor and data, the memory storing:
an encode constellation module comprising one or more instructions to:
initialize a first binary array and a second binary array with bits from one subset of the subsets of data, wherein the first binary array and second binary array are initialized with the values of alternating bits from the one subset;
starting at the most significant bit for each of the first and second binary arrays, for each successive pair of bits of each array, modify the value of the lesser significant bit of that pair based on the value of the more significant bit of that pair and a template; and
concatenate each of the first and second binary arrays with one or more end bits having predetermined values, such that the one or more end bits become the one or more least significant bits of each of the first and second binary arrays, whereby the first binary array is a two's complement representation of one of the coordinates of a constellation point, and the second binary array is a two's complement representation of another coordinate of the constellation point.

14. A method of expanding a constellation comprising:
first applying a first configuration of templates to a first constellation having a first number of constellation points to generate a second constellation having a second number of constellation points greater than the first number, each template of the first configuration of templates being a mirror image of at least one other template in the configuration, each template being distinct.

15. The method of claim 14 wherein the configuration of templates has four templates comprising a 00 template, a 01 template, a 10 template and a 11 template.

16. The method of claim 14 further comprising:
second applying a second configuration of templates to the second constellation having the second number of constellation points to generate a third constellation having a third number of constellation points greater than the second number, each template of the second configuration of templates being a mirror image of at least one other template in the configuration, each template being distinct, the templates of the second configuration being arranged different from the first configuration.

17. The method of claim 14 further comprising:
second applying a second configuration of templates to the second constellation having the second number of constellation points to generate a third constellation having a third number of constellation points greater than the second number, each template of the second configuration of templates being a mirror image of at least one other template in the configuration, each template being distinct, the second configuration being the same and the first configuration.

18. The method of claim 14 wherein the first constellation has an odd number of bits.

19. The method of claim 14 wherein the first constellation has an even number of bits.

20. A method of decoding data having a first coordinate and a second coordinate, to a constellation point of a constellation, each constellation point of the constellation having a label associated with coordinates, comprising:
providing a first working array and a second working array with at least a portion of the first coordinate and the second coordinate, respectively;
producing first and second partially decoded arrays based on the first and second working arrays, respectively, by starting at the least significant bit for each of the first and second working arrays, for each successive pair of bits of each working array, modifying the value of the lesser significant bit of that pair based on the value of the more significant bit of that pair and a template configuration; and constructing a decoded array that represents a label of a constellation point from the first and second partially decoded arrays.

21. The method of claim 20 wherein the decoded array has alternating bits from the first and second partially decoded arrays.

22. The method of claim 20 wherein the labels and coordinates of the constellation points were generated based on at least two different template configurations, and the template configuration of said modifying is the template configuration associated with that pair.

23. A method of decoding data having first and second received coordinates, comprising:

forming first and second working arrays based on at least a subset of the first and second received coordinates, respectively;

producing first and second partially decoded arrays from at least a subset of the first and second working arrays, respectively, by starting at the least significant bit for each of the first and second working arrays, for each successive pair of bits of each working array up to a predetermined bit, modifying the value of the lesser significant bit of that pair based on the value of the more significant bit of that pair and a template configuration;

determining a lookup decoded array based on a predetermined number of most significant bits from the partially decoded array; and constructing a decoded array from the first and second partially decoded arrays and the lookup decoded array.

24. The method of claim 23 wherein said bits of the lookup decoded array are the most significant bits of the decoded array.

25. The method of claim 24 wherein said bits from the first and second partially decoded arrays are alternated to form the least significant bits of the decoded array.

26. The method of claim 24 wherein an expansion sequence defines the template configuration associated with the pair.

27. The method of claim 26 herein the expansion sequence associates different template configurations with at least two pairs.

28. A constellation decoder comprising:

first and second shift registers to store a first and second pairs of received bits, respectively;

first and second exclusive-OR gates to perform an exclusive-OR operation between the first and second pairs in the first and second shift registers, respectively; and first and second output buffers to store the output of the first and second exclusive or gates, respectively, wherein alternating bits of the first and second output buffers provide a decoded subset of bits.

29. A constellation decoder comprising:

a processor;

a memory to store one or more modules having instructions to be executed by the processor and data, the memory storing:

a decode constellation module comprising one or more instructions to:

provide first and second working arrays based on at least a subset of the first and second received coordinates, respectively;

produce first and second partially decoded arrays from at least a subset of the first and second working arrays, respectively, by starting at the least significant bit for each of the first and second working arrays, for each successive pair of bits of each working array up to a predetermined bit, modify the value of the lesser significant bit of that pair based on the value of the more significant bit of that pair and a template configuration;

determine a lookup decoded array based on a predetermined number of most significant bits from the partially decoded array; and generate a decoded array from the first and second partially decoded arrays and the lookup decoded array.

* * * * *